US 8,799,043 B2

(12) United States Patent
Motoyama et al.

(10) Patent No.: US 8,799,043 B2
(45) Date of Patent: Aug. 5, 2014

(54) CONSOLIDATION OF MEMBER SCHEDULES WITH A PROJECT SCHEDULE IN A NETWORK-BASED MANAGEMENT SYSTEM

(75) Inventors: Tetsuro Motoyama, Cupertino, CA (US); Avery Fong, Castro Valley, CA (US)

(73) Assignee: Ricoh Company, Ltd., Tokyo (JP)

( * ) Notice: Subject to any disclaimer, the term of this patent is extended or adjusted under 35 U.S.C. 154(b) by 1183 days.

(21) Appl. No.: 11/449,130

(22) Filed: Jun. 7, 2006

(65) Prior Publication Data

US 2007/0288289 A1 Dec. 13, 2007

(51) Int. Cl.
*G06Q 10/00* (2012.01)
*G06Q 10/06* (2012.01)

(52) U.S. Cl.
CPC ............................ *G06Q 10/06311* (2013.01)
USPC .......................... 705/7.13; 705/7.17; 705/301

(58) Field of Classification Search
CPC ................................................. G06Q 10/0631
USPC ........................................ 705/7.13, 7.17, 301
See application file for complete search history.

(56) References Cited

U.S. PATENT DOCUMENTS

| | | | |
|---|---|---|---|
| 4,819,233 A | 4/1989 | Delucia et al. |
| 4,875,162 A | 10/1989 | Ferriter et al. |
| 5,155,842 A | 10/1992 | Rubin |
| 5,197,001 A | 3/1993 | Mukherjee |
| 5,490,097 A | 2/1996 | Swenson et al. |
| 5,537,541 A | 7/1996 | Wibecan |
| 5,548,506 A | 8/1996 | Srinivasan |
| 5,603,020 A | 2/1997 | Hashimoto et al. |

(Continued)

FOREIGN PATENT DOCUMENTS

| | | |
|---|---|---|
| JP | H06-096171 | 8/1994 |
| JP | 2001-117872 | 4/2001 |

(Continued)

OTHER PUBLICATIONS

Uyttewaal, Eric, Dynamic scheduling with Microsoft Office Project 2003: the book by and for professionals (2005), (hereafter referred to as "Uyttewaal"), Boca Raton, Fla. : J. Ross, ; [s.l.] ; International Institute for Learning, c2005, p. 6.*

(Continued)

*Primary Examiner* — Timothy Padot
(74) *Attorney, Agent, or Firm* — Hickman Palermo Truong Becker Bingham Wong LLP; Edward A. Becker

(57) ABSTRACT

A system is used for the creation, maintenance, and management of an overall project schedule, of individual project member schedules, and of project task assignments over a network. The system comprises three editors accessed through a web browser to perform the various tasks by members of a project. Information is passed between a web server and web browser and a database is used to maintain all information. The project manager can use a task assignment editor to assign tasks to individual project members. The project manager can use a project schedule editor to initially create the project schedule and to show the overall project schedule. After the project schedule is created, each project member can create their own member schedule using a member schedule editor, containing tasks related to the project schedule. After project members complete a task, the project member updates the member's schedule via the member schedule editor.

20 Claims, 63 Drawing Sheets

(56) References Cited

U.S. PATENT DOCUMENTS

| | | | |
|---|---|---|---|
| 5,699,310 A | 12/1997 | Garloff et al. | |
| 5,706,502 A | 1/1998 | Foley et al. | |
| 5,709,410 A | 1/1998 | Reeves, Jr. | |
| 5,765,140 A | 6/1998 | Knudson et al. | |
| 5,826,086 A | 10/1998 | Arima et al. | |
| 5,826,252 A | 10/1998 | Wolters et al. | |
| 5,909,689 A | 6/1999 | Van Ryzin | |
| 6,049,776 A * | 4/2000 | Donnelly et al. | 705/7.14 |
| 6,101,481 A * | 8/2000 | Miller | 705/7.13 |
| 6,161,113 A | 12/2000 | Mora et al. | |
| 6,222,530 B1 | 4/2001 | Sequeira | |
| 6,236,409 B1 | 5/2001 | Hartman | |
| 6,308,164 B1 | 10/2001 | Nummelin et al. | |
| 6,334,114 B1 | 12/2001 | Jacobs et al. | |
| 6,351,734 B1 | 2/2002 | Lautzenheiser et al. | |
| 6,385,765 B1 | 5/2002 | Cleaveland et al. | |
| 6,405,361 B1 | 6/2002 | Broy et al. | |
| 6,412,109 B1 | 6/2002 | Ghosh | |
| 6,415,259 B1 | 7/2002 | Wolfinger et al. | |
| 6,415,387 B1 | 7/2002 | Aguilar et al. | |
| 6,487,469 B1 | 11/2002 | Formenti | |
| 6,502,213 B1 | 12/2002 | Bowman-Amuah | |
| 6,578,005 B1 | 6/2003 | Lesaint et al. | |
| 6,581,040 B1 | 6/2003 | Wright et al. | |
| 6,678,698 B2 | 1/2004 | Fredell et al. | |
| 6,842,760 B1 | 1/2005 | Dorgan et al. | |
| 6,859,768 B1 | 2/2005 | Wakelam et al. | |
| 6,865,593 B1 | 3/2005 | Reshef et al. | |
| 6,874,010 B1 | 3/2005 | Sargent | |
| 6,895,382 B1 | 5/2005 | Srinivasan et al. | |
| 6,901,579 B1 | 5/2005 | Suguta | |
| 6,954,737 B2 | 10/2005 | Kalantar et al. | |
| 6,957,189 B2 | 10/2005 | Poage et al. | |
| 6,968,343 B2 | 11/2005 | Charisius et al. | |
| 6,988,241 B1 | 1/2006 | Guttman et al. | |
| 7,051,036 B2 | 5/2006 | Rosnow et al. | |
| 7,072,951 B2 | 7/2006 | Von Klopp et al. | |
| 7,073,175 B2 | 7/2006 | Rehg et al. | |
| 7,107,268 B1 | 9/2006 | Zawadzki et al. | |
| 7,167,893 B1 | 1/2007 | Malone et al. | |
| 7,178,136 B2 | 2/2007 | Morgan | |
| 7,210,119 B2 | 4/2007 | Pothos et al. | |
| 7,219,107 B2 | 5/2007 | Beringer | |
| 7,243,267 B2 | 7/2007 | Klemm et al. | |
| 7,251,693 B2 | 7/2007 | Stull et al. | |
| 7,269,798 B2 | 9/2007 | Nonaka et al. | |
| 7,299,277 B1 | 11/2007 | Moran et al. | |
| 7,406,432 B1 | 7/2008 | Motoyama | |
| 7,496,886 B2 | 2/2009 | Puttaswamy et al. | |
| 7,500,223 B2 | 3/2009 | DeSantis | |
| 7,546,228 B2 | 6/2009 | Cullick et al. | |
| 7,644,414 B2 | 1/2010 | Smith et al. | |
| 7,668,800 B2 | 2/2010 | Motoyama et al. | |
| 7,721,290 B2 | 5/2010 | Horikawa | |
| 7,836,040 B2 | 11/2010 | Lee | |
| 8,086,903 B2 | 12/2011 | Arndt et al. | |
| 2002/0004734 A1 | 1/2002 | Nishizawa | |
| 2002/0046394 A1 | 4/2002 | Do et al. | |
| 2002/0059407 A1 | 5/2002 | Davies | |
| 2002/0077879 A1 | 6/2002 | Uchida et al. | |
| 2002/0078007 A1 | 6/2002 | Herrero | |
| 2002/0082889 A1 | 6/2002 | Oliver | |
| 2002/0169739 A1 | 11/2002 | Carr et al. | |
| 2002/0178019 A1 | 11/2002 | Anderson et al. | |
| 2002/0194048 A1 | 12/2002 | Levinson | |
| 2003/0046134 A1 | 3/2003 | Frolick et al. | |
| 2003/0046345 A1 | 3/2003 | Wada et al. | |
| 2003/0144892 A1 | 7/2003 | Cowan et al. | |
| 2003/0191681 A1 | 10/2003 | Gallion et al. | |
| 2003/0200531 A1 | 10/2003 | Fairweather | |
| 2004/0017400 A1 | 1/2004 | Ly et al. | |
| 2004/0039723 A1 | 2/2004 | Lee et al. | |
| 2004/0078257 A1 | 4/2004 | Schweitzer et al. | |
| 2004/0111705 A1 | 6/2004 | Motoyama et al. | |
| 2004/0143472 A1 * | 7/2004 | Estrada et al. | 705/8 |
| 2004/0162750 A1 * | 8/2004 | Motoyama | 705/9 |
| 2004/0260782 A1 | 12/2004 | Affleck et al. | |
| 2004/0267595 A1 | 12/2004 | Woodings et al. | |
| 2005/0022198 A1 | 1/2005 | Olapurath et al. | |
| 2005/0027386 A1 | 2/2005 | Weigand et al. | |
| 2005/0028158 A1 | 2/2005 | Ferguson et al. | |
| 2005/0033669 A1 | 2/2005 | Stremler et al. | |
| 2005/0044295 A1 | 2/2005 | Wakeam et al. | |
| 2005/0050513 A1 | 3/2005 | Motoyama et al. | |
| 2005/0080714 A1 | 4/2005 | McHale et al. | |
| 2005/0137920 A1 | 6/2005 | O'Connor et al. | |
| 2005/0138031 A1 | 6/2005 | Wefers | |
| 2005/0160084 A1 | 7/2005 | Barrett | |
| 2005/0165929 A1 | 7/2005 | Motoyama | |
| 2005/0216328 A1 | 9/2005 | Clark | |
| 2005/0262472 A1 | 11/2005 | Wood et al. | |
| 2006/0015842 A1 | 1/2006 | DeSantis | |
| 2006/0053043 A1 | 3/2006 | Clarke | |
| 2006/0053125 A1 | 3/2006 | Scott | |
| 2006/0070019 A1 | 3/2006 | Vishnumurty et al. | |
| 2006/0074844 A1 | 4/2006 | Frankel et al. | |
| 2006/0090071 A1 | 4/2006 | Sinzig et al. | |
| 2006/0090097 A1 | 4/2006 | Ngan et al. | |
| 2006/0101387 A1 | 5/2006 | Gerken et al. | |
| 2006/0111953 A1 | 5/2006 | Setya | |
| 2006/0136461 A1 | 6/2006 | Lee et al. | |
| 2006/0173879 A1 | 8/2006 | MacFarlane et al. | |
| 2006/0212327 A1 | 9/2006 | Norman | |
| 2006/0248166 A1 | 11/2006 | Milosevic et al. | |
| 2006/0265690 A1 | 11/2006 | Motoyama et al. | |
| 2007/0073695 A1 | 3/2007 | Conlan et al. | |
| 2007/0100967 A1 | 5/2007 | Smith et al. | |
| 2007/0146791 A1 | 6/2007 | Murase | |
| 2007/0150327 A1 | 6/2007 | Dromgold | |
| 2007/0192156 A1 | 8/2007 | Gauger | |
| 2007/0214450 A1 | 9/2007 | Motoyama et al. | |
| 2007/0282658 A1 | 12/2007 | Brintle | |
| 2007/0288283 A1 | 12/2007 | Fitzpatrick | |
| 2007/0288288 A1 | 12/2007 | Motoyama et al. | |
| 2007/0288289 A1 | 12/2007 | Motoyama et al. | |
| 2007/0288290 A1 | 12/2007 | Motoyama et al. | |
| 2007/0288334 A1 | 12/2007 | Creedle et al. | |
| 2007/0294617 A1 | 12/2007 | Kroeger | |
| 2008/0027779 A1 | 1/2008 | Kirwan | |
| 2008/0103871 A1 | 5/2008 | Ruehl et al. | |
| 2008/0201713 A1 | 8/2008 | Chaffee et al. | |
| 2008/0209416 A1 | 8/2008 | De Souza et al. | |
| 2008/0221952 A1 | 9/2008 | Mohri | |
| 2008/0255907 A1 | 10/2008 | Motoyama et al. | |
| 2008/0301142 A1 | 12/2008 | Marolf | |
| 2008/0313024 A1 | 12/2008 | Kunichika et al. | |
| 2009/0132318 A1 | 5/2009 | Jin et al. | |
| 2009/0217240 A1 | 8/2009 | Motoyama et al. | |
| 2009/0217241 A1 | 8/2009 | Motoyama et al. | |
| 2009/0222299 A1 | 9/2009 | Clemenson et al. | |
| 2009/0276260 A1 | 11/2009 | Douglas et al. | |
| 2009/0287521 A1 | 11/2009 | Motoyama et al. | |
| 2009/0287522 A1 | 11/2009 | Motoyama et al. | |
| 2009/0287718 A1 | 11/2009 | Motoyama et al. | |
| 2009/0287730 A1 | 11/2009 | Motoyama et al. | |
| 2009/0287731 A1 | 11/2009 | Motoyama et al. | |
| 2010/0010856 A1 | 1/2010 | Chua et al. | |

FOREIGN PATENT DOCUMENTS

| | | |
|---|---|---|
| JP | 2001-202405 | 7/2001 |
| JP | 2002024495 A | 1/2002 |
| JP | 2006244342 A | 9/2006 |
| WO | WO 98/49640 A1 | 11/1998 |
| WO | WO 00/56033 A1 | 9/2000 |

OTHER PUBLICATIONS

SGP International Introduces E2doPro Enterprise Collaboration System Facilitates Project Management, Business Editors & High-Tech Writers. Business Wire. New York: Oct. 22, 2002. p. 1.*

Leslie, "Cost Forecasting—Beyond the Crystal Ball", Transactions of AACE International, Dialog file 15, Accession No. 01615178, Dec. 1996, 13 pages.

(56) References Cited

OTHER PUBLICATIONS

Claims, Foreign application number, 07109677.0-1238, 3 pages.
European Patent Office, "European Search Report", Foreign application number, 07109677.0-1238, received Oct. 29, 2007, 8 pages.
Angermeier, George, "Cooperative Project Management with RPLAN", XP-002345614, Copyright Projekt Magazin, Oct. 2002 edition, 6 pages.
Maurer, Frank et al., "Merging Project Planning and Web-Enabled Dynamic Workflow Technologies", XP-002345613, IEEE Internet Computing, Jun. 2000, 10 pages.
Buchbinder et al., "Oracle Project Management, Release 11i", XP-002345049, Oracle, User guide, part No. B10895-02, May 2004, 354 pages.
Janne, "Developing WWW-Based Project Management Tools for a Large Scale Project", dated Dec. 1997, Tampa University of Technology Department of Information Technology, 80 pages.
Christenberry, J. Reid, et al., "Project and Employee Time Tracking—For Information Systems and Technology", dated Nov. 14, 1996, Georgia University, 17 pages.
Mitchell, Karen, "Managers get a needed boost with project linking", dated Dec. 15, 1987, PC Week, v4, n50, Copyright The Gale Group, Dialog Accession No. 03021023, 4 pages.
Duncan, William R., "A Guide to the Project Management Body of Knowledge"; Dec. 1996; Project Management Institute Four Campus Boulevard, pp. 1-149.
Dialog "Primavera Extends Lead in High-End Project Management Software; Adds Powerful New Features, Functionality to P3" Apr. 1995; Business Wire, p04031181.
Katz, R. et al., "Project Performance and the Locus of Influence in the R&D Matrix"; Mar. 1995; The Academy of Management Journal, vol., 28; pp. 67-87.
Jurison, J., "Software Project Management: The Manager's view"; Sep. 1999; Communications of the Association for Information Systems; pp. 1-57.
Mitchell, K., "Managers Get a Needed Boost with Project Linking"; Dec. 1997, PC Week, V4, n50, Dialog file 47, Accession No. 03021023.
Paynter, J., "Software engineering project management, estimation and metrics: Discussion summary and recommendations"; Dec. 1996; University of Auckland, New Zealand; pp. 500-503.

Mensah, Kuassi, et al., Oracle Corporation, "Database Web Services," An Oracle White Paper, Nov. 2002, pp. 1-21.
Advanced Management Solutions, "AMS Real Time Projects Advanced User Guide", Dec. 1997, pp. 1-324.
Goldmann, S., "Procura: a project management model of concurrent planning and design", 5th International Workshops on Enabling Technologies: Infrastructure for Collaborative Enterprises, 1996, printed May 13, 2007, 2 pages.
Janne, "Developing WWW-Based Project Management Tools for a Large Scale Project", Tampere University of Technology, Department of Information Technology, Master of Science Thesis, Jan. 1998, 80 pages.
Petrie, Charles et al., "Agent-Based Project Management", Center for Design Research, Stanford University, Sep. 1999, 25 pages.
"PHP Manuel—Connections Management", by the PHP Group, Sep. 14, 2005, p. 1-4, [online][retrieved on Dec. 14, 2011], Retrieved from <http://php.net/manuel/en/pdo.connections.php>.
IBM, "WebSphre Business Modeler Adavanced", Published: Aug. 9, 2004, p. 1 [online] [retrieved on Jun. 21, 2012], Retrieved from <http://www-01.ibm/software/integration/wbimodeler/advanced/>.
Maki et al., "JavaScript Multithread Framework for Asynchronous Processing", Information Processing Paper, Information Processing Society of Japan, dated Aug. 15, 2007, vol. 48, 22 pages.
Eposito, Dino, "The ABC's of Microsoft ASP.NET AJAX", Japan, Nikkei BP Soft Press, dated Jan. 15, 2008, 23 pages.
Shingo, Terui, "Popular Script Language is Further Advanced! Practice!, The Newest PHP5, UNIX User", Japan, Softbank Publishing Co., Ltd., dated Jun. 1, 2004, vol. 13, 17 pages.
Starr, Jeff, WordPress, Web Design, Code & Tutorials, Advanced PHP Error Handing via PHP, Dated Jan. 30, 2008, 10 pages.
PHP Manual, "Connections and Connection Management", Dated Sep. 14, 2005, Retrieved online dated Dec. 14, 2011 from http://php.net/manual/en/pdo.connections.php>, 4 pages.
Stitamoju, Rajender, "Error Validation and Exception Handling in Portlets, Using the Struts Portlet Framework", dated Nov. 2004, 20 pages.
The Java Tutotials, "What is an Exception?" Oracle dated 1995, Retrieved on Dec. 14, 2011, 2 pages.

* cited by examiner

J17 Project Task Schedule Editor

| Task | | Set Date | Planned Start Date | Planned End Date | Actual Start Date | Actual End Date |
|---|---|---|---|---|---|---|
| Planning | | 2005-09-19 | 2005-10-03 | 2005-10-14 | | |
| MGR | Project Initiation | 2005-09-20 | 2005-09-20 | 2005-09-29 | 2005-09-20 | |
| T1 | Project Plan | 2005-09-19 | 2005-10-06 | 2005-10-13 | | |
| Requirements | | 2005-09-19 | 2005-10-17 | 2005-10-25 | | |
| Guideline Documents | | 2005-09-19 | 2005-10-17 | 2005-10-28 | | |
| T1 | Code Convention | 2005-10-27 | 2005-10-16 | 2005-10-23 | | |
| | Design Document Guideline | 2005-09-19 | 2005-10-21 | 2005-10-28 | | |
| Top Level Design | | 2005-09-19 | 2005-10-31 | 2005-11-18 | | |
| MGR | Architecture | 2005-09-20 | 2005-10-04 | 2005-10-12 | | |
| T1 | Interface | 2005-09-19 | 2005-10-31 | 2005-11-11 | | |
| Class Specification | | 2005-09-19 | 2005-11-18 | 2005-12-22 | | |
| Implementation and Unit Test Plan | | 2006-04-21 | Dec ▽ 23 ▽ 2005 ▽ | Jan ▽ 9 ▽ 2006 ▽ | | |
| New | | 2006-04-21 | | | | |
| Class Specification | | | | | | |
| Guideline Documents | | | | | | |
| Implementation and Unit Test Plan | | | | | | |
| Planning | | | | | | |
| Requirements | | | | | | |
| Top Level Design | | | | | | |
| Implementation | | | | | | |
| Iteration 1 | | | | | | |
| Iteration 2 | | | | | | |
| Iteration 3 | | | | | | |
| Package Design | | | | | | |

[Add Rows Above] [Add Rows Below] 3 ▽ [Delete] [Consolidate]

[Finish]

Task Schedule

Guideline Documents

| Tasks | Identified Date | Planned Start | Planned End | Actual Start | Actual End |
|---|---|---|---|---|---|
| Implementation Guideline | 2005-09-01 | 2005-08-09 | 2005-09-01 | | |
| | 2005-08-12 | 2005-08-07 | 2005-01-01 | | |
| | 2005-08-08 | 2005-08-09 | 2005-01-01 | 2005-08-09 | 2005-09-01 |
| Draft | 2005-09-20 | 2005-10-07 | 2005-10-10 | 2005-10-10 | 2005-10-07 |
| Design Document Guideline | 2005-09-01 | 2005-09-01 | 2005-09-02 | 2005-09-01 | 2005-09-02 |
| | 2005-08-08 | 2005-08-07 | 2005-01-04 | | |

Iteration 2

| Tasks | Identified Date | Planned Start | Planned End | Actual Start | Actual End |
|---|---|---|---|---|---|
| design | 2006-01-25 | 2006-01-25 | 2006-02-08 | 2006-01-25 | |
| arch | 2006-01-25 | 2006-01-25 | 2006-02-01 | 2006-01-25 | |
| package | 2006-01-25 | 2006-02-01 | 2006-02-08 | | |

Remaining NonProject Tasks

| Tasks | Identified Date | Planned Start | Planned End | Actual Start | Actual End |
|---|---|---|---|---|---|
| Patent RSID 1-333 | 2006-01-25 | 2006-01-26 | 2006-01-30 | | |
| Review | 2006-01-25 | 2006-01-26 | 2006-01-27 | | |
| Response | 2006-01-25 | 2006-01-27 | 2006-01-30 | | |

Schedule

| Task | Set Date | Planned Start Date | Planned End Date | Actual Start Date | Actual End Date |
|---|---|---|---|---|---|
| ☐ Project Plan | 2005-09-19 | 2005-10-06 | | | |
| | 2006-04-21 | Oct ▽ 10 ▽ 2005 ▽ | Oct ▽ 13 ▽ 2005 ▽ | ▽ ▽ ▽ | ▽ ▽ ▽ |
| ☐ Final | 2005-09-19 | Oct ▽ 10 ▽ 2005 ▽ | Oct ▽ 13 ▽ 2005 ▽ | ▽ ▽ ▽ | ▽ ▽ ▽ |
| ☐ Draft | 2005-09-19 | 2005-10-06 | 2005-10-10 | no-date | no-date |
| Code Convention | 2005-10-27 | Oct ▽ 16 ▽ 2005 ▽ | Oct ▽ 23 ▽ 2005 ▽ | ▽ ▽ ▽ | ▽ ▽ ▽ |
| ☐ Final | 2005-09-19 | Oct ▽ 21 ▽ 2005 ▽ | Oct ▽ 23 ▽ 2005 ▽ | ▽ ▽ ▽ | ▽ ▽ ▽ |
| ☐ Draft | 2005-10-27 | Oct ▽ 16 ▽ 2005 ▽ | Oct ▽ 21 ▽ 2005 ▽ | ▽ ▽ ▽ | ▽ ▽ ▽ |
| Design Document Guideline | 2005-09-19 | Oct ▽ 21 ▽ 2005 ▽ | Oct ▽ 28 ▽ 2005 ▽ | ▽ ▽ ▽ | ▽ ▽ ▽ |
| ☐ Draft | 2005-09-19 | Oct ▽ 23 ▽ 2005 ▽ | Oct ▽ 28 ▽ 2005 ▽ | ▽ ▽ ▽ | ▽ ▽ ▽ |
| ☐ Final | 2005-09-19 | Oct ▽ 31 ▽ 2005 ▽ | Nov ▽ 11 ▽ 2005 ▽ | ▽ ▽ ▽ | ▽ ▽ ▽ |
| ☐ Interface | 2005-09-19 | 2005-10-29 | 2005-10-21 | | |
| ☐ Patent Cases | 2005-10-27 | Oct ▽ 27 ▽ 2005 ▽ | Nov ▽ 1 ▽ 2005 ▽ | ▽ ▽ ▽ | ▽ ▽ ▽ |
| | 2006-04-21 | Oct ▽ 27 ▽ 2005 ▽ | Oct ▽ 29 ▽ 2005 ▽ | ▽ ▽ ▽ | ▽ ▽ ▽ |
| ☐ draft | 2005-10-27 | 2005-10-31 | | | |
| | 2006-04-21 | Oct ▽ 28 ▽ 2005 ▽ | Nov ▽ 1 ▽ 2005 ▽ | ▽ ▽ ▽ | ▽ ▽ ▽ |
| ☐ review | 2005-10-27 | Oct ▽ 28 ▽ 2005 ▽ | Oct ▽ 29 ▽ 2005 ▽ | ▽ ▽ ▽ | ▽ ▽ ▽ |
| ☐ comment | 2006-04-21 | Oct ▽ 30 ▽ 2005 ▽ | Nov ▽ 1 ▽ 2005 ▽ | ▽ ▽ ▽ | ▽ ▽ ▽ |
| ☐ response | 2006-04-21 | | | | |

| April | | | 2006 ▽ | | | |
|---|---|---|---|---|---|---|
| Sun | Mon | Tue | Wed | Thu | Fri | Sat |
| 26 | 27 | 28 | 29 | 30 | 31 | 1 |
| 2 | 3 | 4 | 5 | 6 | 7 | 8 |
| 9 | 10 | 11 | 12 | 13 | 14 | 15 |

—Select checkbox of task before selecting these buttons— Select the number of rows to add

[Add Details] [Add Rows Above] [Add Rows Below] [Delete] [3 ▽] [Add Rows At Bottom] [Update]

[Finish]

FIG. 15B

| Task | Member Assignment |
|---|---|
| Planning | |
| Project Initiation | MGR |
| Project Plan | T1 |
| (Enter New Task) | |
| Requirements | T2 |
| Requirements for System | T2 |
| Requirements Matrix for System | |
| (Enter New Task) | T1 |
| Guideline Documents | T1 |
| Design Document Guideline | T3 |
| Code Convention | T3 |
| Implementation and Unit Test Plan Guideline | T3 |
| Procedure for Source Code Control | |
| Organization and Use of Project Directory | |
| Top Level Design | MGR |
| Architecture | T1 |
| Component Interfaces | T2 |
| Database Design | |
| Package Design | |
| New | |
| Class Specification | |
| Guideline Documents | |
| Implementation | |
| Implementation and Unit Test Plan | |
| Iteration 1 | |

[Add Details] [Add Rows Above] [Add Rows Below] 2 [Delete]
[Finish]

| Task | Member Assignment |
|---|---|
| Planning | |
| Project Plan | T1 |
| Project Initiation | MGR |
| Requirements | |
| Requirements for System | T2 |
| Requirements Matrix for System | T2 |
| Guideline Documents | |
| Implementation and Unit Test Plan Guideline | T3 |
| Procedure for Source Code Control | T3 |
| Organization and Use of Project Directory | T3 |
| Design Document Guideline | T1 |
| Code Convention | T1 |
| Top Level Design | |
| Database Design | T2 |
| Component Interfaces | T1 |
| Architecture | MGR |
| Package Design | |

FIG. 22

[Dock] - [Table] TopLevelProjectTask @schedule

[Table] MemberTasks @schedule | [Table] TaskAssignment @schedule | [Table] TopLevelProjectTask @schedule File  Edit  View  Window Import Wizard | Export Wizard | Filter Wizard | Memo | Hex | Image | Sort Ascending | Sort Descending | Remove Sort | Find

| sProjectNumber | nProjectTaskID | sTaskName | setDate | planStart | planEnd | actualStart | actualEnd | nScheduleRevNumber |
|---|---|---|---|---|---|---|---|---|
| J17 | 10 | Planning | 2005-09-19 | 2005-10-03 | 2005-10-14 | (Null) | (Null) | 1 |
| J17 | 20 | Requirements | 2005-09-19 | 2005-10-17 | 2005-10-25 | (Null) | (Null) | 1 |
| J17 | 30 | Guideline Documents | 2005-09-19 | 2005-10-17 | 2005-10-28 | (Null) | (Null) | 1 |
| J17 | 40 | Top Level Design | 2005-09-19 | 2005-10-31 | 2005-11-18 | (Null) | (Null) | 1 |
| J17 | 50 | Package Design | 2005-09-19 | 2005-11-21 | 2005-12-09 | (Null) | (Null) | 1 |

Record 5 of 5 in Page 1

SELECT * FROM 'TopLevelProjectTask' WHERE 'sProjectNumber'='J17' ORDER BY 'nProjectTaskID' LIMIT 0,1000

FIG. 24

| sProjectNumber | nProjectTaskID | sTaskName | nLevel1TaskID | sLevel1TaskName | sMemberLabel | bIsObsoleted |
|---|---|---|---|---|---|---|
| J17 | 10 | Planning | (Null) | (Null) | (Null) | 0 |
| J17 | 10 | Planning | 0 | Project Initiation | MGR | 0 |
| J17 | 10 | Planning | 0 | Project Plan | T1 | 0 |
| J17 | 20 | Requirements | (Null) | (Null) | (Null) | 0 |
| J17 | 20 | Requirements | 0 | Requirements for System | T2 | 0 |
| J17 | 20 | Requirements | 0 | Requirements Matrix for System | T2 | 0 |
| J17 | 30 | Guideline Documents | (Null) | (Null) | (Null) | 0 |
| J17 | 30 | Guideline Documents | 0 | Implementation and Unit Test Plan Guideline | T3 | 0 |
| J17 | 30 | Guideline Documents | 0 | Procedure for Source Code Control | T3 | 0 |
| J17 | 30 | Guideline Documents | 0 | Organization and Use of Project Directory | T3 | 0 |
| J17 | 30 | Guideline Documents | 0 | Code Convention | T1 | 0 |
| J17 | 40 | Top Level Design | 0 | Design Document Guideline | T1 | 0 |
| J17 | 40 | Top Level Design | (Null) | (Null) | (Null) | 0 |
| J17 | 40 | Top Level Design | 0 | Architecture | MGR | 0 |
| J17 | 40 | Top Level Design | 0 | Component Interfaces | T1 | 0 |
| J17 | 40 | Top Level Design | 0 | Database Design | T2 | 1 |
| J17 | 50 | Package Design | (Null) | (Null) | (Null) | 0 |

UPDATE 'TaskAssignment' SET 'nLevel1TaskID'='0' WHERE ('sProjectNumber'='J17') AND ('nProjectTaskID'='30')
AND ('sTaskName'= Guideline Documents')

| sProjectNumber | sMemberName | nProjectTaskID | nLevel1TaskID | sLevel1TaskName | setDate | planStart | planEnd | actualStart | actualEnd | nScheduleRevNumber |
|---|---|---|---|---|---|---|---|---|---|---|
| J17 | T1 | 10 | 13 | Project Plan | 2005-09-19 | 2005-09-19 | 2005-10-06 | (Null) | (Null) | 1 |
| J17 | T1 | 30 | 23 | Code Convention | 2005-09-19 | 2005-10-17 | 2005-10-23 | (Null) | (Null) | 1 |
| J17 | T1 | 30 | 33 | Design Document Guideline | 2005-09-19 | 2005-10-21 | 2005-10-28 | (Null) | (Null) | 1 |
| J17 | T1 | 40 | 43 | Component Interfaces | 2005-09-19 | 2005-10-31 | 2005-11-11 | (Null) | (Null) | 1 |

SELECT * FROM 'Level1MemberTask' WHERE 'sProjectNumber' = 'J17' LIMIT 0,1000

FIG. 31

| sProjectNumber | nLevel1TaskID | nLevel2TaskID | sLevel2TaskName | setDate | planStart | planEnd | actualStart | actualEnd | nScheduleRevNumber |
|---|---|---|---|---|---|---|---|---|---|
| J17 | 13 | 13 | Draft | 2005-09-19 | 2005-10-06 | 2005-10-10 | (Null) | (Null) | 1 |
| J17 | 13 | 23 | Final | 2005-09-19 | 2005-10-10 | 2005-10-13 | (Null) | (Null) | 1 |
| J17 | 23 | 33 | Draft | 2005-09-19 | 2005-10-17 | 2005-10-21 | (Null) | (Null) | 1 |
| J17 | 23 | 43 | Final | 2005-09-19 | 2005-10-21 | 2005-10-23 | (Null) | (Null) | 1 |
| J17 | 33 | 53 | Draft | 2005-09-19 | 2005-10-21 | 2005-10-23 | (Null) | (Null) | 1 |
| J17 | 33 | 63 | Final | 2005-09-19 | 2005-10-23 | 2005-10-28 | (Null) | (Null) | 1 |

SELECT * FROM 'Level2MemberTask' WHERE 'sProjectNumber' = 'J17' ORDER BY 'nLevel1TaskID', 'nLevel2TaskID' LIMIT 0,1000

| sProjectNumber | nProjectTaskID | sTaskName | nLevel1TaskID | sLevel1TaskName | sMemberLabel | bIsObsoleted |
|---|---|---|---|---|---|---|
| J17 | 10 | Planning | (Null) | (Null) | (Null) | 0 |
| J17 | 10 | Planning | 11 | Project Initiation | MGR | 0 |
| J17 | 10 | Planning | 13 | Project Plan | T1 | 0 |
| J17 | 20 | Requirements | (Null) | (Null) | (Null) | 0 |
| J17 | 20 | Requirements | 0 | Requirements for System | T2 | 0 |
| J17 | 20 | Requirements | 0 | Requirements Matrix for System | T2 | 0 |
| J17 | 30 | Guideline Documents | (Null) | (Null) | (Null) | 0 |
| J17 | 30 | Guideline Documents | 0 | Implementation and Unit Test Plan Guideline | T3 | 0 |
| J17 | 30 | Guideline Documents | 0 | Procedure for Source Code Control | T3 | 0 |
| J17 | 30 | Guideline Documents | 0 | Organization and Use of Project Directory | T1 | 0 |
| J17 | 30 | Guideline Documents | 23 | Code Convention | T1 | 0 |
| J17 | 30 | Guideline Documents | 33 | Design Document Guideline | (Null) | 0 |
| J17 | 40 | Top Level Design | (Null) | (Null) | MGR | 0 |
| J17 | 40 | Top Level Design | 0 | Architecture | T1 | 1 |
| J17 | 40 | Top Level Design | 0 | Component Interfaces | T2 | 0 |
| J17 | 40 | Top Level Design | 0 | Database Design | (Null) | 0 |
| J17 | 50 | Package Design | (Null) | (Null) | | |

SELECT * FROM 'TaskAssignment' WHERE 'sProjectNumber' = 'J17' ORDER BY 'nProjectTaskID', 'nLevel1TaskID' LIMIT 0,1000

*FIG. 36*

| sProjectNumber | sMemberName | nLevel1TaskID | nLevel2TaskID | nLevel3TaskID | nLevel4TaskID | bIsObsoleted | bIsCompleted |
|---|---|---|---|---|---|---|---|
| J17 | manager | 11 | (Null) | (Null) | (Null) | | 0 |
| J17 | manager | 11 | 11 | (Null) | (Null) | | 0 |
| J17 | manager | 11 | 21 | (Null) | (Null) | | 0 |
| J17 | manager | 21 | (Null) | (Null) | (Null) | | 0 |
| J17 | manager | 21 | 31 | 11 | (Null) | | 0 |
| J17 | manager | 21 | 31 | 21 | (Null) | | 0 |
| J17 | manager | 21 | 31 | 31 | (Null) | | 0 |
| J17 | test1 | 13 | (Null) | (Null) | (Null) | | 0 |
| J17 | test1 | 13 | 13 | (Null) | (Null) | | 0 |
| J17 | test1 | 13 | 23 | (Null) | (Null) | | 0 |
| J17 | test1 | 23 | (Null) | (Null) | (Null) | | 0 |
| J17 | test1 | 23 | 33 | (Null) | (Null) | | 0 |
| J17 | test1 | 23 | 43 | (Null) | (Null) | | 0 |
| J17 | test1 | 33 | (Null) | (Null) | (Null) | | 0 |
| J17 | test1 | 33 | 53 | (Null) | (Null) | | 0 |
| J17 | test1 | 33 | 63 | (Null) | (Null) | | 0 |
| J17 | test1 | 43 | (Null) | (Null) | (Null) | (Null) | (Null) |

SELECT * FROM 'Member Tasks' WHERE 'sProjectNumber' = 'J17' ORDER BY 'sMemberName', 'nLevel1TaskID', 'nLevel2TaskID'

| sProjectNumber | nLevel1TaskID | nLevel2TaskID | sLevel2TaskName | setDate | planStart | planEnd | actualStart | actualEnd | nScheduleRevNumber |
|---|---|---|---|---|---|---|---|---|---|
| J17 | 11 | 11 | Draft | 2005-09-19 | 2005-09-27 | 2005-10-04 | (Null) | (Null) | 1 |
| J17 | 11 | 21 | Final | 2005-09-19 | 2005-10-04 | 2005-10-07 | (Null) | (Null) | 1 |
| J17 | 13 | 13 | Draft | 2005-09-19 | 2005-10-06 | 2005-10-10 | (Null) | (Null) | 1 |
| J17 | 13 | 23 | Final | 2005-09-19 | 2005-10-10 | 2005-10-13 | (Null) | (Null) | 1 |
| J17 | 21 | 31 | New Disclosure for Project | 2005-09-19 | 2005-09-20 | 2005-09-30 | (Null) | (Null) | 1 |
| J17 | 23 | 33 | Draft | 2005-09-19 | 2005-10-17 | 2005-10-21 | (Null) | (Null) | 1 |
| J17 | 23 | 43 | Final | 2005-09-19 | 2005-10-21 | 2005-10-23 | (Null) | (Null) | 1 |
| J17 | 33 | 53 | Draft | 2005-09-19 | 2005-10-21 | 2005-10-23 | (Null) | (Null) | 1 |
| J17 | 33 | 63 | Final | 2005-09-19 | 2005-10-23 | 2005-10-28 | (Null) | (Null) | 1 |

DELETE FROM 'Level2MemberTask' WHERE ('sProjectNumber'='J17') AND ('nLevel1TaskID'='11') AND ('nLevel2TaskID'='21') AND ('sLevel2TaskName'='Final') AND

*FIG. 39*

| [Dock] - [Table] Level3MemberTask @schedule | | | | | | | |
|---|---|---|---|---|---|---|---|
| [Table] Level1MemberTask@schedule | [Table] MemberTasks@schedule | [Table] ProjectTeam@schedule | [Table] TaskAssignment@schedule | [Table] Level... | | | |

File Edit View Window

Import Wizard | Export Wizard | Filter Wizard | Memo | Hex | Image | Sort Ascending | Sort Descending | Remove Sort | Find

| sProjectNumber | nLevel2TaskID | nLevel3TaskID | sLevel4TaskName | setDate | planStart | planEnd | actualStart | actualEnd | nScheduleRevNumber |
|---|---|---|---|---|---|---|---|---|---|
| ▷ J17 | 31 | 11 | Drawing | 2005-09-19 | 2005-09-20 | 2005-09-23 | (Null) | (Null) | 1 |
| J17 | 31 | 21 | Specifications | 2005-09-19 | 2005-09-23 | 2005-09-28 | (Null) | (Null) | 1 |
| J17 | 31 | 31 | Claims | 2005-09-19 | 2005-09-28 | 2005-09-30 | (Null) | (Null) | 1 |

Record 1 of 3 in Page 1

SELECT * FROM 'Level3MemberTask' WHERE 'sProjectNumber' = 'J17' ORDER BY 'nLevel3TaskID' LIMIT 0,1000

*FIG. 40*

| sProjectNumber | sMemberName | sMemberLabel | nMemberRole | nMemberTaskID | sMemberDirectory | nLevel1MaxTaskID | nLevel2MaxTaskID | nLevel3MaxTaskID | nLevel4MaxTaskID |
|---|---|---|---|---|---|---|---|---|---|
| J17 | admin | ADM | 3 | 2 | /ScheduleWebSite/admin | (Null) | (Null) | (Null) | (Null) |
| J17 | test1 | T1 | 2 | 3 | /ScheduleWebSite/test1 | 43 | 63 | 3 | 3 |
| J17 | test2 | T2 | 2 | 4 | /ScheduleWebSite/test2 | (Null) | (Null) | (Null) | (Null) |
| J17 | test3 | T3 | 2 | 5 | /ScheduleWebSite/test3 | (Null) | (Null) | (Null) | (Null) |
| J17 | test4 | T4 | 2 | 6 | /ScheduleWebSite/test4 | (Null) | (Null) | (Null) | (Null) |
| J17 | test5 | T5 | 2 | 7 | /ScheduleWebSite/test5 | (Null) | (Null) | (Null) | (Null) |
| J17 | manager | MGR | 3 | 1 | /ScheduleWebSite/manager | 21 | 31 | 31 | 1 |

UPDATE 'ProjectTeam' SET 'sMemberDirectory'='/ScheduleWebSite/test5' WHERE ('sProjectNumber'='J17') AND ('sMemberName'=test5') AND ('sMemberLabel'='T5') AND ('nMember

| sProjectNumber | sMemberLabel | nProjectTaskID | sLevel1TaskID | sLevel1TaskName | set Date | planStart | planEnd | actualStart | actualEnd | nScheduleRevNumber |
|---|---|---|---|---|---|---|---|---|---|---|
| J17 | MGR | 0 | 21 | Patent Case | 2005-09-19 | 2005-09-20 | 2005-09-30 | (Null) | (Null) | 1 |
| J17 | MGR | 10 | 11 | Project Initiation | 2005-09-19 | 2005-09-27 | 2005-10-07 | (Null) | (Null) | 1 |
| J17 | MGR | 10 | 11 | Project Initiation | 2005-09-20 | 2005-09-20 | 2005-09-29 | 2005-09-20 | (Null) | 2 |
| J17 | MGR | 40 | 31 | Architecture | 2005-09-20 | 2005-10-04 | 2005-10-12 | (Null) | (Null) | 1 |
| J17 | T1 | 10 | 13 | Project Plan | 2005-09-19 | 2005-10-06 | 2005-10-13 | (Null) | (Null) | 1 |
| J17 | T1 | 30 | 23 | Code Convention | 2005-09-19 | 2005-10-17 | 2005-10-23 | (Null) | (Null) | 1 |
| J17 | T1 | 30 | 33 | Design Document Guideline | 2005-09-19 | 2005-10-21 | 2005-10-28 | (Null) | (Null) | 1 |
| J17 | T1 | 40 | 43 | Component Interfaces | 2005-09-19 | 2005-10-31 | 2005-11-11 | (Null) | (Null) | 1 |

DELETE FROM 'Level1MemberTask' WHERE ('sProjectNumber'='J17') AND ('sMemberLabel'='MGR') AND ('nProjectTaskID'='0')
AND ('nLevel1TaskID'='41') AND ('sLevel1TaskName'='RSID

J17 Project Task Schedule Editor

| Task | | Set Date | Planned Start Date | Planned End Date | Actual Start Date | Actual End Date |
|---|---|---|---|---|---|---|
| ☐ Planning | | 2005-09-19 | 2005-10-03 | 2005-10-14 | | |
| | MGR Project Initiation | 2005-09-20 | 2005-09-20 | 2005-09-29 | 2005-09-20 | 2005-09-20 |
| | T1 Project Plan | 2005-09-19 | 2005-10-06 | 2005-10-13 | | |
| ☐ Requirements | | 2005-09-19 | 2005-10-17 | 2005-10-25 | | |
| ☐ Guideline Documents | | 2005-09-19 | 2005-10-17 | 2005-10-28 | | |
| | T1 Code Convention | 2005-09-19 | 2005-10-17 | 2005-10-23 | | |
| | Design Document Guideline | 2005-09-19 | 2005-10-21 | 2005-10-28 | | |
| ☐ Top Level Design | | 2005-09-19 | 2005-10-31 | 2005-11-18 | | |
| | MGR Architecture | 2005-09-20 | 2005-10-04 | 2005-10-12 | | |
| | T1 Component Interfaces | 2005-09-19 | 2005-10-31 | 2005-11-11 | | |
| ☐ Package Design | | 2005-09-19 | 2005-11-21 | 2005-12-09 | | |

[Add Rows Above] [Add Rows Below] 3 ▾ [Delete] [Consolidate]

[Finish]

FIG. 47

J17 Project Task Schedule Editor

| Task | | Set Date | Planned Start Date | Planned End Date | Actual Start Date | Actual End Date |
|---|---|---|---|---|---|---|
| ☐ Planning | | 2005-09-20 | 2005-09-20 | 2005-10-13 | 2005-09-20 | |
| MGR | Project Initiation | 2005-09-20 | 2005-09-20 | 2005-09-29 | 2005-09-20 | |
| T1 | Project Plan | 2005-09-19 | 2005-10-06 | 2005-10-13 | | |
| ☐ Top Level Design | | 2005-09-20 | 2005-10-04 | 2005-11-11 | | |
| MGR | Architecture | 2005-09-20 | 2005-10-04 | 2005-10-12 | | |
| T1 | Component Interfaces | 2005-09-19 | 2005-10-31 | 2005-11-11 | | |
| ☐ Requirements | | 2005-09-19 | 2005-10-17 | 2005-10-25 | | |
| ☐ Guideline Documents | | 2005-09-19 | 2005-10-17 | 2005-10-28 | | |
| T1 | Code Convention | 2005-09-19 | 2005-10-17 | 2005-10-23 | | |
| | Design Document Guideline | 2005-09-19 | 2005-10-21 | 2005-10-28 | | |
| ☐ Package Design | | 2005-09-19 | 2005-11-21 | 2005-12-09 | | |

[Add Rows Above] [Add Rows Below] 3 [Delete] [Consolidate]

[Finish]

FIG. 48

| sProjectNumber | nProjectTaskID | sTaskName | set Date | planStart | planEnd | actualStart | actualEnd | nScheduleRevNumber |
|---|---|---|---|---|---|---|---|---|
| J17 | 10 | Planning | 2005-09-19 | 2005-09-19 | 2005-10-03 | (Null) | (Null) | 1 |
| J17 | 10 | Planning | 2005-09-19 | 2005-09-20 | 2005-10-13 | 2005-09-20 | (Null) | 2 |
| J17 | 20 | Requirements | 2005-09-19 | 2005-10-17 | 2005-10-25 | (Null) | (Null) | 1 |
| J17 | 30 | Guideline Documents | 2005-09-19 | 2005-10-17 | 2005-10-28 | (Null) | (Null) | 1 |
| J17 | 40 | Top Level Design | 2005-09-19 | 2005-10-31 | 2005-11-18 | (Null) | (Null) | 1 |
| J17 | 40 | Top Level Design | 2005-09-20 | 2005-10-04 | 2005-11-11 | (Null) | (Null) | 2 |
| J17 | 50 | Package Design | 2005-09-19 | 2005-11-21 | 2005-12-09 | (Null) | (Null) | 1 |

SELECT * FROM 'TopLevelProjectTask' WHERE 'sProjectNumber' = 'J17' ORDER BY 'nProjectTaskID' LIMIT 0,1000

*FIG. 49*

| Task | Set Date | Planned Start Date |
|---|---|---|
| Row Element<br>id= xxx + "_RowID" | | |
| Task Cell Element<br>id= xxx + "_TaskCellID" | Set Date Cell Element<br>id= xxx + "_SetDateCellID" | Planned Start Cell Element<br>id= xxx + "_PlanStartCellID" |
| Checkbox Element<br>id= xxx + "_CheckBoxID"<br>name= xxx + "_CheckBox"<br>value= xxx<br>onclick = setSelectedRow() | Hidden Element<br>id= xxx + "_SetDateID"<br>name= xxx + "_SetDate"<br>value= set date | Hidden Element<br>id= xxx + "_PlanStartID"<br>name= xxx + "_PlanStart"<br>value= plan start |
| Hidden Element<br>id= xxx + "ID"<br>name= xxx<br>value= xxx | Strike Through Element with text and line break for previous set date<br>Text with set date | Strike Through Element with text and line break for previous plan start. |
| Hidden Element<br>id= xxx + "_ActionTakenID"<br>name= xxx + "_ActionTaken"<br>value= action taken | | Selection Element<br>name= xxx + "_PlanStartMonth" |
| | | Selection Element<br>name= xxx + "_PlanStartDay" |
| Hidden Element<br>id= xxx + "_LevelTaskIDID"<br>name= xxx + "_LevelTaskID"<br>value= task ID | | Selection Element<br>name= xxx + "_PlanStartYear" |
| Hidden Element<br>id= xxx + "_ParentIDID"<br>name= xxx + "_ParentID"<br>value= parent task ID | | |
| Hidden Element<br>id= xxx + "_TaskRevNumberID"<br>name= xxx + "_TaskRevNumber"<br>value= task rev number | | |
| Hidden Element<br>id= xxx + "_TaksNameID"<br>name= xxx + "_TaskName"<br>value= task name | | |
| Hidden Element<br>id= xxx + "_TaskLevelID"<br>name= xxx + "_TaskLevel"<br>value= task level (1,2,3,4) | | |
| Selection Element<br>id= xxx + "_TaskSelectID"<br>name= xxx + "_ProjectTask"<br>onchange = updateTaskCell()<br>Text with the task name.<br>Selecting "New" or Project Task from Selection | | |
| Input Text Element<br>id= xxx + "_InputTaskID"<br>value= "(Enter New Task)" initial value<br>Text with the task name inputted through input text element or selected from project task selection element. | | |

*FIG. 55A*

CONSOLIDATION OF MEMBER SCHEDULES WITH A PROJECT SCHEDULE IN A NETWORK-BASED MANAGEMENT SYSTEM

CROSS REFERENCE TO RELATED APPLICATIONS

This application is related to U.S. patent application Ser. No. 11/449,116, entitled "Use Of Schedule Editors In A Network-Based Project Schedule Management System". filed Jun. 7 2006; U.S. patent application Ser. No. 11/449,133, entitled "Use of a Database In A Network-Based Project schedule Management System", filed Jun. 7, 2006; U.S. patent application Ser. No. 09/881,250, entitled "Automated Management Of Development Project Files Over A Network" filed June 13, 2001; and U.S. patent application Ser. No. 10/059,694, entitled "Project Management Over A Network With Automated Task Schedule Update" filed Jan. 28, 2002; the content of all of which are incorporated by reference in their entirety for all purposes as if fully disclosed herein.

FIELD OF THE INVENTION

The present invention relates generally to project management and, more specifically, to the consolidation of individual member schedules with a project schedule in a network-based development schedule management system.

BACKGROUND OF THE INVENTION

Product development projects typically require significant effort to monitor and manage. Furthermore, computer software development projects are inherently difficult to manage. This difficulty is partly due to the large number of tasks and associated deliverables that comprise a software package and the vastness of paperwork and project files associated with these tasks and deliverables. Another contributing factor are the complex interdependencies established between individual tasks and deliverables during the development cycle of a software package. Yet another contributing factor is the need to generate and maintain a design specification associated with the software being developed.

Management of development projects typically includes organizing, maintaining, and controlling access to project documents, schedules, and the like. Furthermore, there are often multiple development projects occurring concurrently within an enterprise organization, thus significantly expanding the document management efforts. Historically, management of a master project schedule entails, among other tasks, manually entering data into a scheduling application, manually creating links between schedules, and manually aggregating individual developers' task schedules into the master project schedule. These are cumbersome and error-prone tasks, with little to no oversight and quality control.

A master project schedule is often in a state of flux, whereby management solicits the developers for task statuses and related schedule updates. Often, the feedback provided to management by the developers has little oversight and is not according to a rigid policy, procedure, or verification process. Thus, the actual status of a project schedule is often difficult to ascertain since the progress of individual tasks are dictated by subjective, and often self-supporting, progress reports by those individuals that are assigned to the task.

Public and private networks provide a useful and simple communication mechanism for members of a project team to obtain all the information related to a project. Maintaining web pages associated with the schedules of a project and of project members allows members of a project team to easily access the schedule to determine the status of the project. However, the tasks involved with creating and updating schedules for individual members of a project team and the tasks involved with consolidating all the schedules of individual members into a single project schedule are not trivial.

Previously, all the schedules were created manually using an HTML editor. First, the project manager would create the overall project schedule showing the major project tasks. The project tasks would be divided into subtasks and the subtasks would be informally assigned to members of a project team. Then, each member of a project team would create a member schedule, and there was no uniformity in the format of the individual member schedules. From all the members' schedules, the project manager would aggregate all the subtasks schedules associated with the project schedule and update the overall project schedule. Furthermore, all schedules would maintain a history of all the schedules of the tasks. With a small group, scheduling is tedious. With a large group, scheduling is complicated as well as tedious, especially the aggregation of all the subtask schedules with the project task schedules.

In view of the foregoing, there is a need for automating the assignment of specific tasks to project members, and automating the tasks involved with creating individual and project schedules.

SUMMARY OF EMBODIMENTS OF THE INVENTION

A system described herein can be used for the creation, maintenance, and management of an overall project schedule, of individual project member schedules, and of project task assignments over a network. According to one aspect of the invention, HTML editors are used to create and update tables for the project schedule and project member schedules. The schedules contain a list of project tasks (and detailed tasks or subtasks of project tasks) with the expected start and end dates (planned dates) and the true start and end dates (actual dates). The value of the schedule does not end when the project is completed because it contains important information that is used for estimating the schedules for tasks in future projects.

The system comprises three editors accessed through a web browser to perform the various tasks by members of a project. Information is passed between a web server and web browser and a database is used to maintain all information. The project manager can use a task assignment editor to assign tasks to individual project members. The project manager can use a project schedule editor to initially create the project schedule and to show the overall project schedule. After the project schedule is created, each project member can create their own member schedule using a member schedule editor, containing tasks related to the project schedule. After project members complete a task, the project member updates the member's schedule via the member schedule editor. After the completion of all the subtasks of a project task, the project manager needs to consolidate all the members' schedules with the project schedule in order to update the project schedule. The project schedule needs to be updated with new planned dates and actual dates from the members' schedules, where the members' schedules contain a history of the changes in the schedule.

Managing and maintaining the project schedule requires consolidation, or aggregation, of all the members' schedules. The members' schedules contain a history of the changes that have occurred in the overall project schedule. The management and maintenance of the schedules is typically a tedious process, so the described system provides for automatically consolidating the members' schedules with the project schedule via a group of linked database tables.

BRIEF DESCRIPTION OF THE DRAWINGS

The present invention is illustrated by way of example, and not by way of limitation, in the figures of the accompanying drawings and in which like reference numerals refer to similar elements and in which:

FIG. 2A is a screenshot of a project schedule editor, according to an embodiment of the invention;

FIG. 3A is a screenshot of a individual schedule editor, according to an embodiment of the invention;

FIG. 3B is a screenshot of a sample of a member's schedule web page, according to an embodiment of the invention;

FIG. 15A is a screenshot illustrating a member schedule editor in which some of the schedules of the tasks were modified, according to an embodiment of the invention;

FIG. 15B is a screenshot illustrating the member schedule editor that results from the "Update" being selected after the modifications in FIG. 15A, according to an embodiment of the invention;

FIG. 20 is a screenshot illustrating a sample task assignment editor session, according to an embodiment of the invention;

FIG. 21 is a screenshot illustrating information that is stored in the TaskAssignment table when the member selects the "Finish" button of the task assignment editor, according to an embodiment of the invention;

FIG. 22 is a screenshot illustrating a web page created after a task assignment editor session, according to an embodiment of the invention;

FIG. 24 is a screenshot illustrating information that is stored in the TopLevelProjectTask table when the member selects the "Finish" button of the project schedule editor, according to an embodiment of the invention;

FIG. 25 is a screenshot illustrating information that is stored in the TaskAssignment table when the member selects the "Finish" button of the project schedule editor, according to an embodiment of the invention;

FIG. 27 is a screenshot illustrating a sample member schedule editor session for a project member, according to an embodiment of the invention;

FIG. 28 is a screenshot illustrating a result of the "Update" button being selected, according to an embodiment of the invention;

FIG. 29 is a screenshot illustrating information that is updated in the TaskAssignment table when the member selects the "Finish" button of the member schedule editor, according to an embodiment of the invention;

FIG. 31 is a screenshot illustrating information that is added to the Level1MemberTask table when the member selects the "Finish" button of the member schedule editor, according to an embodiment of the invention;

FIG. 32 is a screenshot illustrating information that is added to the Level2MemberTask table when the member selects the "Finish" button of the member schedule editor, according to an embodiment of the invention;

FIG. 34 is a screenshot illustrating a sample member schedule editor session for the project member manager, according to an embodiment of the invention;

FIG. 35 is a screenshot illustrating a result of the "Update" button being selected, according to an embodiment of the invention;

FIG. 36 is a screenshot illustrating information that is updated in the TaskAssignment table when the member selects the "Finish" button of the member schedule editor, according to an embodiment of the invention;

FIG. 37 is a screenshot illustrating information that is added to the MemberTasks table when the member selects the "Finish" button of the member schedule editor, according to an embodiment of the invention;

FIG. 38 is a screenshot illustrating information that is added to the Level1MemberTask table when the member selects the "Finish" button of the member schedule editor, according to an embodiment of the invention;

FIG. 39 is a screenshot illustrating information that is added to the Level2MemberTask table when the member selects the "Finish" button of the member schedule editor, according to an embodiment of the invention;

FIG. 40 is a screenshot illustrating information that is added to the Level3MemberTask table when the member selects the "Finish" button of the member schedule editor, according to an embodiment of the invention;

FIG. 42 is a screenshot illustrating entries in the ProjectTeam table after two member schedule editor sessions, according to an embodiment of the invention;

FIG. 43 is a screenshot illustrating a sample member schedule editor session with the project member manager, according to an embodiment of the invention;

FIG. 44 is a screenshot illustrating information that is added to the Level1MemberTask table when the member selects the "Finish" button of the member schedule editor, according to an embodiment of the invention;

FIG. 45 is a screenshot illustrating information that is added to the Level2MemberTask table when the member selects the "Finish" button of the member schedule editor, according to an embodiment of the invention;

FIG. 47 is a screenshot illustrating a sample of a session with the project schedule editor, according to an embodiment of the invention;

FIG. 48 is a screenshot illustrating a project schedule editor redisplayed after the member selects the "Consolidate" button, according to an embodiment of the invention;

FIG. 49 is a screenshot illustrating information that is stored in the TopLevelProjectTask table when the member selects the "Consolidate" and "Finish" buttons of the project schedule editor, according to an embodiment of the invention;

DETAILED DESCRIPTION OF THE INVENTION

Techniques for consolidating individual member schedules with a project schedule in a network-based project schedule management system are described. The techniques are described herein primarily in reference to a software development project, but those skilled in the art should recognize that the benefits of the invention are also available when applying the techniques to other development projects. In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Task Assignment Editor

Figure 1A:
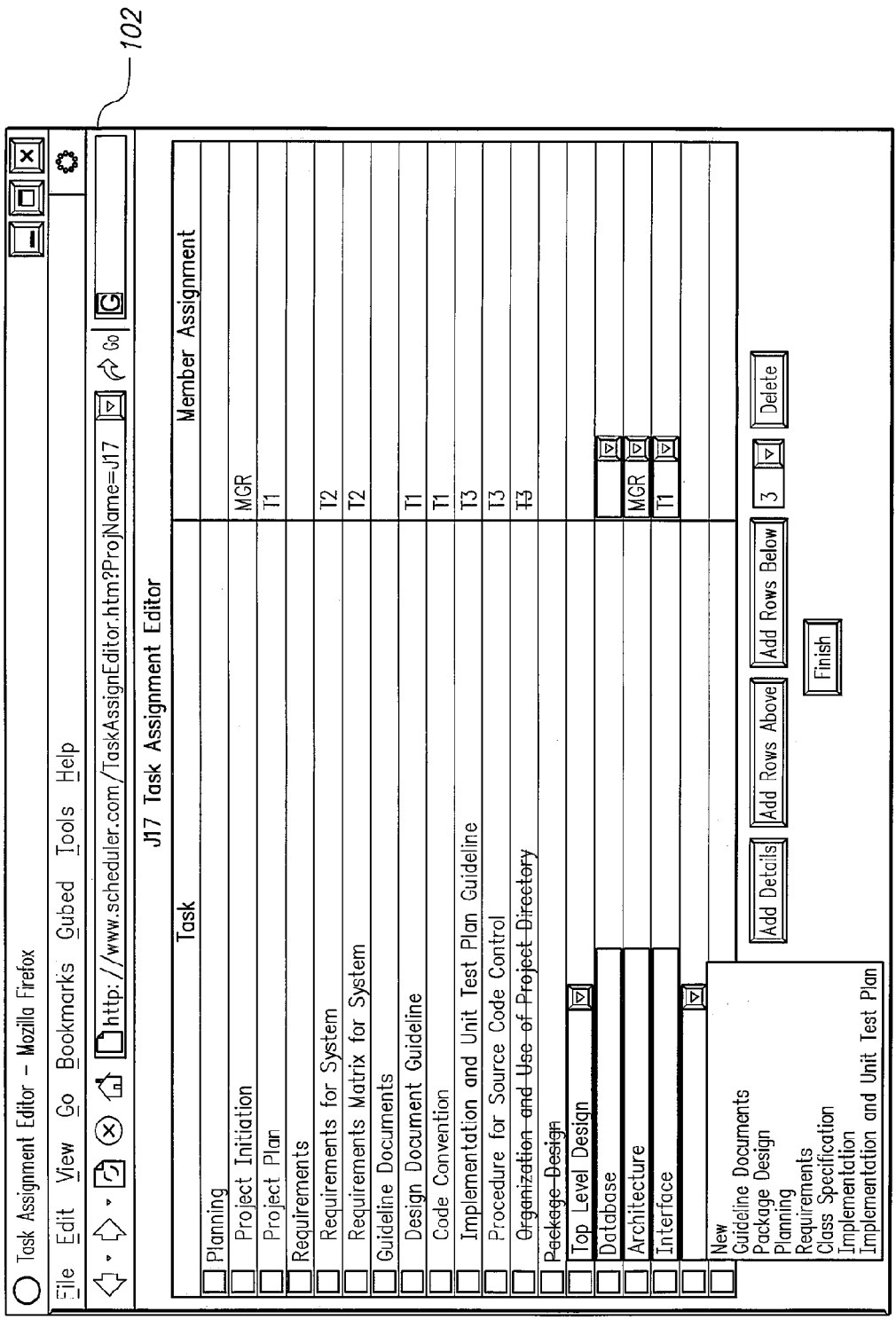
FIG. 1A is a screenshot of a task assignment editor, according to an embodiment of the invention.

FIG. 1A is a screenshot of a task assignment editor, according to an embodiment of the invention. The task assignment editor 102 assists users in creating the project tasks that are to be completed in a project. With some organizations, there are default project tasks that are common to all projects that will be performed in association with the organization. Associated with the project tasks are subtasks which are assigned to project members. Typically, a project manager sets and assigns tasks to project members. The project manager can use this task assignment editor 102 to set up the project tasks for a project, create the subtasks for each project task, and assign the subtasks to the members. Information about the task assignment is stored and maintained in the task assignment editor 102 while the project manager is adding and assigning tasks. Upon the manager completing a session with the task assignment editor 102, the task assignment information is passed to, stored in, and maintained in a database.

Figure 1B:
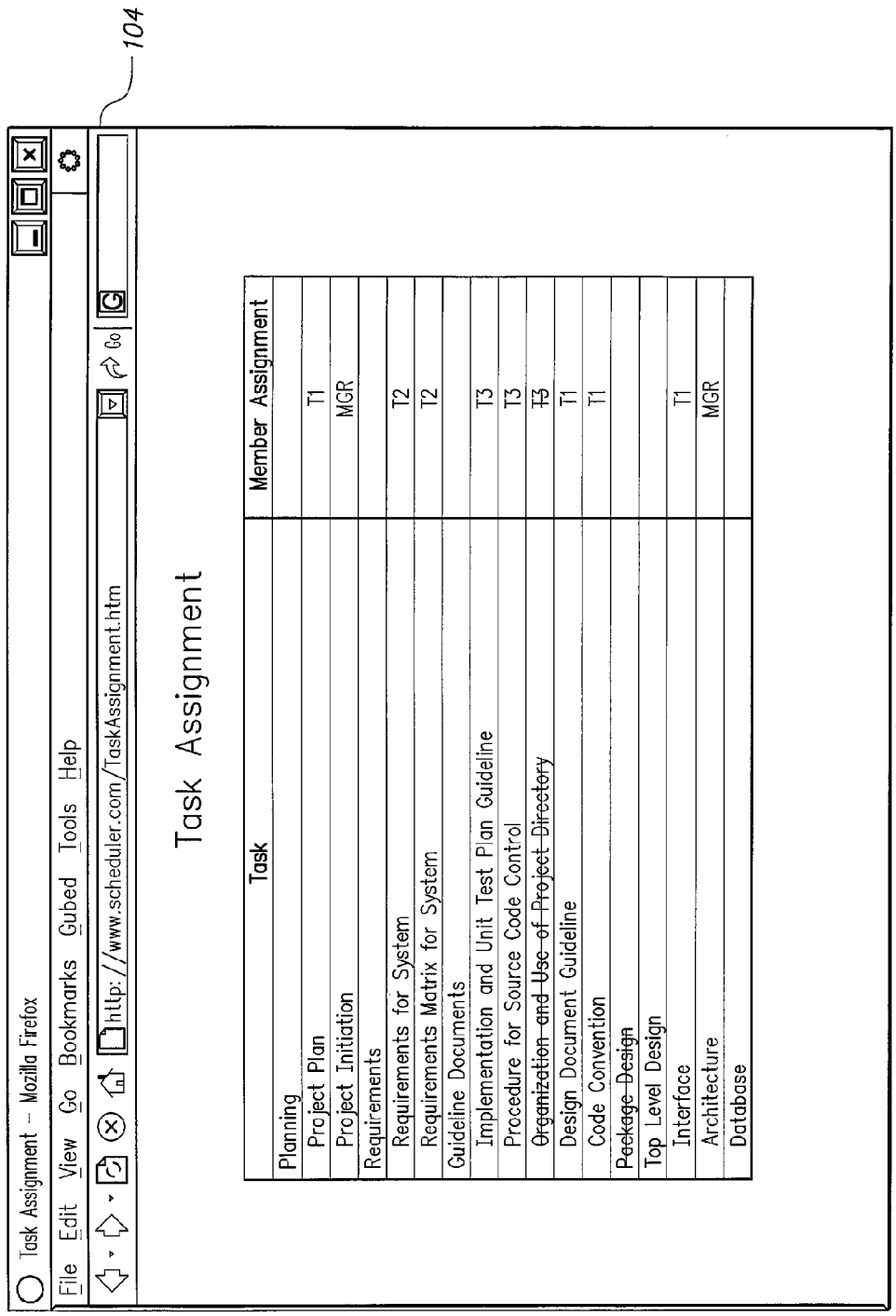
FIG. 1B is a screenshot of a sample of a task assignment web page, according to an embodiment of the invention.

In response to completion of a task assignment session, such as in response to a user selecting the "Finish" button on the task assignment editor 102 of FIG. 1A, a task assignment web page 104 is automatically created, at the web server, for displaying the tasks that are assigned to various project members. FIG. 1B is a screenshot of a sample of a task assignment web page, according to an embodiment of the invention. Task and task assignment information entered and edited via the task assignment editor 102 is displayed in a form in a web page when displayed in a web browser. All the tasks and the assignment of tasks are stored within one or more database tables, where each row preferably corresponds to a task, and displayed in the task assignment editor 102 and the task assignment web page 104.

According to one embodiment, the task assignment editor 102 (FIG. 1A) includes buttons (e.g., Add Details, Add Rows Above, Add Rows Below, Delete, and Finish) usable to perform various operations. The "Finish" button completes the editor session and submits the task assignment information to be stored and maintained in the database. The other buttons perform a respective operation on a task that must be selected by selecting the checkbox in the row corresponding to the task. An "Add Details" button adds rows beneath a project task so the manager can add and assign subtasks to project members. "Add Rows Above" and "Add Rows Below" buttons add rows above and below the row corresponding to the selected task (either project task or subtask) so the manager can add more project tasks or add and assign more subtasks. The number of rows added is set by a "number of rows" menu selection that is next to the "Add Rows Below" button. The "Delete" button deletes the selected task, and removes a project task from the project or removes the assignment of subtasks to a project member. The task assignment editor 102 and task assignment web page 104 are described in greater detail elsewhere herein.

Project Schedule Editor

FIG. 2A is a screenshot of a project schedule editor, according to an embodiment of the invention. The project schedule editor 202 is used to set the schedule for the project tasks that are created in the task assignment editor 102 (FIG. 1A). A project task may be created and scheduled in the project schedule editor 202. However, in one embodiment, subtasks cannot be added to the project tasks to assign them to project members using the project schedule editor 202. Most likely, the project manager will use the project schedule editor 202 after the task assignment editor 102. The manager can use the project schedule editor 202 to set the initial project schedule for the major project tasks added in the task assignment editor 102. Information about the scheduling of project tasks is stored and maintained in the project schedule editor 202 while the project manager is adding and scheduling tasks. Upon the manager completing a project schedule editor session, the schedule information for the project tasks is passed, stored, and maintained in the database.

In response to completion of a project schedule session, such as in response to a user selecting the "Finish" button on the project schedule editor 202 of FIG. 2A, a project schedule web page 204 is automatically created, at the web server, for displaying a table for the project schedule. If the individual project members' schedules are created and/or updated for the project subtasks, the project schedule editor 202 displays each project task schedule along with all the subtask schedules. The project schedule editor 202 shows the subtasks with the project member to whom it was assigned. By completing the editor session or by selecting "Consolidate" on the project schedule editor 202 of FIG. 2A, all the subtask schedules for each project task are automatically consolidated or aggregated to update the schedule for the project task, and the project task schedule is updated in the database.

Figure 2B:
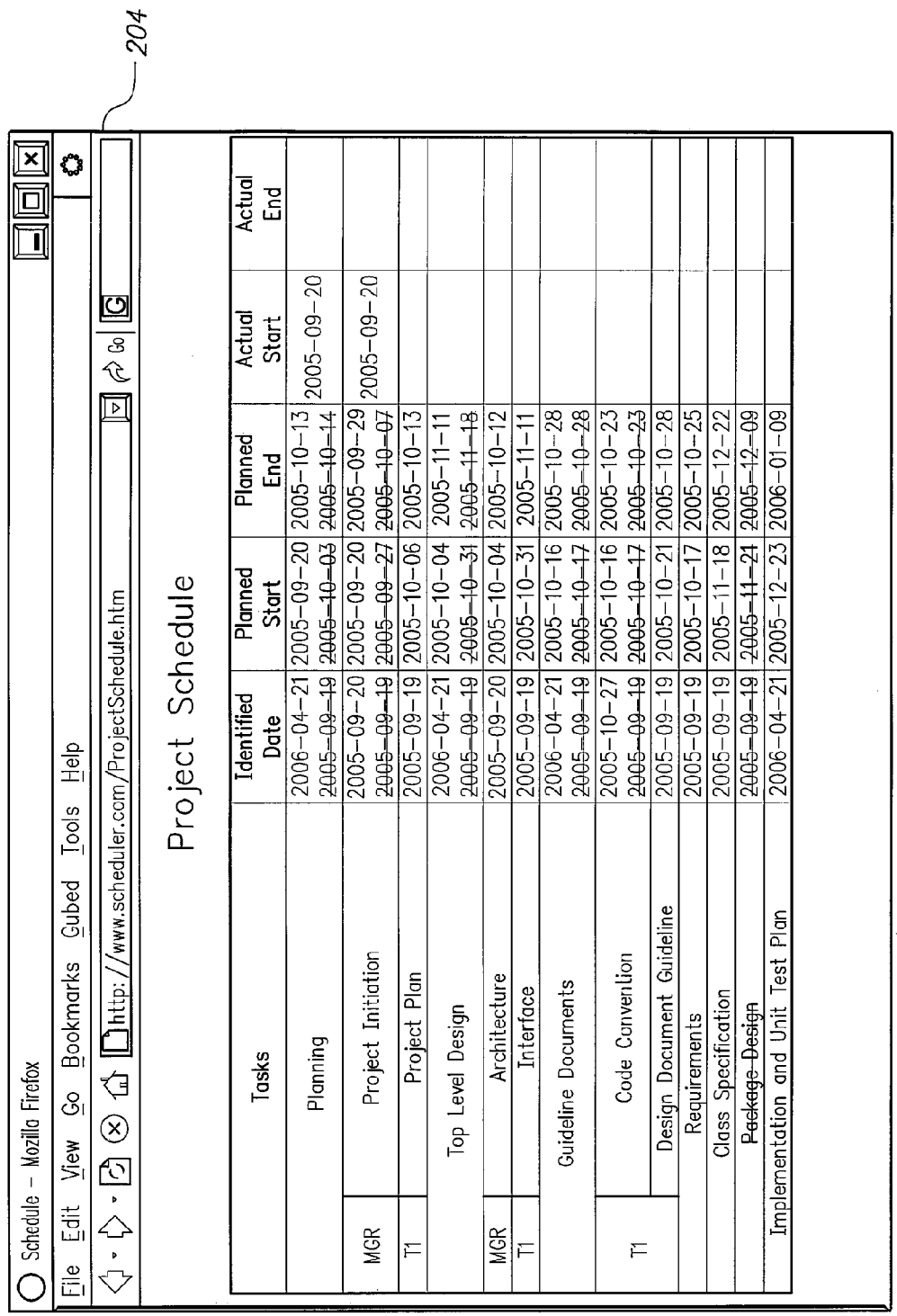
FIG. 2B is a screenshot of a sample of a project schedule web page, according to an embodiment of the invention.

FIG. 2B is a screenshot of a sample of a project schedule web page, according to an embodiment of the invention. The project schedule web page 204 is created for displaying the schedule of the project tasks and its subtasks along with the member to whom a task or subtask is assigned. The project schedule web page 204 shows all the previous, i.e., obsolete, schedules (e.g., with strikethrough of previous dates) of each project task and subtask so that the project team can see the changes that occur in the schedule of a task. Project schedule information entered and edited via the project schedule editor 202 is displayed in a form in a web page when displayed in a web browser. All the project tasks' schedules and the subtasks' schedules are stored within one or more database tables, where each row preferably corresponds to a task, and displayed in the project schedule editor 202 and the project schedule web page 204.

According to one embodiment, the project schedule editor 202 (FIG. 2A) includes buttons buttons (Add Rows Above, Add Rows Below, Delete, Consolidate, and Finish) which perform various operations. The "Finish" and "Consolidate" buttons complete the project schedule editor session and submit the project task schedule information to be stored and maintained in the database. The "Consolidate" button causes the members' schedules to be consolidated with the project schedule so that the project schedule is updated in the database. The "Consolidate" button causes the project schedule editor to be redisplayed in the project schedule web page with updated task schedules. The other buttons perform a respective operation on a task that is selected by selecting the checkbox in the row corresponding to the task. The operations can only be performed on project tasks and not the subtasks which are assigned to members. "Add Rows Above" and "Add Rows Below" buttons add rows above and below the row corresponding to the selected project so the manager can add more project tasks and set the schedules for the tasks. The number of rows added is set by the "number of rows" menu selection that is next to the "Add Rows Below" button. The "Delete" button deletes the selected project task. The project schedule editor 202 and the project schedule web page 204 are described in greater detail elsewhere herein.

Member Schedule Editor

Figure 3A:
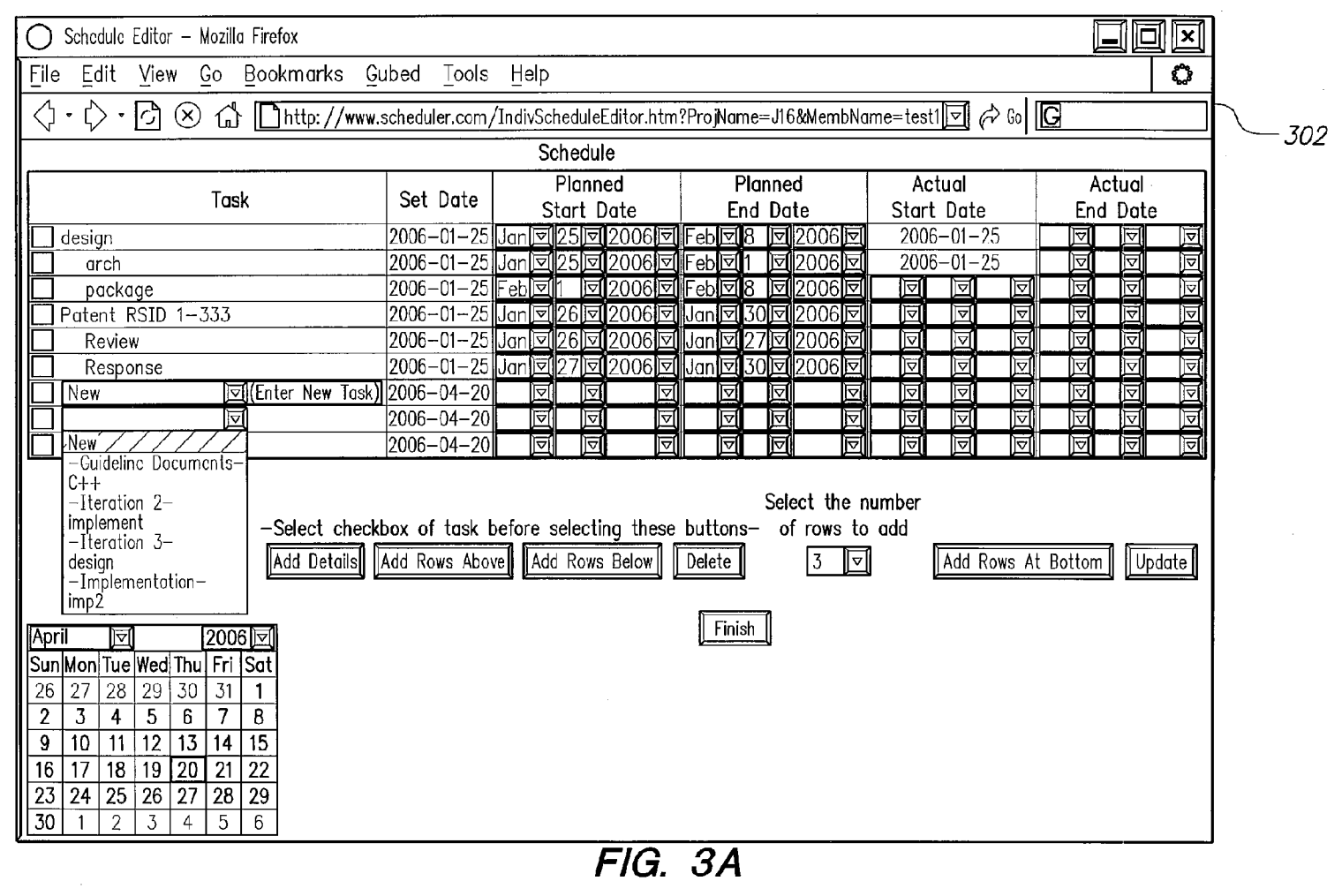

FIG. 3A is a screenshot of a member schedule editor, according to an embodiment of the invention. The member schedule editor 302 (also referred to as "individual schedule editor") is used to create a schedule for an individual project member. According to one embodiment, the member schedule editor 302 displays only uncompleted tasks if the member schedule was previously created. The tasks of a member can be project subtasks and/or tasks unrelated to the project. The member can set the schedule, change the schedule, and update the results for a task via the member schedule editor 302. Each of the tasks of a member can be broken down into lower level tasks to schedule the minute details of the task. The addition or modification of lower level tasks may affect the schedule of the upper level task. Therefore, the upper level tasks schedules are updated when the "Update" button is selected. Information about the scheduling of tasks is stored and maintained in the member schedule editor 302 while the member is adding or modifying task schedules. Upon a member finishing an member schedule editor 302 session, the task schedule information is passed, stored, and maintained in the database. FIG. 3A shows the assigned tasks in the drop down list.

In response to completion of a member schedule session, such as in response to a user selecting the "Finish" button on the member schedule editor 302 of FIG. 3A, an member schedule web page 304 (labeled "Task Schedule" in the screen shot of FIG. 3B) is automatically created, at the web server, for displaying a table for the member schedule. FIG. 3B is a screenshot of a sample of a member's schedule web page, according to an embodiment of the invention. Individual schedule information entered and edited via the member schedule editor 302 is displayed in a form in a web page when displayed in a web browser. All the tasks' schedules are displayed within a table where each row corresponds to a task. The member schedule web page 304 shows the previous schedules (e.g., with strikethrough of previous dates) of each project task and subtask so that the project team can see the changes that occur in the schedule of a task.

In member schedule editor 302, buttons (Add Details, Add Rows At Bottom, Add Rows Above, Add Rows Below, Delete, Update, and Finish) are positioned near the table, which are used to perform various respective operations. The "Finish" button completes the member schedule editor session and submits the task schedule information to be stored and maintained in the database. Except for the "Update" button and the "Add Rows At Bottom" button, the other buttons perform an operation on a task that is selected by selecting the checkbox in the row corresponding to the task. The "Add Details" button adds rows beneath a task so the member can add subtasks (a task one level lower) to a task to give more details of the task. "Add Rows Above" and "Add Rows Below" buttons add rows above and below the row corresponding to the selected task so the member can add more tasks to the schedule at the same level. The number of rows added is set by the "number of rows" menu selection that is next to the "Add Rows Below" button. The "Delete" button deletes the selected task. The "Delete" button also removes a task, and all lower level tasks associated with the task, from the member's schedule. The "Add Rows At Bottom" button adds one or more highest level rows to the bottom of the schedule where the number of rows added is set in the "number of rows" menu selection. The "Update" button updates all the upper level task schedules with the lower level task schedules and updates the display of the member schedule editor 302 to show the new dates. The member schedule editor 302 and the member schedule web page 304 are described in greater detail elsewhere herein.

The schedule information for a task includes the plan start and end dates and the actual start and end dates. The plan and actual dates can be set and modified for tasks in the member schedule editor 302. However, only the plan dates can be set for the project tasks in the project schedule editor 202 (FIG. 2A) when the task is scheduled for the first time. The plan dates are automatically updated and the actual dates are automatically set based on the information in the members' schedule for the plan and actual dates of the project subtask, when consolidated. Information in the database is used to update the actual dates of the project task when the project manager either completes a project editor session or via the "Consolidate" button of the project schedule editor 202.

Figure 4:
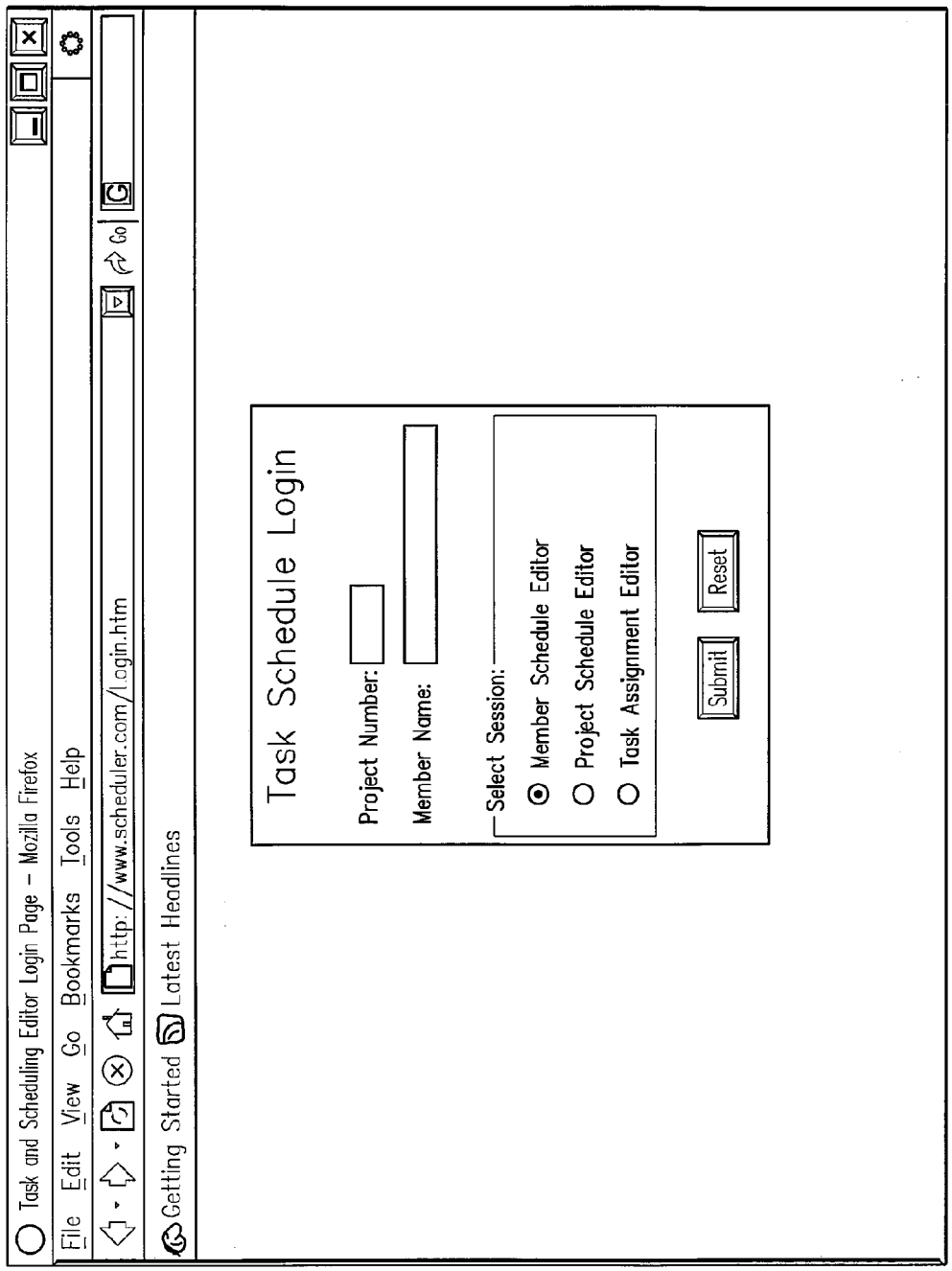
FIG. 4 is a screenshot of a login web page for a project member to log on to one of the editors, according to an embodiment of the invention.

FIG. 4 is a screenshot of a login web page for a project member to log on to one of the editors (task assignment, project schedule, member schedule), according to an embodiment of the invention. The member enters the project number, member name, and selects the appropriate editor, and then submits the information to access the editor. The project schedule management system validates the input and determines if the member is a valid member of the project and has an access right for the selected editor. If not, the member will be denied access to the editor. For tighter security, the login web page and editors can occur over secure HTTP (e.g., HTTPS) and the login page can require a password before logging in.

Project Schedule Management System

Figure 5:
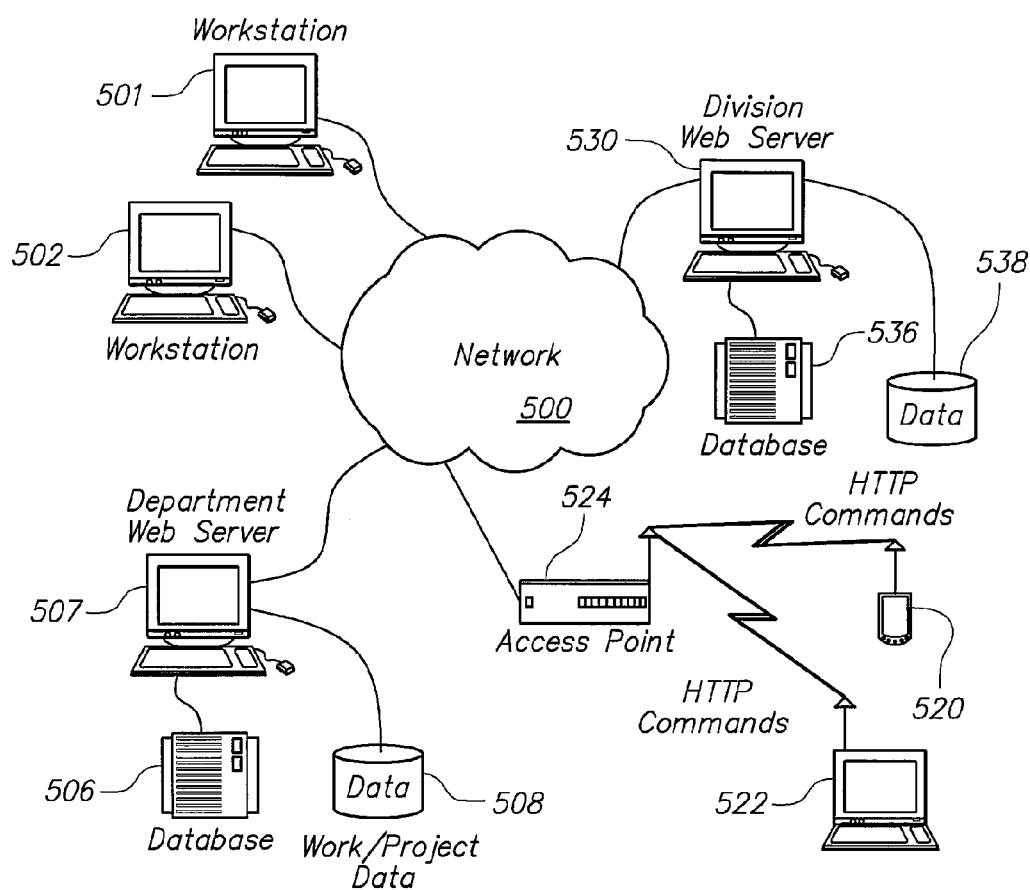
FIG. 5 is a diagram illustrating an operating environment in which an embodiment of the invention may be implemented.

FIG. 5 is a diagram illustrating an operating environment in which an embodiment of the invention may be implemented. The illustrated operating environment is illustrative of an overall system configuration for the project schedule management system described herein. The example operating environment comprises a plurality of workstations, one or more web servers, and one or more associated databases, which are all connected directly or indirectly to a software development network for communication.

Generally, web servers 507 and 530 comprise the resources for the display and management of the editors. The web servers 507, 530 interact with databases 506, 536, respectively, to store, maintain, and manage task assignment and task schedule information, e.g., data 508, 538. The depiction of two web servers and two databases is for purposes of example. Thus, the number of web servers and databases used in a project schedule management system as described herein may vary from implementation to implementation. Web browsers on computer workstations 501, 502 access the resources on the web servers 507, 530 to display the editors. Project members or managers can access the editors over the network 500 (LAN or WAN). The project management system can be used to manage projects at different levels within an organization, e.g., at project, department, division, and organization levels.

Figure 58:
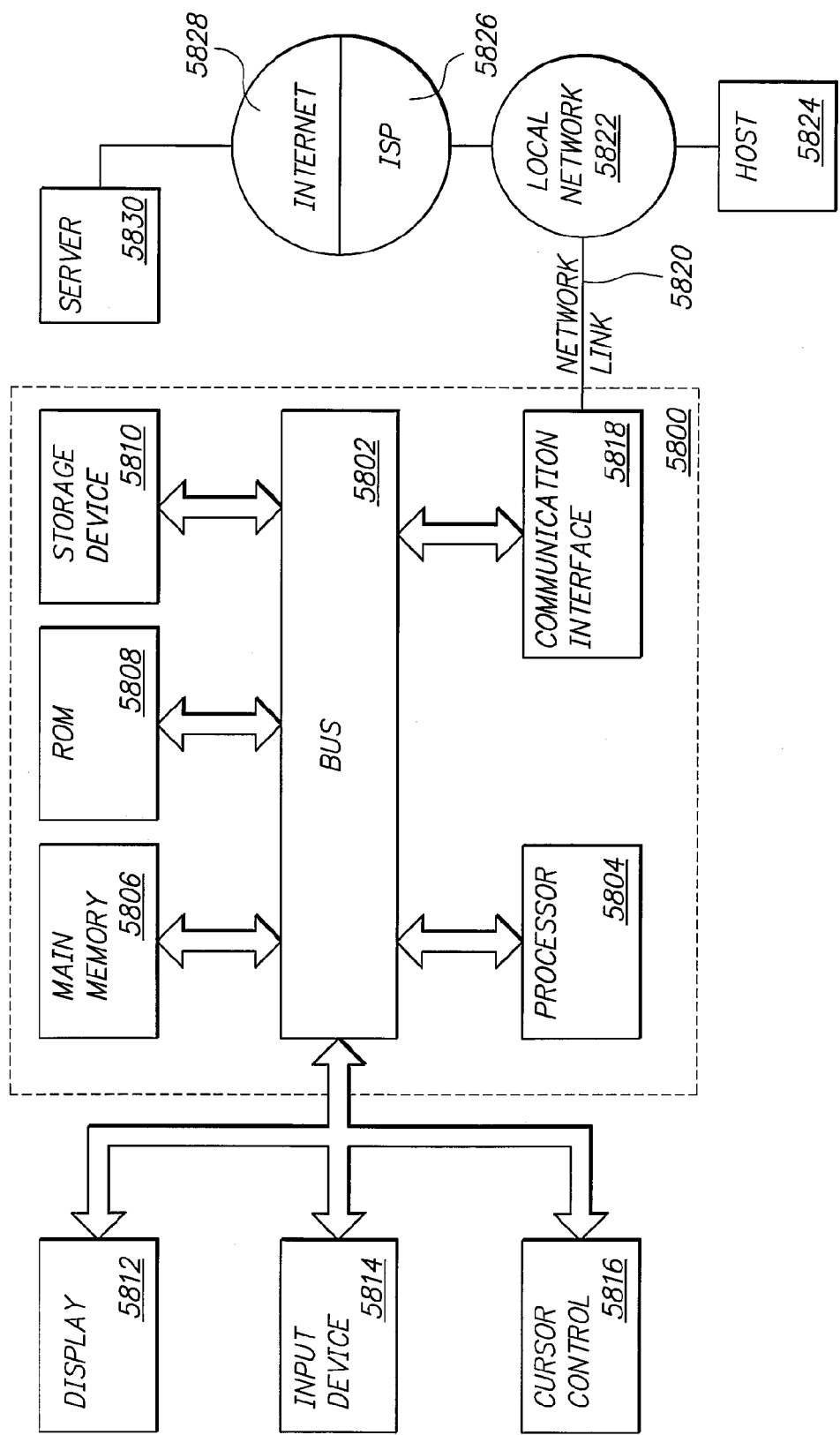
FIG. 58 is a block diagram that illustrates a computer system upon which embodiments of the invention can be implemented.

Workstations 501, 502 are typically computer systems configured as illustrated by the computer system 5800 of FIG. 58, with one or more browsers, and are utilized, for example, by the engineers/developers to complete tasks associated with a product development project. Pertinent non-limiting examples of such tasks include initiating projects, preparing and maintaining task schedules, designing software architecture, creating specifications, creating software code, implementing and testing software code, inspecting various task products, etc. In addition, project managers utilize workstations 501, 502 for accessing information to review and manage the progress of the project. The developers and managers transmit communications through the network 500 to the other connected components, e.g., web servers 507, 530; databases 506, 536; and handheld device 520 and laptop 522, via access point(s) 524.

Web servers 507, 530 depict a typical web server, which is a combination of computer hardware and software that, using the appropriate protocols (e.g., Hypertext Transfer Protocol [HTTP] and Transmission Control Protocol/Internet Protocol [TCP/IP]), serves the files that form web pages (e.g., Hypertext Markup Language [HTML] or Extensible Markup Language [XML] files), to users, such as developers or managers at a workstation 501, 502. In general, the majority of information exchanged and managed during the development project life cycle is served by the web servers 507, 530 over the network 500. Furthermore, aspects of the techniques described herein may be implemented and executed on the web servers 507, 530, although practice of the invention is not limited to such an implementation. The techniques could also be implemented on any other processing system, such as workstations 501, 502 or a similarly configured computer system as illustrated in FIG. 58.

Databases 508, 538 depict typical databases for storing data 508, 538 related to the development project, thus providing access to the information by authorized individuals at workstations 501, 502, through queries transmitted over the network 500. The type of data stored on databases 507, 530 is effectively limitless, wherein non-limiting examples include project initiation forms, member and project task schedules, specifications, software code, inspection reports, web page files, and document directories and indexes.

Network 500 depicts a conventional network, e.g., a packet-switched network, for facilitating the exchange of information between and among various connected components, such as workstations 501, 502, web servers 507, 530, and databases 508, 538. The network 500 may be a Local Area Network (LAN), such as a conventional Ethernet, Fast Ethernet, a token ring, or a wireless LAN such as specified in 802.11a and 802.11b (developed by a working group of the Institute of Electrical and Electronics Engineers [IEEE]), which may be implemented within an enterprise. In addition, network 500 may also be a Wide Area Network (WAN), such as the Internet, for facilitating communication with remote users through a Virtual Private Network (VPN), or the network 500 may represent a combination of a LAN and a WAN. In addition, network 500 can be formed using a variety of different mediums, including but not limited electrical wire or cable, optical, or wireless connections.

Figure 6:
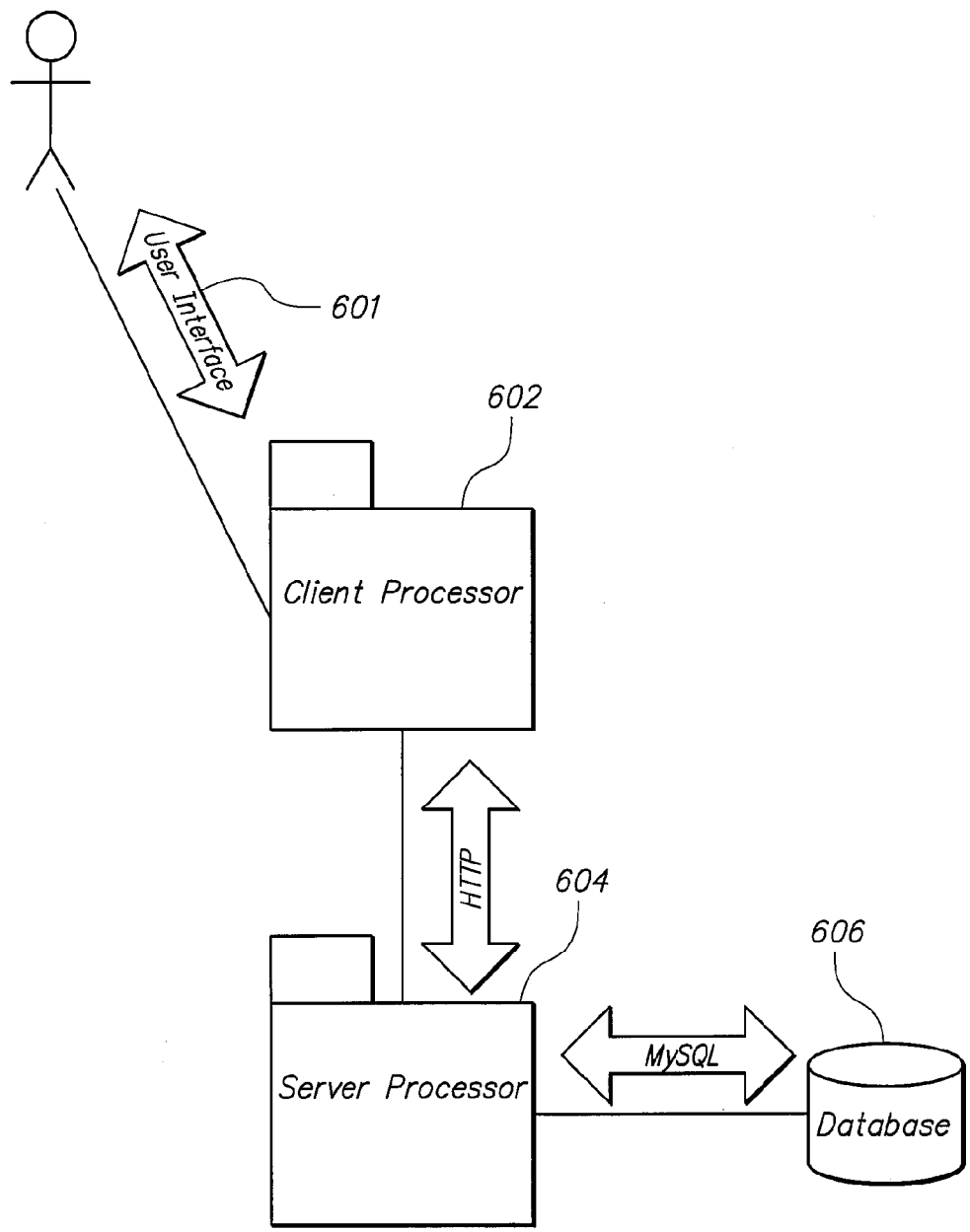
FIG. 6 is a diagram illustrating a communications architecture in which an embodiment of the invention may be implemented.

FIG. 6 is a diagram illustrating a communications architecture in which an embodiment of the invention may be implemented, including software components of the system. The client processor 602 corresponds to a web browser and the server processor 604 corresponds to a web server, such as web servers 507 and 530 (FIG. 5). A project member or manager interacts with the client processor 602 through a user interface 601. The client processor 602 manages and maintains the login web page (FIG. 4) and the various editor web pages (FIGS. 1A, 2A, 3A). The client processor 602 handles all events that occur in these web pages. According to one embodiment, the client processor 602 interacts with the server processor 604 through the HTTP protocol.

The server processor 604 provides information to the client processor 602 to display the login web page (FIG. 4) and editor web pages (FIGS. 1A, 2A, 3A). The server processor 604 also processes the information in the login and editor web pages when the client processor 602 submits the information in these pages. The database 606 is a repository of project and task scheduling information. The server processor 604 interacts with the database 606 to obtain, add, or update information in the databases. According to one implementation, the server processor 604 interacts with the database 606. However, other databases and protocols can be used.

Client Processor-Server Processor Interfaces

Figure 7:
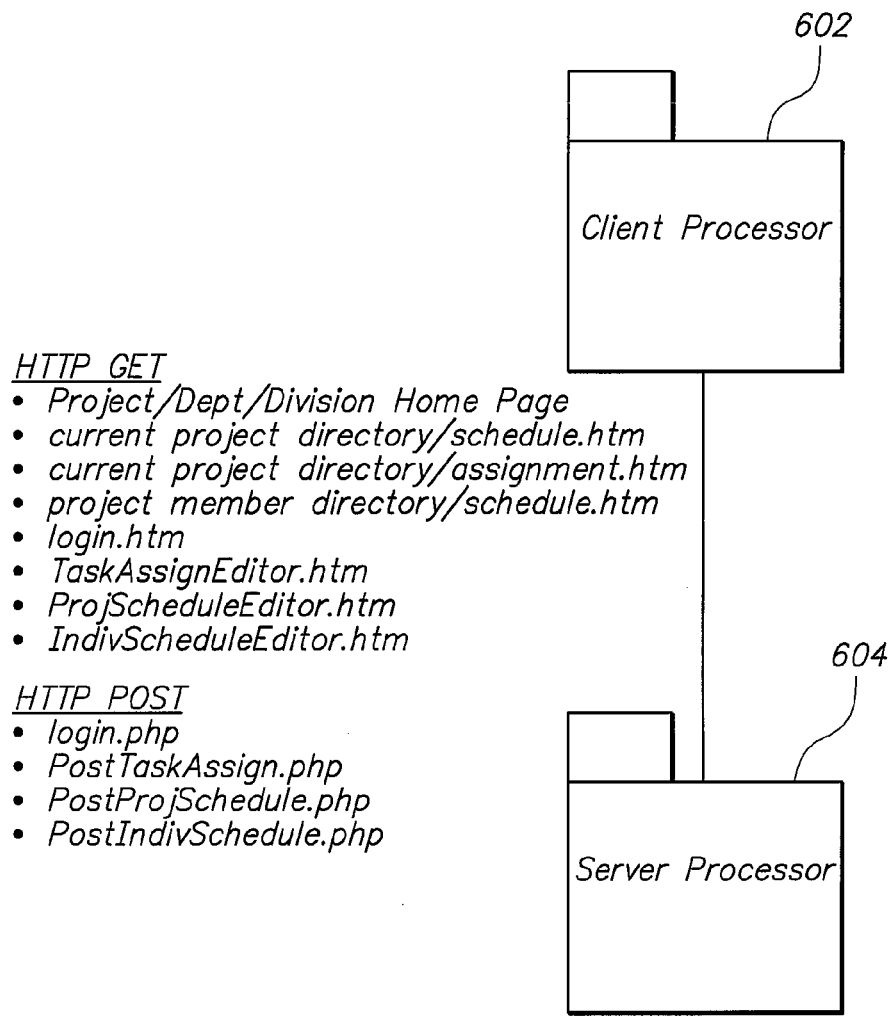
FIG. 7 is a diagram illustrating interfaces between the client processor and the server processor of the system, according to an embodiment of the invention.

FIG. 7 is a diagram illustrating interfaces between the client processor and the server processor of the system, according to an embodiment of the invention. The HTTP GET requests provide for the client processor 602 obtaining the home, login (FIG. 4), project schedule editor (FIG. 2A), member schedule (FIG. 3A), and assignment (FIG. 1A) web pages from the server processor 604. The HTTP POST requests provide for the client processor 602 submitting information entered in the login (FIG. 4) and editor web pages (FIGS. 1A, 2A, 3A) to the server processor 604 for processing. The applicable HTTP GET and HTTP POST requests are described in greater detail hereafter.

HTTP GET Project/Dept/Division Home Page requests cause the server processor 604 to return to the client processor 602 a project home page associated with a department or division, respectively. The home page contains links (e.g., hyperlinks) for linking to and viewing the respective web page for the schedules, task assignment, and login to the editors.

HTTP GET current project directory/schedule.htm requests cause the server processor 604 to return to the client processor 602 a web page containing the project schedule for a current project, an example of which is depicted in FIG. 2B.

HTTP GET current project directory/assignment.htm requests cause the server processor 604 to return to the client processor 602 a web page containing the task assignments of project tasks for the current project, an example of which is depicted in FIG. 1B.

HTTP GET project member directory/schedule.htm requests causes the server processor 604 to return to the client processor 602 a web page containing a project member's schedule for the current project, an example of which is depicted in FIG. 3B.

HTTP GET login.htm requests cause the server processor 604 to return to the client processor 602 a web page that allows a project member or manager to log on to one of the editors (project schedule, member schedule, task assignment). The member or manager enters information about the project, member name, and editor session type. FIG. 4 depicts a web page for logging into to one of the editors.

HTTP GET TaskAssignEditor.htm requests cause the server processor 604 to return to the client processor 602 a web page for the task assignment editor, which is used to assign tasks to the project members for the current project. A project manager requires access privileges to assign tasks to the project members before the server processor 604 returns the task assignment web page. This privilege is verified when the manager submits the information in the login web page (FIG. 4). According to one embodiment, TaskAssignEditor.htm includes Javascripts to display, manage, and handle events in the task assignment editor. According to one embodiment, TaskAssignEditor.htm includes PHP scripts to obtain information from the databases 506, 536 and pass the information to the Javascripts so the information is displayed in the task assignment editor, an example of which is depicted in FIG. 1A.

HTTP GET ProjScheduleEditor.htm requests cause the server processor 604 to return to the client processor 602 a web page for the project schedule editor, which is used to create or update the project schedule for the current project. A project manager must have access privileges to create the project schedule before the server processor 604 returns the project schedule editor. This privilege is verified when the manager submits the information in the login web page (FIG. 4). According to one embodiment, ProjScheduleEditor.htm includes Javascripts to display, manage, and handle events in the project schedule editor. According to one embodiment, ProjScheduleEditor.htm includes PHP scripts to obtain information from the databases 506, 536 and pass the information to the Javascripts so the information is displayed in the project schedule editor, an example of which is depicted in FIG. 2A.

HTTP GET IndivScheduleEditor.htm requests cause the server processor 604 to return to the client processor 602 a web page for the member schedule editor, which is used to create or update a project member's schedule for the current project. According to one embodiment, the schedule editor displays only uncompleted tasks if the project member's schedule has been previously created. A project member must have privileges to create or edit the schedule before the server processor 604 returns this web page. This privilege is verified when the member submits the information in the login web page (FIG. 4). According to one embodiment, IndivScheduleEditor.htm includes Javascripts to display, manage, and handle events in the project member's schedule editor. According to one embodiment, IndivScheduleEditor.htm includes PHP scripts to obtain information from the databases 506, 536 and pass the information to the Javascripts so the information is displayed in the member schedule editor, an example of which is depicted in FIG. 3A.

HTTP POST login.php interface allow the client processor 602 to access and display the various editors (project schedule, member schedule, task assignment). This interface is called when the "Submit" button is selected from the web page corresponding to login.htm. The information entered in login.htm is passed to login.php in the server processor 604. The login.php uses the information to validate the member for the project, and to determine if the member has access privileges to the requested editor. If the information is invalid or the member does not have access privilege to the editor, then login.php returns a message to the client processor 602 that the project member cannot access the requested editor. Otherwise, login.php returns the web page corresponding to one of the editors, i.e., the web browser is redirected to the web page corresponding to the requested editor.

HTTP POST PostTaskAssign.php allows the client processor 602 to submit all the information entered in the task assignment editor (FIG. 1A) to the server processor 604. This interface is called when the "Finish" button is selected from the web page corresponding to TaskAssignEditor.htm. The information entered in the editor of TaskAssignEditor.htm is passed to PostTaskAssign.php in the server processor 604. PostTaskAssign.php adds and updates task assignment information in the appropriate database 506, 536. An appropriate message is displayed if any of the information entered is invalid or if the process fails to access or query the appropriate database. PostTaskAssign.php also creates the task assignment web page, an example of which is depicted in FIG. 1B.

HTTP POST PostProjSchedule.php allows the client processor 602 to submit all the information entered in the project schedule editor (FIG. 2A) to the server processor 604. This interface is called when the "Finish" button is selected from the web page corresponding to ProjScheduleEditor.htm. The information entered in the editor of ProjScheduleEditor.htm is passed to PostProjSchedule.php in the server processor 604. PostProjSchedule.php adds and updates task schedule information in the appropriate database 506, 536. An appropriate message is displayed if any of the information entered is invalid or if the process fails to access or query the appropriate database. PostProjSchedule.php also creates the project schedule web page, an example of which is depicted in FIG. 2B.

HTTP POST PostIndivSchedule.php allows the client processor 602 to submit all the information entered in the project member's schedule editor (FIG. 3A) to the server processor 604. This interface is called when the "Finish" button is selected from the web page corresponding to IndivScheduleEditor.htm. The information entered in the editor of IndivScheduleEditor.htm is passed to PostIndivSchedule.php in the server processor 604. PostIndivSchedule.php adds and updates task schedule information in the appropriate database 506, 536. An appropriate message is displayed if any of the information entered is invalid or if the process fails to access or query the database. PostIndivSchedule.php also creates the member's schedule web page, an example of which is depicted in FIG. 3B.

The web pages for the various editors (TaskAssignEditor.htm, ProjScheduleEditor.htm, and IndivScheduleEditor.htm) include files that contain Javascript or PHP script, according to one non-limiting embodiment. The scripting languages used to perform the various functions described herein may vary from implementation to implementation. When a web browser (e.g., client processor 602) requests the web page of an editor, the editor web page and all the files corresponding to Javascript are passed to the web browser, whereby the web browser processes the Javascript. However, the files for the PHP script are not passed to the web browser. The PHP script are processed in the web server, such as web servers 507, 530 of FIG. 5, where only what the PHP script writes onto the web page is passed to the web browser.

Figure 8:
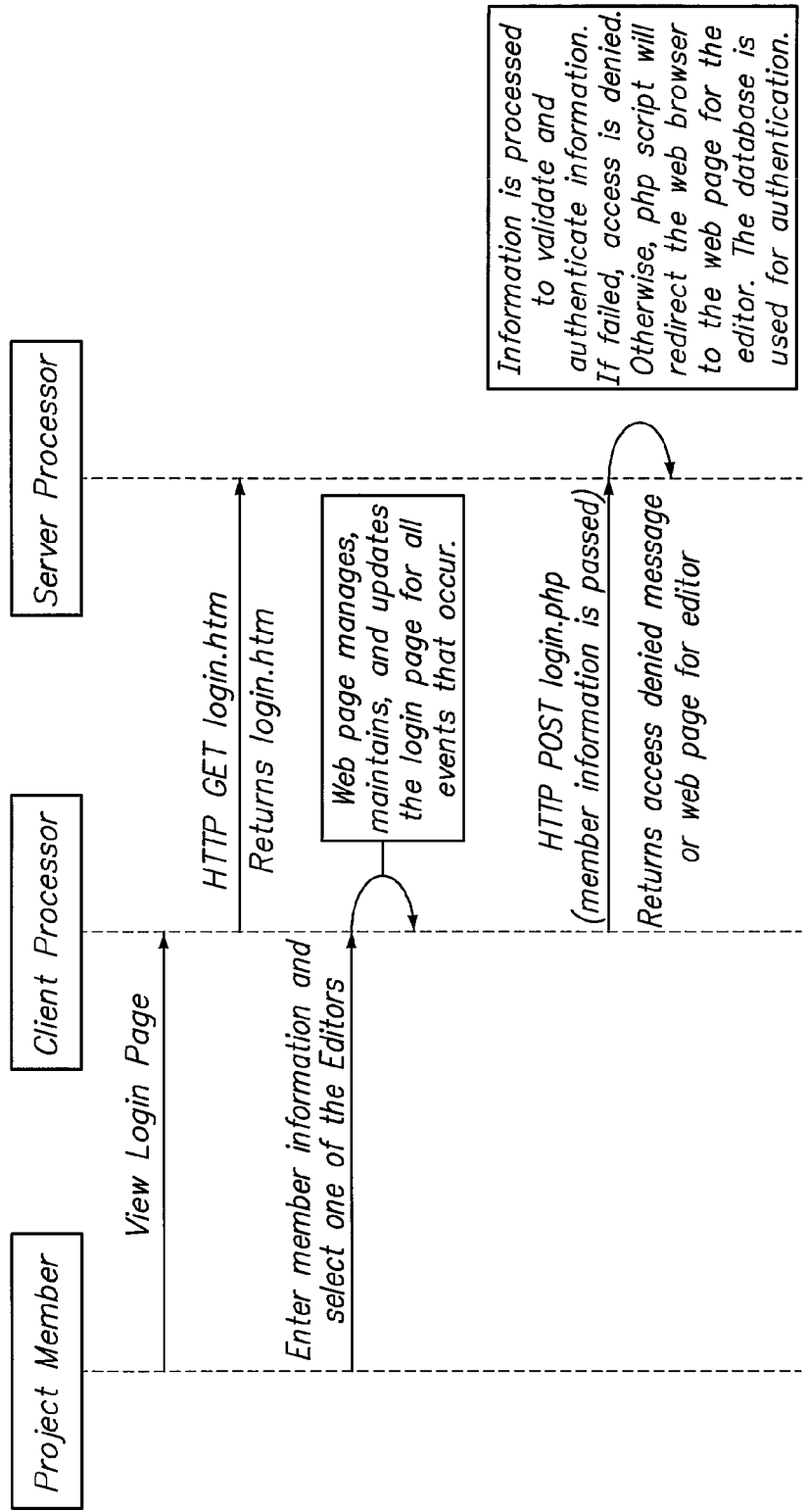
FIG. 8 illustrates a sequence diagram for a project member or manager to log on to one of the editors using the login web page, according to an embodiment of the invention.

FIG. 8 illustrates a sequence diagram for a project member or manager to log on to one of the editors using the login web page, according to an embodiment of the invention. The diagram shows the information passed between the components of the system before the editor is displayed to the member or manager. Processing occurs within the client processor 602 to handle all the events that occur on the login web page (FIG. 4). Processing occurs within the server processor 604 to validate the information entered in the login page and to verify the access privilege of the member for the editor. The server processor 604 obtains information from the appropriate database 506 or 536 for the verification of access privileges. Project members or managers perform this process before getting into any of the editors whose sequences are described in FIGS. 9-11.

Figure 9:
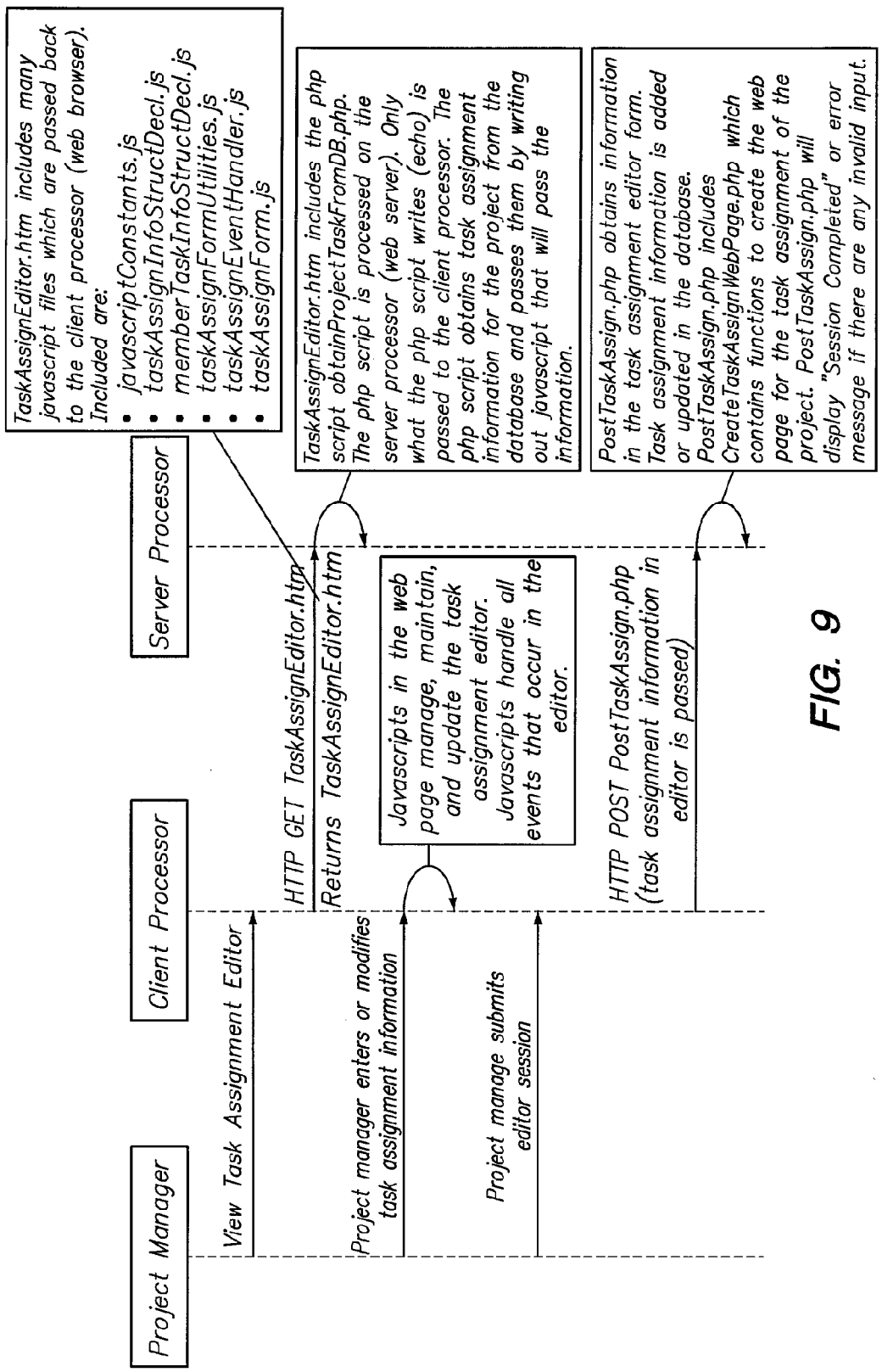
FIG. 9 illustrates a sequence diagram for the project manager in a session with the task assignment editor, according to an embodiment of the invention.

FIG. 9 illustrates a sequence diagram for the project manager in a session with the task assignment editor, according to an embodiment of the invention. When the client processor 602 requests TaskAssignEditor.htm, the file TaskAssignEditor.htm and all the included files containing Javascript (shown with .js extension) are passed from the server processor 604 to the client processor 602. The included files containing PHP script (shown with .php extension) are processed in the server processor 604. The PHP script obtains task assignment information from the appropriate database 506 or 536 and writes Javascript into the web page of TaskAssignEditor.htm, in order to pass the information to the client processor 602. The client processor 602 processes the Javascript in all the files it receives, in order to display the corresponding task assignment editor. All interactions between the project manager and the task assignment editor are handled by the Javascript to manage, maintain, and update the task assignment editor. When the project manager finishes the session (e.g., selects "Finish"), all task assignment information in the task assignment editor is passed from the client processor 602 to the server processor 604 through the interface PostTaskAssign.php. The server processor 604 processes the information by adding or updating the information in the appropriate database. Using the task assignment information in the database, the server processor 604 automatically creates a web page for the project task assignment, an example of which is depicted in FIG. 1B.

Figure 10:
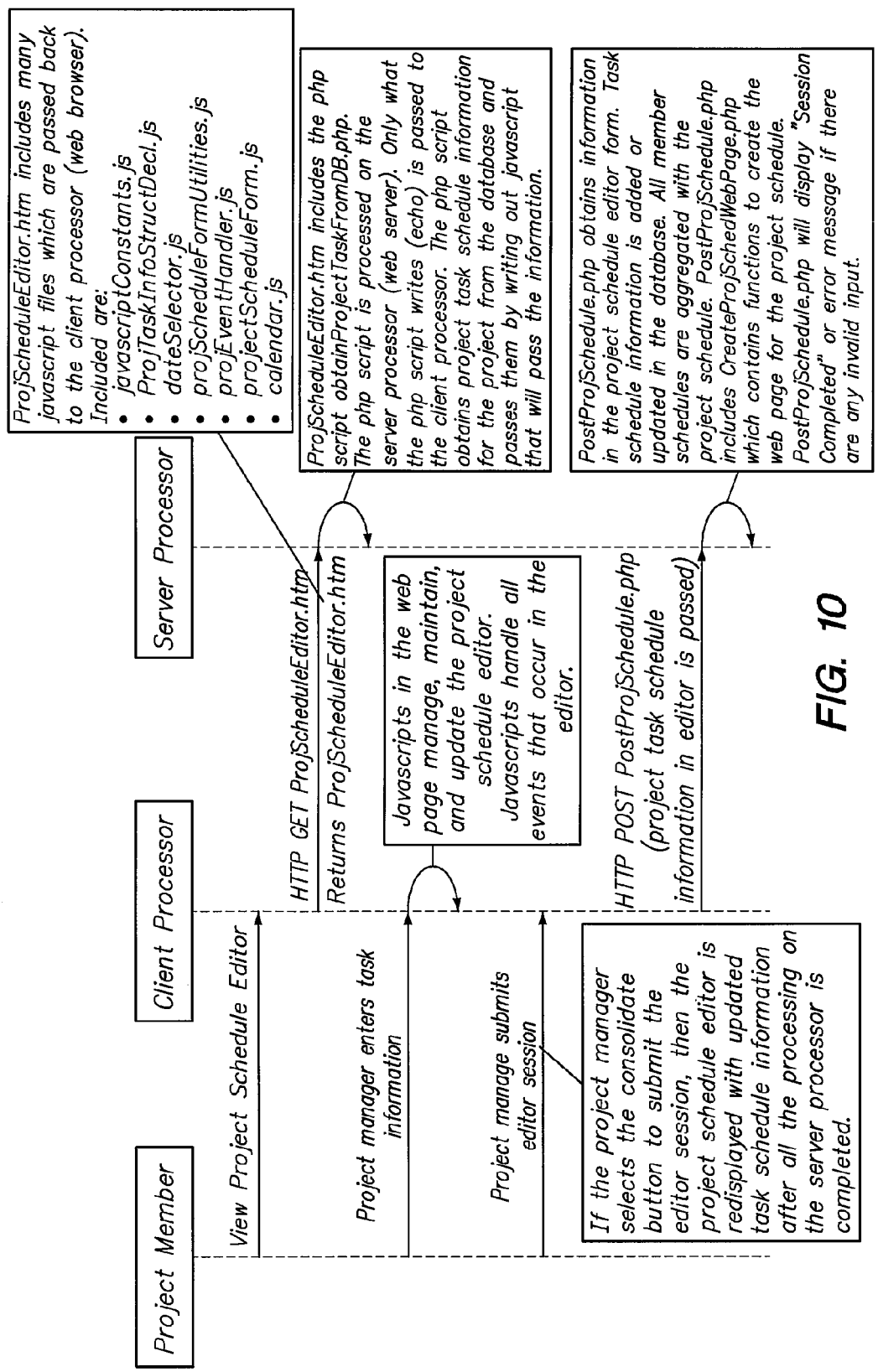
FIG. 10 illustrates a sequence diagram for the project manager in a session with the project schedule editor, according to an embodiment of the invention.

FIG. 10 illustrates a sequence diagram for the project manager in a session with the project schedule editor, according to an embodiment of the invention. When the client processor 602 requests ProjScheduleEditor.htm, the file ProjScheduleEditor.htm and all the included files containing Javascript are passed from the server processor 604 to the client processor 602. The included files containing PHP script are processed in the server processor 604. The PHP script obtains project task schedule information from the appropriate database and writes Javascript into the web page of ProjScheduleEditor.htm, in order to pass the information to the client processor 602. The client processor 602 processes the Javascript in the files it receives, in order to display the project schedule editor. All interactions between the project manager and the project schedule editor are handled by the Javascript, in order to manage, maintain, and update the editor. When the manager finishes the session (e.g., selects "Finish"), all project task schedule information in the project schedule editor is passed from the client processor 602 to the server processor 604 through the interface PostProjSchedule.php. The server processor 604 processes the information by adding or updating the information in the appropriate database. The server processor 604 also automatically aggregates the project members' schedules with the project schedule and adds or updates the project schedule in the database. Using the project task schedule information in the database, the server processor 604 automatically creates a web page for the project schedule, an example of which is depicted in FIG. 2B.

The behavior of the system in response to a selection of the "Consolidate" button is the same as for a selection of the "Finish" button. Both buttons cause (a) the addition and updating of the appropriate database with information from the project schedule editor, (b) the aggregation of the members' individual schedules with the project schedule, (c) the addition and updating of the project schedule in the database, and (d) the creation of the project schedule web page. Further, "Consolidate" redisplays the project schedule editor with the updated project schedule by requesting ProjScheduleEditor.htm again.

Figure 11:
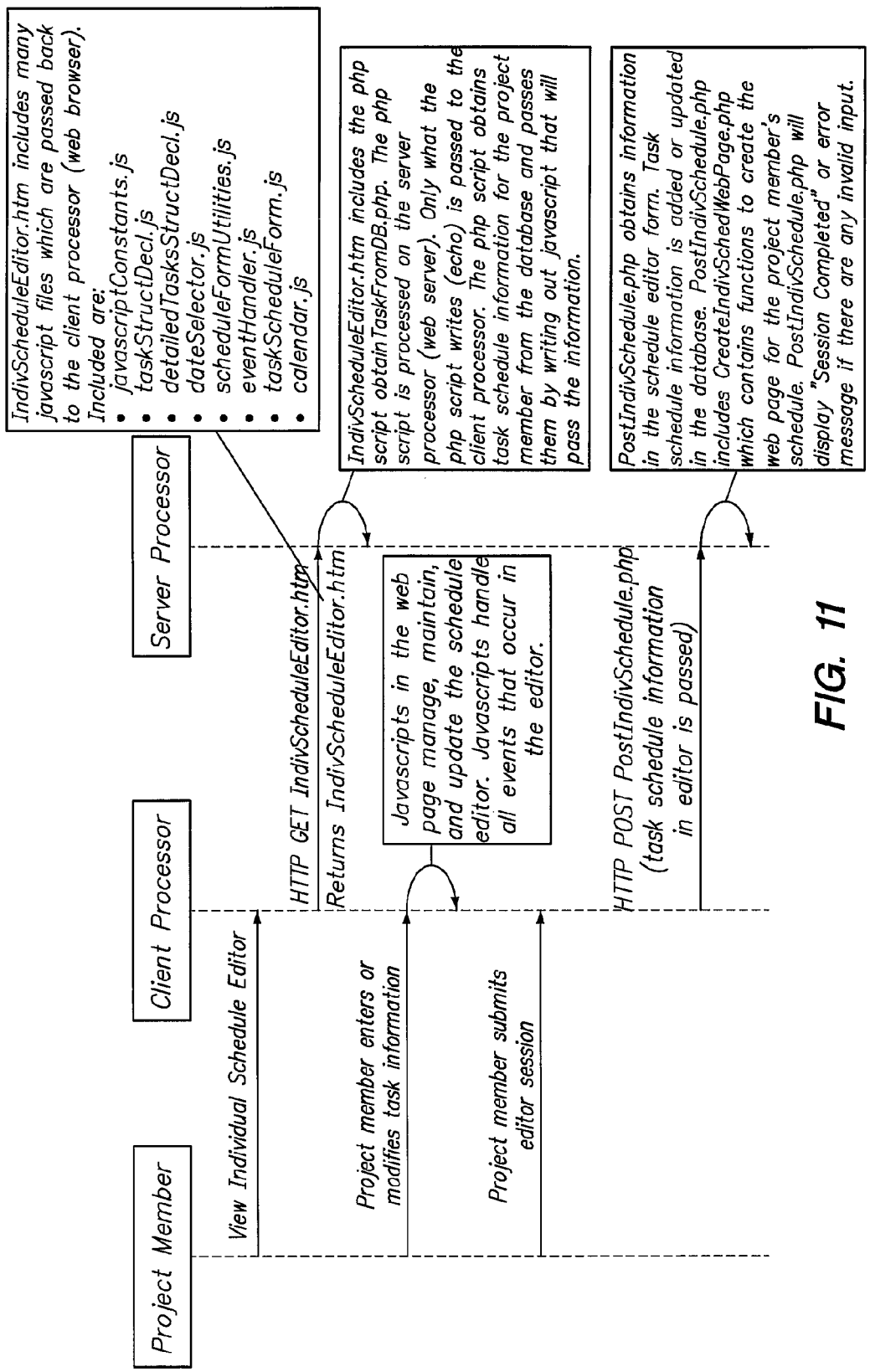
FIG. 11 illustrates a sequence diagram for the project member in a session with the project member schedule editor, according to an embodiment of the invention.

FIG. 11 illustrates a sequence diagram for the project member in a session with the project member schedule editor (i.e., member schedule editor), according to an embodiment of the invention. When the client processor 602 requests IndivScheduleEditor.htm, the file IndivScheduleEditor.htm and all the included files containing Javascript are passed from the server processor 604 to the client processor 602. The included files containing PHP script are processed in the server processor 604. The PHP script obtains member task schedule information from the appropriate database and writes Javascript into the web page of IndivScheduleEditor.htm, in order to pass the information to the client processor 602. The client processor 602 processes the Javascript in the files it receives, in order to display the member schedule editor. Interactions between the project member and the member schedule editor are handled by the Javascript, in order to manage, maintain, and update the member schedule editor. When the member finishes the session (e.g., selects "Finish"), member task schedule information in the member schedule editor is passed from the client processor 602 to the server processor 604 through the interface PostIndivSchedule.php. The server processor 604 processes the information by adding or updating the information in the appropriate database. Using the member task schedule information in the database, the server processor 604 automatically creates a web page for the member schedule, an example of which is depicted in FIG. 3B.

Database Schema

Figure 12:
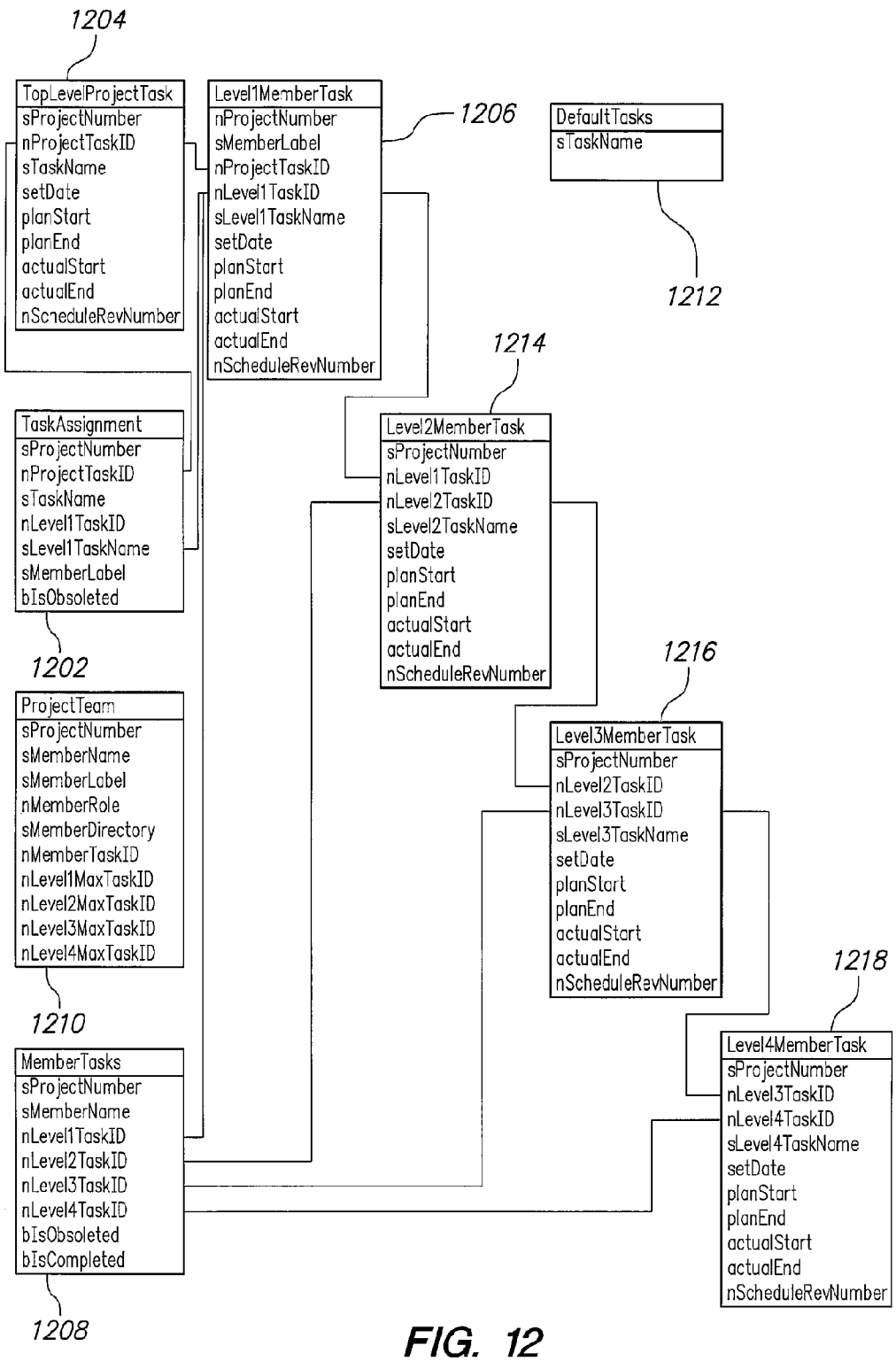
FIG. 12 illustrates a schema of database tables used to store and manage task assignment and task schedule information for projects and project members, according to an embodiment of the invention.

FIG. 12 illustrates a schema of database tables used to store and manage task assignment and task schedule information for projects and project members, according to an embodiment of the invention. The tables maintain information about the task assignments, the schedule for the project tasks, and the schedules for each project member. The tables are organized and linked such that the task assignments, project schedule, and members' schedule are all related.

The TaskAssignment table 1202 stores the project tasks and corresponding subtasks of a project. The TopLevelProjectTask table 1204 stores the schedule of the project tasks that are in the TaskAssignment table 1202. The Level1MemberTask table 1206 stores the schedule of the member tasks which are assigned in the TaskAssignment table 1202 and links to the schedule of its corresponding project task in the TopLevelProjectTask table 1204. These links between the tables enable the automatic aggregation of the member schedules with the project schedule. The Level1MemberTask table 1206 also stores the schedule of the member tasks that are not related to any project task. The LevelXMemberTask tables (where X is 1, 2, 3, and 4) and the MemberTasks table 1208 store and manage links between the various levels of tasks of a member. The lower level tasks are more detailed tasks of the upper level tasks. The organization of these tables maintains the schedule of a member. The ProjectTeam table 1210 contains information about the project members. The project member information for a project member includes (a) a role, to determine access privileges to the various editors, (b) a directory for determining the location at which the member schedule web page is stored, and (c) IDs used for determining the identifier of the member tasks at various levels.

The log in process uses information in the ProjectTeam table 1210 to determine access privileges to a requested editor before displaying the editor. The task assignment editor uses and/or updates information in the tables DefaultTasks 1212, TaskAssignment 1202, and MemberTasks 1208. The project schedule editor uses and/or updates information in the tables DefaultTasks 1212, TaskAssignment 1202, TopLevelProjectTask 1204, MemberTasks 1208, and Level1MemberTask 1206. The member schedule editor uses and/or updates information in the tables ProjectTeam 1210, TaskAssignment 1202, MemberTasks 1208, and LevelXMemberTask.

Descriptions of the various tables depicted in FIG. 12, and used in one embodiment of the project schedule management system described herein, are as follows. However, the number and structure of the tables described in reference to FIG. 12 may vary from implementation to implementation.

DefaultTasks table 1212—this table contains the names of tasks that are typically tasks for all projects. In the context of software development projects, some examples of default tasks are Project Plans, Requirements, and Top Level Design.

ProjectTeam table 1210—this table contains information about project members for a project. sMemberLabel is a 2 to 4 character string used to identify a project member when displaying the project schedule, which shows the project tasks and associated member tasks as depicted in FIGS. 1A and 1B. In one embodiment, the initials of the project member are used for sMemberLabel. nMemberRole is a number used for indicating the role of the project member. For example, project manager=1, project leader=2, project administrator=3, and project member=4. The role indicates who has access to the editors. For example, a project member whose role number is 1 has access to all the editors. However, a project member whose role number is 4 can only access the member's schedule editor. The system can be configured to determine which role numbers have access to the respective editors. sMemberDirectory is used to determine where the HTML file for the member schedule is stored so that the project team can view the member's schedule.

nMemberTaskID is a number assigned to a project member that is used to determine the ID of a task for that member. According to one embodiment, the nMemberTaskIDs are used as the start ID for a task. Depending upon the size of the project team, the ID can be MOD 10 (1, 2, . . . , 9) for a small team or MOD 100 (1, 2, . . . , 99) or higher for a large team. The task IDs are increments of the MOD. For example, if the nMemberTaskID of project member 'test1' is 1, then the task IDs of test1's task will be 11, 21, 31, and so forth (or 101, 201, 301, and so forth for a large team). The task ID uniquely identifies a task for a project member even if the name of some of the tasks are the same. The task ID also uniquely identifies a task at all levels. nLevelXMaxTaskID is a number used to maintain the highest task IDs that have been used so far for the different level tasks of a project member. These numbers provide the starting IDs used to determine the task IDs of tasks that are added in the member's schedule editor session. These values are retrieved and updated after each editor session. Except for the values for nLevelXMaxTaskID, the values for the other entries must be set prior to the beginning of a project.

TaskAssignment table 1202—this table contains information about the project tasks and its subtasks that are assigned to project members for a project. sTaskName is used for the names of the tasks and nProjectTaskID are the IDs associated with the tasks. The project start task ID is 0 so that the ID for its tasks will be increments of the MOD (10, 20, 30, . . . for small team). sLevel1TaskName is used for the names of the subtasks (member tasks) associated with the project tasks and nLevel1TaskID is used for the IDs associated with the subtasks. sMemberLabel is used to identify the project members that are assigned the subtasks. bIsObsoleted is used to indicate whether the task has been removed from the project.

Even though a task is deleted from the schedule, information about the task is maintained in the database. Values for sTaskName, nProjectTaskID, sLevel1TaskName, and sMemberLabel can be added to the TaskAssignment table 1202 through a task assignment editor session. The project schedule editor session can add values for sTaskName and nProjectTaskID. Only the member schedule editor session can add values for nLevel1TaskID.

TopLevelProjectTask table 1204—this table contains information about the scheduling of project tasks. sTaskName is used for the names of the tasks and nProjectTaskID is used for the IDs associated with the tasks. planStart and planEnd are used for the expected dates for starting and completing the task. actualStart and actualEnd are used for the actual dates in which the task was started and completed. setDate is used for the date in which the planned dates were set or modified. nScheduleRevNumber is used for the revision number of the task schedule. The latest schedule for a project task corresponds to the highest revision number. All revisions of a project task are maintained in the TopLevelProjectTask table 1204 to track the changes in the project task's schedule. The revision is incremented only when the planned dates are changed in the project schedule editor on different days. All values for nProjectTaskID, sTaskName, dates, and nScheduleRevNumber are added or updated in the TopLevelProjectTask table 1204 through a project schedule editor session.

MemberTasks table 1208—this table contains information about all the tasks (tasks at all levels) for all the project members. Associated with each member (sMemberName) of a project are the task Ids and nLevelXTaskID, which identify all the tasks and their relationship with one another. As with the TaskAssignment table, bIsObsoleted indicates if the task has been removed from the project member's schedule. bIsCompleted indicates if the tasks is completed. nLevelXTaskID is used for the tasks which are added to the MemberTasks table 1208 and are determined from the nLevelXMaxTaskID of the ProjectTeam table 1210 when new tasks are added in the member's schedule editor session. Values in the table can be updated or modified (bIsObsoleted or bIsCompleted) from the results of any of the three editor sessions (member schedule, project schedule, task assignment). The MemberTasks table 1208 is important to provide a link between the lower level task schedules with the upper level task schedules.

LevelXMemberTask table (e.g., Level1MemberTask table 1206, Level2MemberTask table 1214, Level3MemberTask table 1216)—this table contains information about the scheduling of member tasks. sLevelXTaskName is used for the name of the tasks and nLevelXTaskID is used for the IDs associated with the tasks. nLevelXTaskID for the tasks which are added to the table are determined from the nLevelXMaxTaskID of the ProjectTeam table 1210 when new tasks are added in the member's schedule editor session. planStart and planEnd are used for the expected dates for starting and completing the task. actualStart and actualEnd are used for the actual dates in which the task was started and completed. setDate is used for the date in which the planned dates were set or modified. nScheduleRevNumber is used for the revision number of the task schedule. The latest schedule for a member task corresponds to the highest revision number. All revisions of a member task are maintained in the table to track the changes in the member task's schedule. According to one embodiment, the revision is incremented only when the planned dates are changed in the member schedule editor. Each LevelXMemberTask table contains a task ID for upper level tasks (except for level 1, where a task either has a project task as its parent or no parent task). This provides for a task a link to its parent task and its child tasks. All values for parent task ID, sLevelXTaskName, nLevelXTaskID, dates, and nScheduleRevNumber are added or updated in the table through the member schedule editor session. Only Level1MemberTask table 1206 contains the sMemberLabel to provide a link to the TaskAssignment table 1202.

The database shows only lower levels down to level 4. However, the database can be modified to include lower levels for greater details in the task schedule.

Setting Up a Project Schedule

Figure 13:
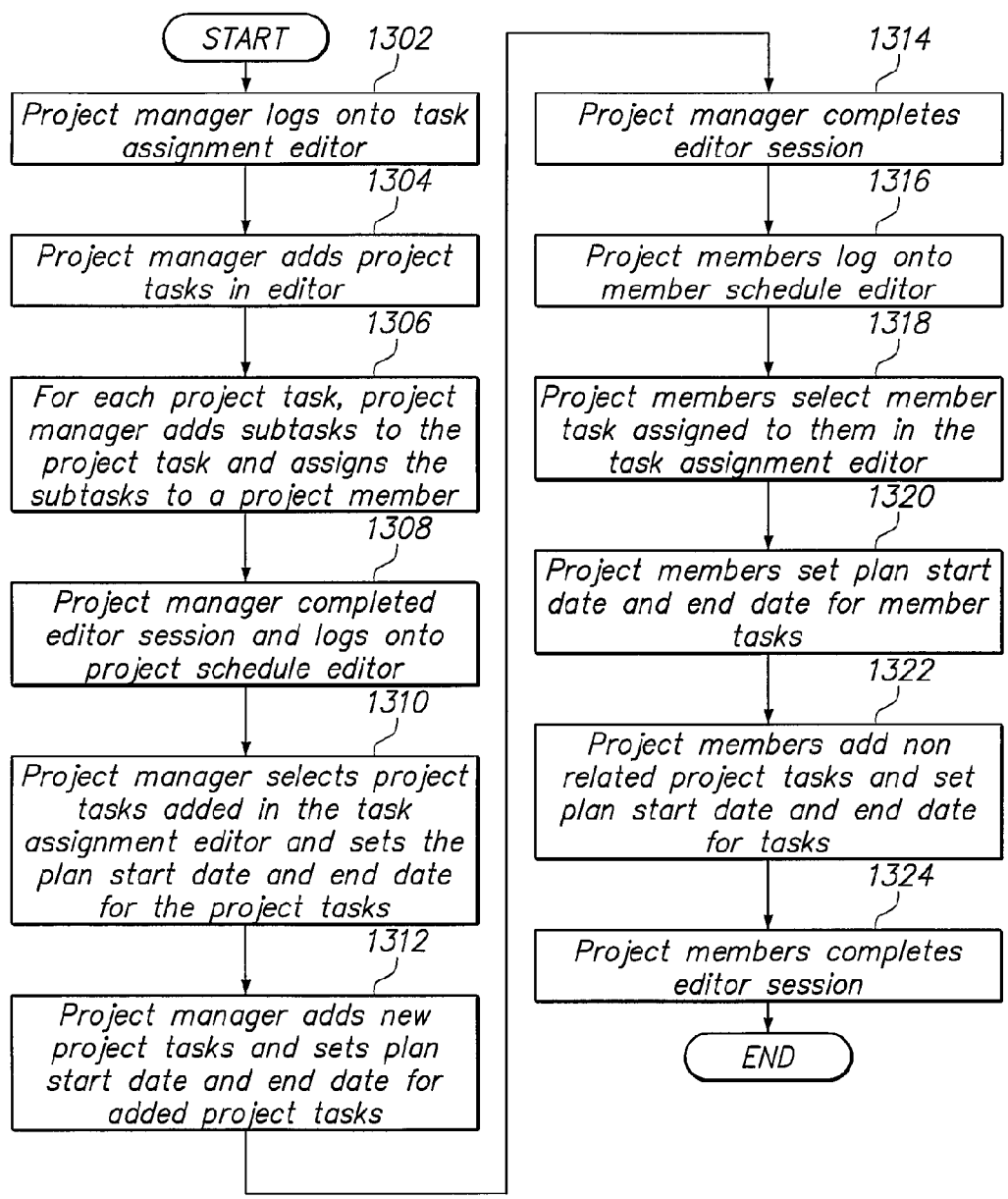
FIG. 13 is a flowchart illustrating the use of the system when the project schedule is initially set up, according to an embodiment of the invention.
Figure 21:
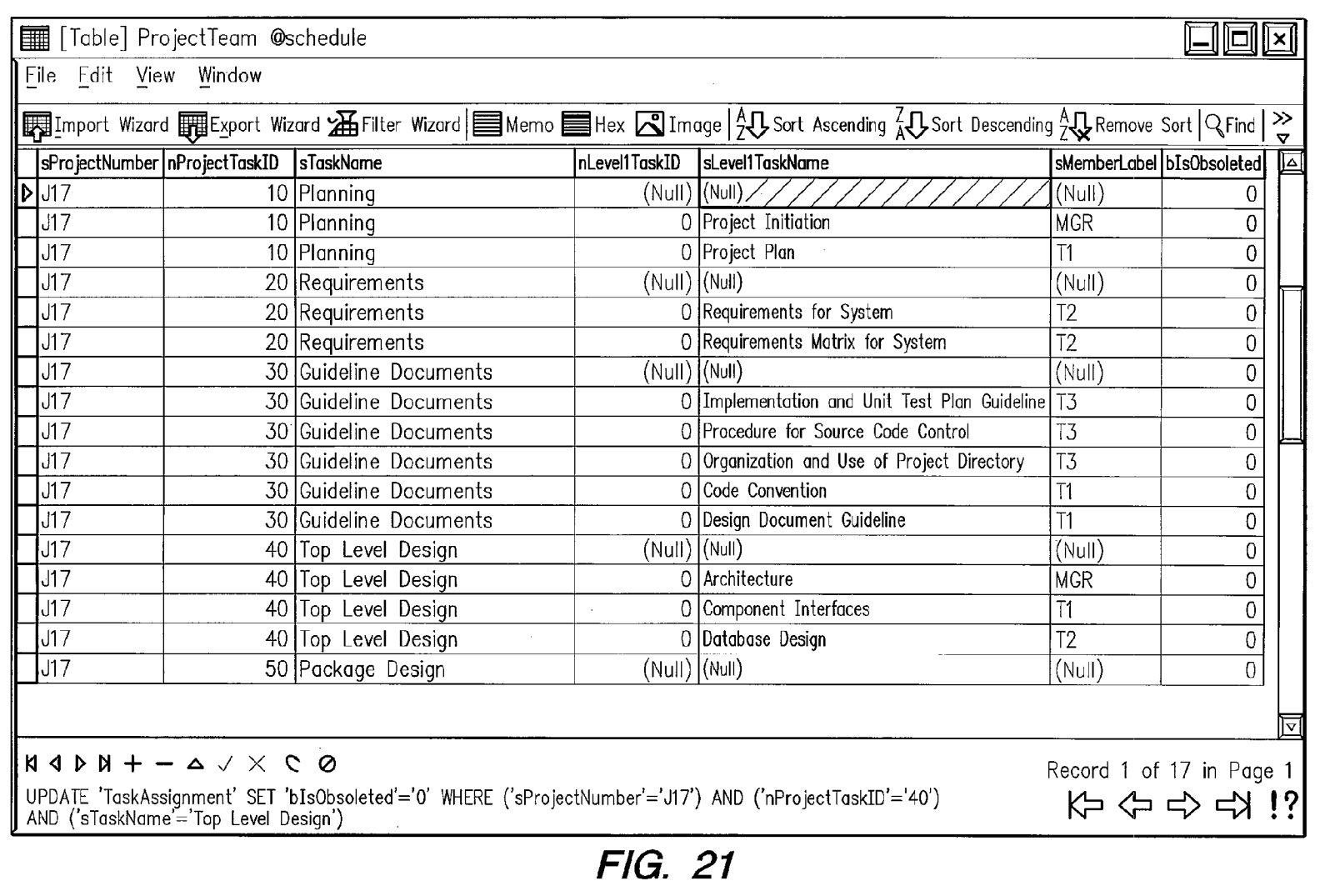

FIG. 13 is a flowchart illustrating the use of the system when the project schedule is initially set up, according to an embodiment of the invention. First, the project manager logs on to the task assignment editor, block 1302. In the task assignment editor, the manager adds project tasks, block 1304, and associated subtasks, block 1306, for a project. The manager also assigns the subtasks to the project members at block 1306. After the task assignment editor session is finished, the system updates the database with information about the project tasks and its subtasks (TaskAssignment table 1202). FIGS. 20 through 22 depict an example of the task assignment editor session and associated results.

Next, the project manager logs on to the project schedule editor, block 1308. In the project schedule editor, the manager sets the planned start date and planned end date for the project tasks added in the task assignment editor, block 1310. The manager can add new project tasks to the project and set the schedule for the project tasks, block 1312. However, the manager cannot set the schedule for the subtasks of the project task or add subtasks to the project task in the project schedule editor. After the editor session is finished, block 1314, the system updates the database with information about the schedule of the project tasks (TopLevelProjectTask 1204 and TaskAssignment 1202 tables). FIGS. 23 through 26 depict and example of the project schedule editor session and its results.

Finally, each project member logs on to the member's schedule editor, block 1316, and selects a tasks assigned to them in the task assignment editor, block 1318. As mentioned, in one embodiment, the schedule editor displays only uncompleted tasks if the schedule has been previously created. In the member schedule editor, the members set the planned start date and planned end dates for the project tasks and subtasks of project tasks that were assigned to them, block 1320. The members can add detailed tasks (lower level tasks) to the subtasks and set the schedule for them. The members can add new tasks unrelated to the project task and set the schedule for them, block 1322. After the editor session is done, block 1324, the system updates the database with information about the schedules of the subtasks of project tasks for the members as well as non related project tasks (TaskAssignment 1202, ProjectTeam 1210, MemberTasks 1208, and Level1MemberTask 1206 tables). FIGS. 27 through 41 depict examples of two member's schedule editor sessions and associated results. There are variations in the order of the processes for use of the editors, however, some variations may not correctly create the schedules. For example, the project members cannot set the schedule for the subtasks of project tasks in the member schedule editor unless the project manager assigns the subtasks to the project members in the task assignment editor.

Using the Member Schedule Editor

Figure 14:
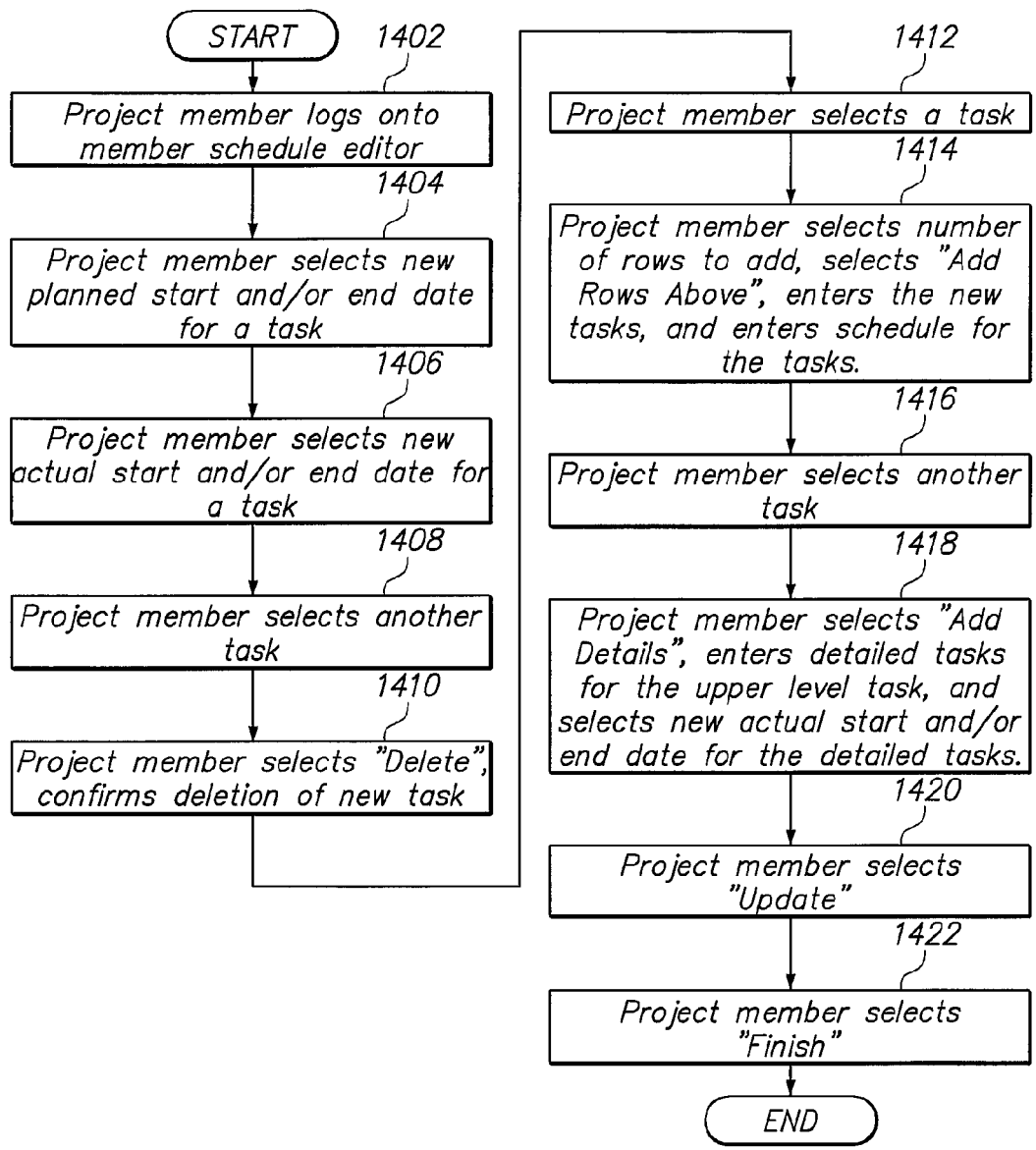
FIG. 14 is a flowchart illustrating an example use of the member schedule editor by a project member to modify the existing schedule, according to an embodiment of the invention.

FIG. 14 is a flowchart illustrating an example use of the member schedule editor by a project member to modify the existing schedule, according to an embodiment of the invention. According to one embodiment, the schedule editor will display only uncompleted tasks if the schedule has been previously created. At times, as members progress through a project, the members will add tasks, remove tasks, change the schedule of a task, set the results of a task (actual start and end date), or add more details to a task. A project member logs onto the member schedule editor, block 1402.

In the editor, each row contains schedule information about the task. For the members to modify the task's schedule, the member selects the planned and/or actual date selections in the row corresponding to the task, at blocks 1404 and 1406, respectively. If the member is deleting a task, the member selects the "Delete" button and confirms deletion of the task, block 1410. If adding tasks, the member can select another task, at block 1412, and then (a) select the number of rows to add via a pull-down menu field, (b) select the "Add Rows Above" button, (c) enter the new tasks and (d) enter schedules for the new tasks, block 1414. If the member is adding detailed subtasks associated with an upper level task, the member can select another task, block 1416, and then (a) select the "Add Details" button, (b) enter detailed tasks for the upper level task, and (c) enter new actual start and/or end dates for the detailed tasks, block 1418.

Modifying the schedule of a task can occur at any level (upper to lower levels). However, detailed tasks cannot be added to the lowest level tasks. Modifying the schedule of a lower level task may affect the schedule of all associated upper level tasks. All events in the editor to modify the schedule of a task only affect the row corresponding to the task. To reflect the changes in the schedule for tasks at all levels from the changes in the lower level task schedule, the "Update" button initiates the changes. The rows of tasks are redisplayed with the appropriate modifications. For some of the tasks, the previous schedule of the tasks are still displayed along with the new schedule. The member schedule editor manages and maintains schedule information about all the tasks including the changes that have occurred (added task, deleted tasks, planned dates changed, or actual dates updates). After the member schedule editor session is completed, e.g., by using the "Finish" button at block 1422, information about each task is processed and updated in the database (TaskAssignment 1202, ProjectTeam 1210, MemberTasks 1208, and LevelXMemberTask 1206, 1214, 1216, 1218 tables). If the member does not submit the member schedule editor session, all modification of the schedule will not be reflected in the database and will be lost if the member exits the member schedule editor by closing the web browser.

Figure 15A:
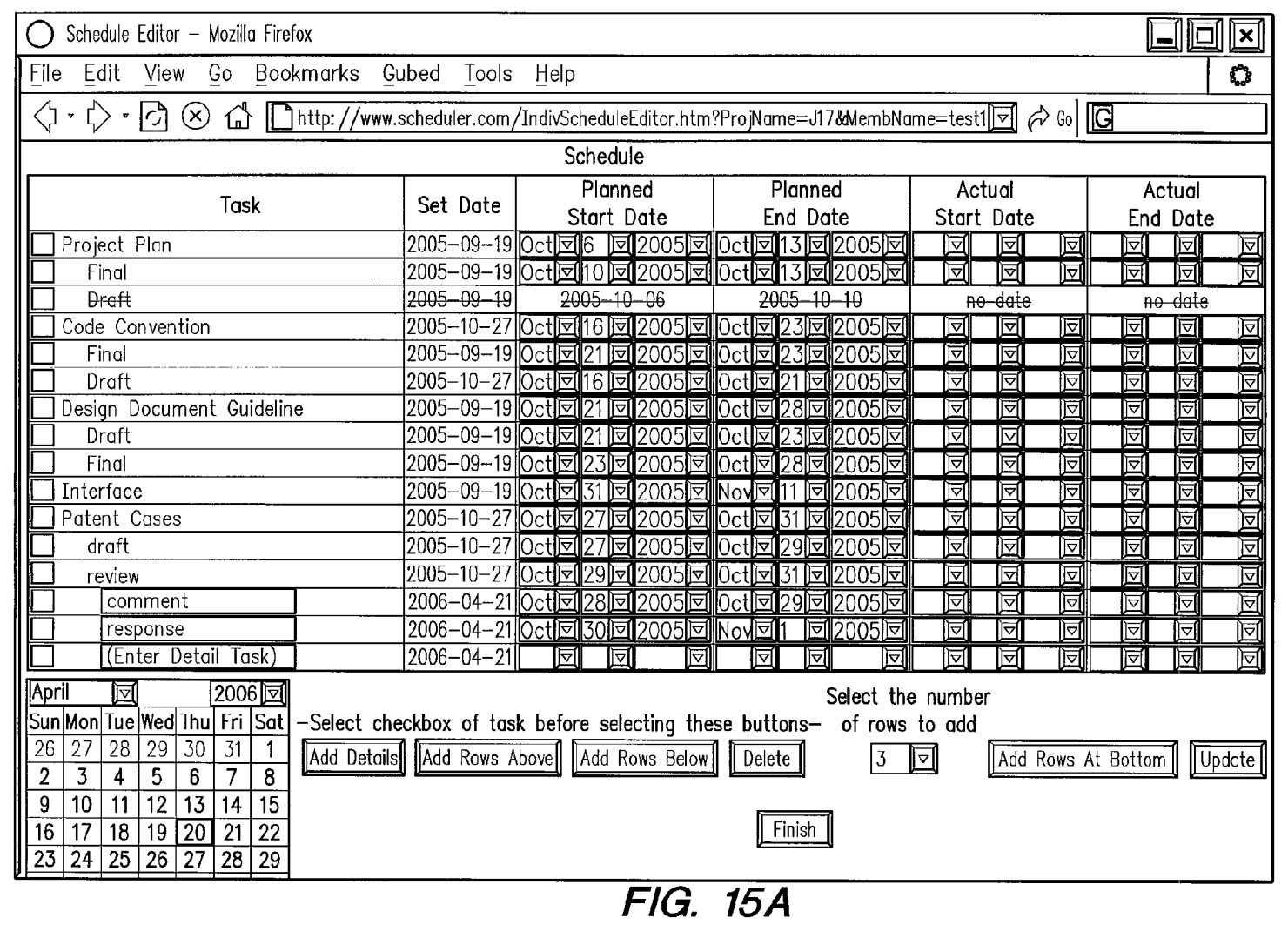

FIG. 15A is a screenshot illustrating a member schedule editor in which some of the schedules of the tasks were modified, according to an embodiment of the invention. The tasks were modified by deleting Draft task of Project Plan and adding detail tasks for review of Patent Cases, which affects the task schedule of review and Patent Cases. FIG. 15B is a screenshot illustrating the member schedule editor that results from the "Update" being selected after the modifications in FIG. 15A, according to an embodiment of the invention. Each upper level task schedule may be affected by the change in the lower level task as shown in FIG. 15B by adding detail tasks to review of Patent Cases. FIGS. 42 through 46 depict an example of a member's schedule editor session involving edits and associated results.

For all the editors that are displayed in the web browser in the client processor 602 (FIG. 6), information about each task is maintained by the editors. For example, the member schedule editor maintains, for each row corresponding to a task: the task name, task ID, set dates, planned dates, actual dates, revision number, level, and parent task ID. Also, the type of modification to a task in the editors is maintained so that when the information about the task is passed to the server processor 604 (FIG. 6), the appropriate process is performed to update the information about the task in the database 606 (FIG. 6). For example, the types of modifications for tasks in the member schedule editor are No Change, Added, Deleted, Edited (planned dates changed), and Updated (actual dates are set).

Updating Upper Level Tasks with Lower Level Tasks

For a member's schedule, the update of the upper level task with the lower level tasks occurs within the client processor 602 (FIG. 6) (e.g., Javascript manages and maintain the schedules of all the tasks in the web browser). The results of the update are passed to the server processor 604 (FIG. 6) so the results are updated in the database 606 (FIG. 6). For a task at any level, all the schedules of its subtasks (one level lower) are used to determine the earliest planned and actual start date and the latest planned end date. The latest actual end date is also determined but it is only used if all the subtasks have actual end dates to indicate that the task is completed. If the earliest planned start date and/or the latest planned end date of the subtasks differ from that for the task, then the planned dates of the task can be edited in the editor. When the session is finished, the planned task schedule is updated in the database 606. A new record is added in the database for this task schedule with the revision number incremented by 1 to indicate the latest revision of the task's schedule. If the earliest actual start date of the subtasks differ from that for the task, then the actual dates of the task can be updated in the editor. When the session is finished, the actual task schedule is also updated in the database. The existing record with the highest revision number will be updated with the actual dates. In the process of updating the upper level tasks with lower level tasks, the client processor 602 begins with the lowest level task and works upward to the upper level task(s) to update the schedule.

Figure 16:
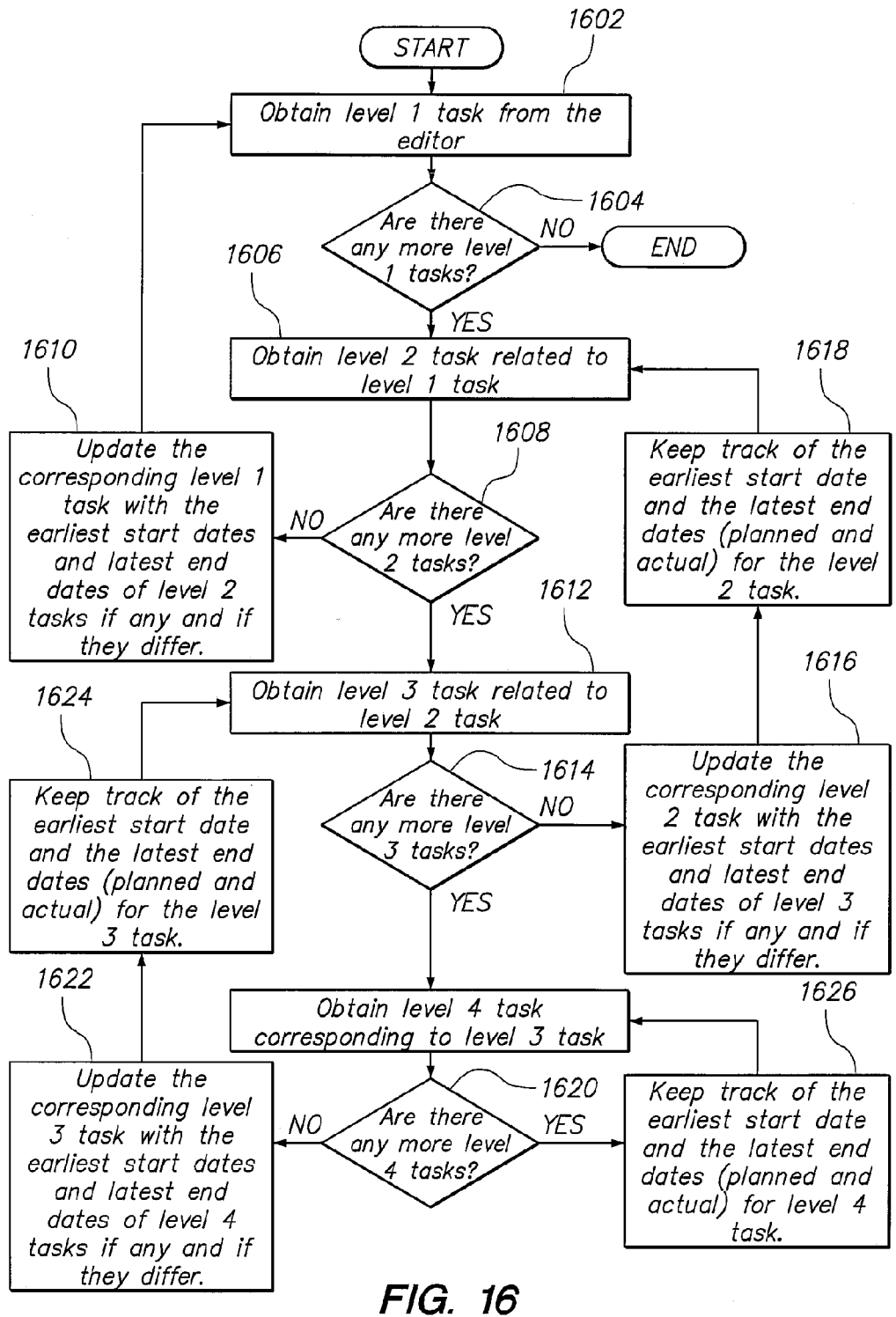
FIG. 16 is a flowchart illustrating a process of updating upper level tasks with the lower level tasks, according to an embodiment of the invention.

FIG. 16 is a flowchart illustrating a process of updating upper level tasks with the lower level tasks, according to an embodiment of the invention. This flowchart depicts the lowest level to be level 4, however, the process is not limited to use with four levels of tasks. A non-limiting example of task levels from upper level to lowest level is System Design of a software system, Component Design, Package Design, and Class Design.

A level 1 task is obtained from the member schedule editor, block 1602. At decision block 1604, it is determined whether there are any more level 1 tasks and, if not, the process ends. If there are more level 1 tasks, then a level 2 task that is related to the level 1 task selected at block 1602 is obtained, block 1606. At decision block 1608, it is determined whether there are any more level 2 tasks associated with the level 1 task selected at block 1602 and, if not, then the corresponding level 1 task is updated with the earliest start dates and latest end dates of level 2 tasks, if the corresponding level 2 tasks exist and differ from the level 1 task, block 1610. Control then passes back to block 1602 to obtain another level 1 task from the editor, if any. If there are more level 2 tasks associated with the level 1 task selected at block 1602, then a level 3 task that is related to the level 2 task selected at block 1606 is obtained, block 1612. At decision block 1614, it is determined whether there are any more level 3 tasks associated with the level 2 task selected at block 1606 and, if not, then the corresponding level 2 task is updated with the earliest start dates and latest end dates of level 3 tasks, if the corresponding level 3 tasks exist and differ from the level 2 task, block 1616. At block 1618, the earliest start date and the latest end dates (planned and actual) for the level 2 tasks are tracked, and control passes back to block 1606 to obtain another level 2 task corresponding to the level 1 task selected at block 1602.

If it is determined at block 1614 that there are more level 3 tasks, then a level 4 task that corresponds to the level 3 task selected at block 1612 is obtained, block 1618. At decision block 1620, it is determined whether there are any more level 4 tasks associated with the level 3 task selected at block 1612 and, if not, then the corresponding level 3 task is updated with the earliest start dates and latest end dates of level 4 tasks, if the corresponding level 4 tasks exist and differ from the level 3 task, block 1622. At block 1624, the earliest start date and the latest end dates (planned and actual) for the level 3 tasks are tracked, and control passes back to block 1612 to obtain another level 3 task corresponding to the level 2 task selected at block 1606. If it is determined at block 1620 that there are more level 4 tasks, then the earliest start date and the latest end dates (planned and actual) for the level 4 tasks are tracked, block 1626, and control passes back to block 1618 to obtain another level 4 task corresponding to the level 3 task selected at block 1612.

Aggregating the Project Schedule with Assigned Subtasks

Figure 17:
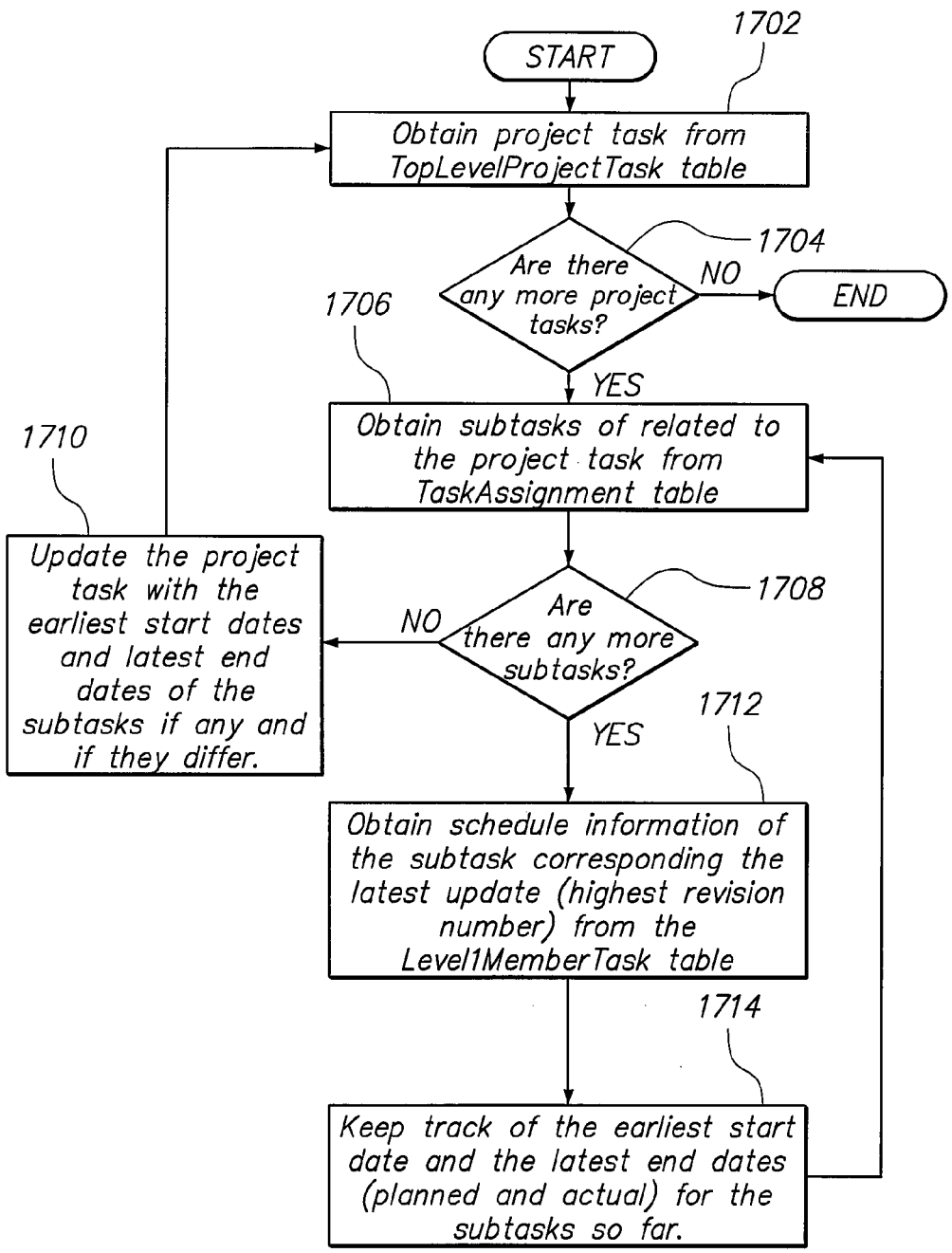
FIG. 17 is a flowchart illustrating a process of aggregating the project task schedule with the subtasks assigned to various project members, according to an embodiment of the invention.

For the project schedule, unlike the member schedule, the aggregation of the project tasks with its subtasks that are assigned to project members occurs on the server processor 604 (FIG. 6). This aggregation occurs when the project manager selects "Consolidate" or "Finish" in the project schedule editor (e.g., FIG. 2A). FIG. 17 is a flowchart illustrating a process of aggregating the project task schedule with the subtasks assigned to various project members, according to an embodiment of the invention.

Information from the tables TopLevelProjectTask 1204, TaskAssignment 1202, and Level1MemberTask 1206 (FIG. 12) is used to update the project task schedule. Only the schedules of the subtasks with the latest update (highest revision number), which are not deleted from the schedule, are considered. The schedules for the subtasks will be used to obtain the earliest start date and latest end dates for all the subtasks. The earliest start dates and latest end dates of the subtasks will be used to update the schedule of the project task if they are different. The planned project task schedule will be updated in the database, whereby a new record will be added in the TopLevelProjectTask 1204 table for this project task with the revision number incremented by 1 to indicate the latest revision of the project task's schedule. The actual task schedule will also be updated in the database, whereby the existing record with the highest revision number will be updated with the actual dates. FIGS. 47 through 50 depict an example of a project schedule editor session involving aggregation of subtasks with project tasks and associated results.

The project tasks are obtained from the TopLevelProjectTask 1204 table, block 1702. At decision block 1704, it is determined whether there are any more project tasks and, if not, the process ends. If there are more project tasks, then for each project task, the subtasks are obtained from the TaskAssignment 1202 table, block 1706. At decision block 1708, it is determined whether there are any more subtasks. If there are no more subtasks, then the project task is updated with the earliest start dates and latest end dates of the subtasks if any exist and differ from the project task, at block 1710, and control passes back to block 1702 to obtain a project task. If it is determined at block 1708 that there are more subtasks, then the schedule information of the subtask corresponding to the latest update (i.e., with the highest revision number) is obtained from the Level1MemberTask 1206 table, block 1712. At block 1714, the earliest start date and the latest end dates (planned and actual) are tracked for the subtasks so far, and control passes back to block 1706 to obtain another subtask related to the project task obtained at block 1702, if any, from the TaskAssignment 1202 table.

Example Screenshots of a Project Schedule Management System

Figure 18:
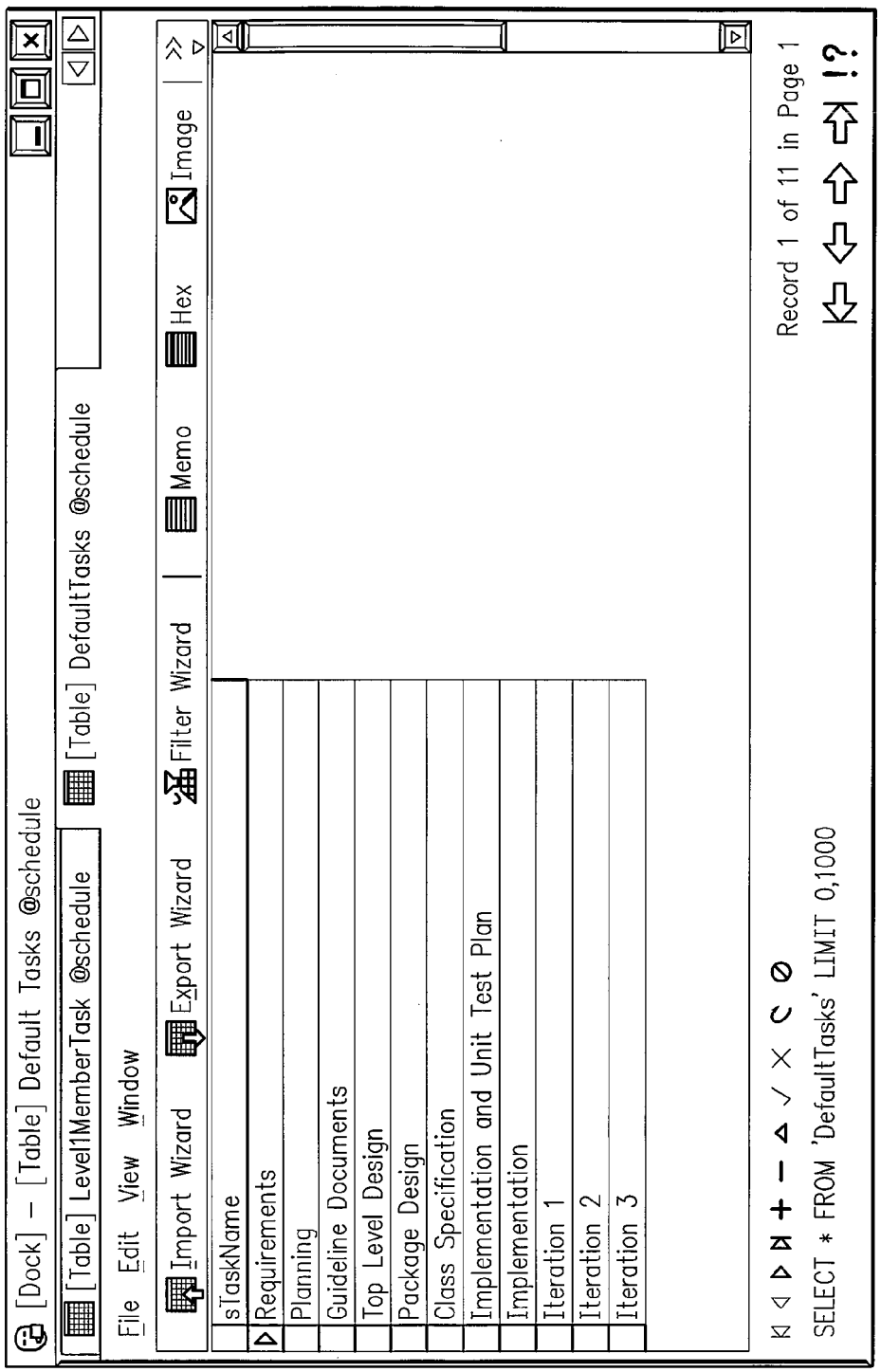
FIG. 18 is a screenshot illustrating sample entries in the DefaultTasks table, according to an embodiment of the invention.

FIG. 18 is a screenshot illustrating sample entries in the DefaultTasks 1212 table (FIG. 12), according to an embodiment of the invention. These tasks are displayed in the task assignment editor in the project task menu selection, for adding project tasks and assigning associated subtasks to project members, or in the project schedule editor, for adding project tasks and setting a planned schedule for the task. Tasks depicted in display pages similar to FIG. 18, from the DefaultTasks 1212 table, are project tasks that are common to many projects.

Figure 19:
FIG. 19 is a screenshot illustrating sample entries in the ProjectTeam table, according to an embodiment of the invention.

FIG. 19 is a screenshot illustrating sample entries in the ProjectTeam 1210 table (FIG. 12), according to an embodiment of the invention. This display page shows the project members of the J17 project. The nLevelXMaxTaskIDs are used to uniquely identify all the tasks for a member at all levels. Since no tasks have been scheduled by the members, all the nLevelXMaxTaskID are empty (null). Each member has been assigned (a) a task ID that will be used for assigning an ID to the member's tasks for all levels, (b) a member label that will be used in the display of the project schedule and task assignment showing the member associated with a task, (c) a member role number that is used to determine access privileges for the editors, and (d) a member directory indicating the directory location of at which a web page for the member's schedule is to be generated and stored.

Task Assignment Editor Session

FIG. 20 is a screenshot illustrating a sample task assignment editor session, according to an embodiment of the invention. Five project tasks have been added to the project: Planning, Requirements, Guideline Documents, Top Level Design, and Package Design. Subtasks have been added to the project tasks: 2 for Planning, 2 for Requirements, 5 for Guideline Documents, and 3 for Top Level Design. Each subtask is assigned to one of the project members identified in the ProjectTeam 1210 table (FIG. 12). The members are identified by a respective member label, as shown in FIG. 19. All information about the tasks and its assignment are managed within the table. The database will be updated with this information once the "Finish" button is selected. All the information entered in the editor is passed from the client processor (web browser) to the server processor (web server).

FIG. 21 is a screenshot illustrating information that is stored in the TaskAssignment 1202 table (FIG. 12) when the member selects the "Finish" button of the task assignment editor (FIG. 20), according to an embodiment of the invention. The table shows all the subtasks associated with the project tasks. The server processor assigns a task ID to each project task. However, the task ID for each subtask is not assigned when the task assignment editor session is completed. The task assignment editor affects no other tables of the database. FIG. 22 is a screenshot illustrating a web page created after the task assignment editor session depicted in FIG. 21, according to an embodiment of the invention.

Project Schedule Editor Session

Figure 23:
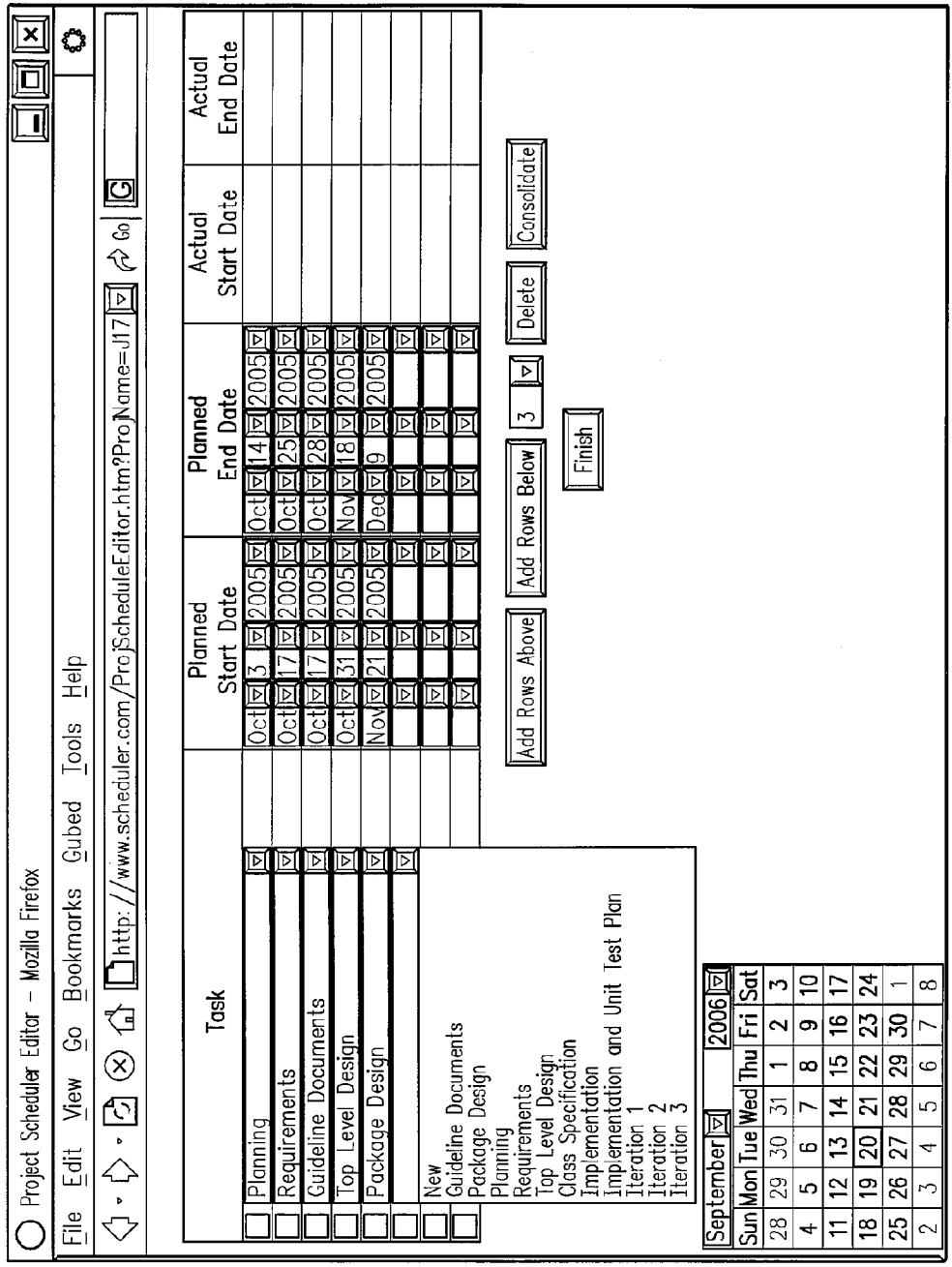
FIG. 23 is a screenshot illustrating a sample project schedule editor session, according to an embodiment of the invention.

FIG. 23 is a screenshot illustrating a sample project schedule editor session, according to an embodiment of the invention. Five project tasks have been selected and scheduled. The project task menu selection includes both project tasks added in the task assignment editor session and project tasks from the DefaultTasks 1212 table (FIG. 12) of the database (where project tasks added in the task assignment editor are also from the DefaultTasks in this particular example). The planned dates are set by selecting from the month, day, and year menu selections. The database is updated with this information once the "Finish" button is selected. All the information entered in the project schedule editor is passed from the client processor (web browser) to the server processor (web server).

FIG. 24 is a screenshot illustrating information that is stored in the TopLevelProjectTask 1204 table (FIG. 12) when the member selects the "Finish" button of the project schedule editor (FIG. 23), according to an embodiment of the invention. The task names and planned dates entered in the project schedule editor are added to the TopLevelProjectTask 1204 table. The date of the editor session in which the schedule was set is assigned to the setDate field of the table. Because, in this example, this is the first time the schedule is set for all the tasks, a revision number (nScheduleRevNumber) of 1 is added to the table.

Figure 26:
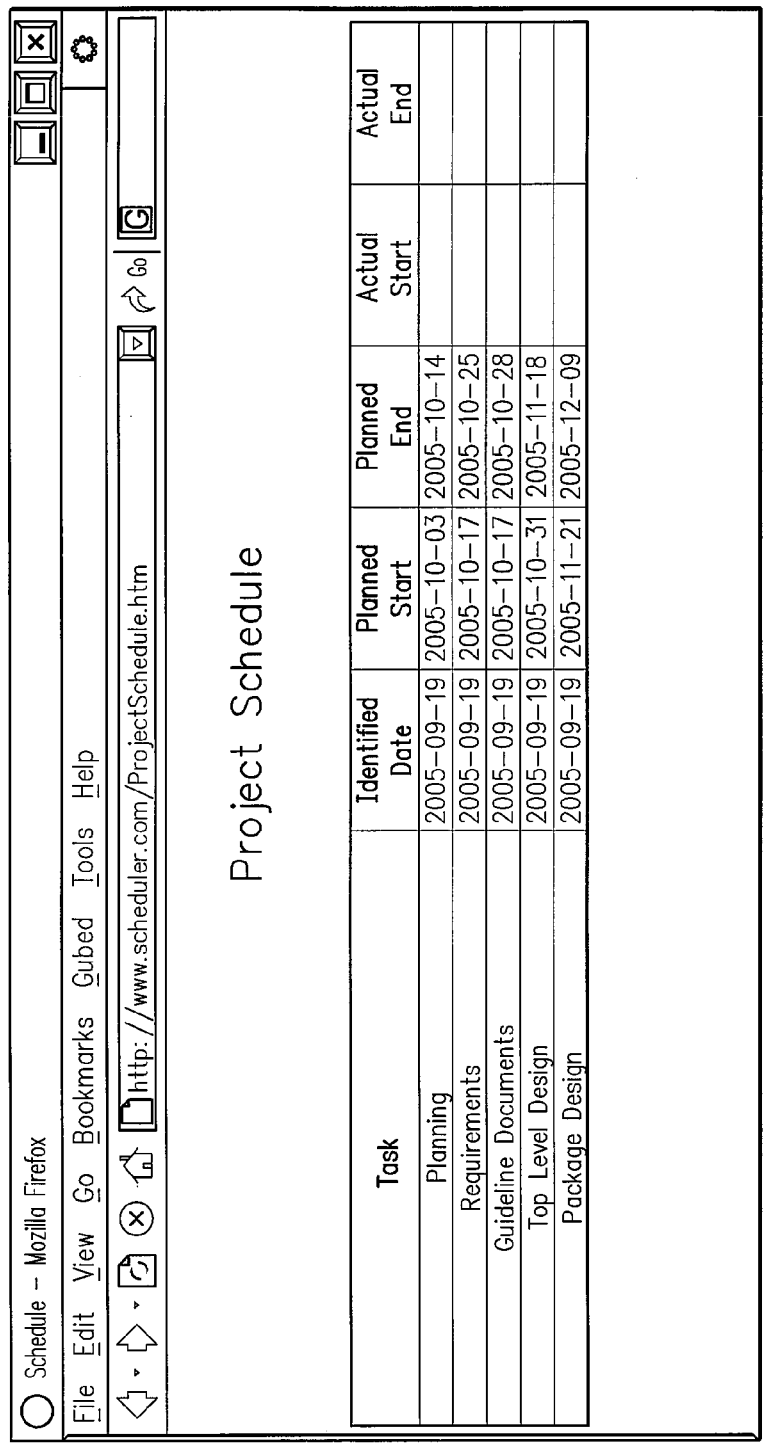
FIG. 26 is a screenshot illustrating a web page created after a project schedule editor session, according to an embodiment of the invention.

FIG. 25 is a screenshot illustrating information that is stored in the TaskAssignment 1202 table (FIG. 12) when the member selects the "Finish" button of the project schedule editor (FIG. 23), according to an embodiment of the invention. There is no change in the table based on this particular example, however the database design assigned to "T2" became obsolete, when compared to FIG. 21. If a task was added in the project schedule editor, then the task would have been added to this table with the appropriate task ID. FIG. 26 is a screenshot illustrating a web page created after the project schedule editor session depicted in FIG. 23, according to an embodiment of the invention.

Member Schedule Editor Session

A First Member Schedule Session

Figure 27:
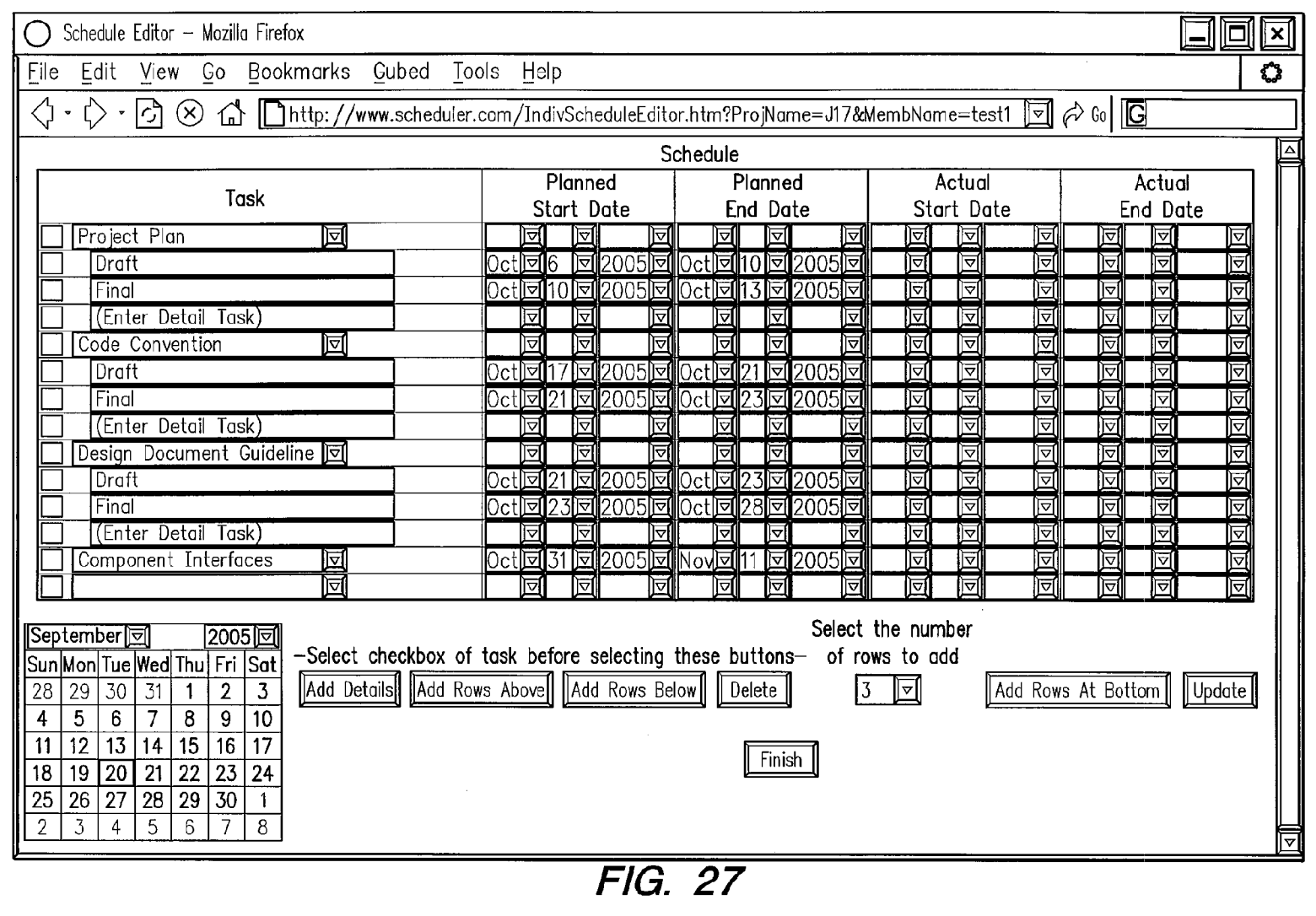

FIG. 27 is a screenshot illustrating a sample member schedule editor session for a project member (referred to as 'test1'), according to an embodiment of the invention. The task menu selection in the member schedule editor displays only the subtasks of the project tasks that were assigned to member 'test1'. The subtasks assigned to the member are obtained from the TaskAssignment 1202 table (FIG. 12). The member can select "New" to enter the member's own tasks which are not related to any of the project tasks. Since this is the first session for the member, the member adds four tasks: Project Plan, Code Convention, Design Document Guideline, and Component Interface. The member adds detailed tasks (level 2 tasks) to three of the four tasks: Project Plan, Code Convention, and Design Document Guideline. The member inputs the task name for each of the detailed tasks and sets the planned dates for the detailed tasks by selecting from the month, day, and year menu selection. The member sets the planned date for the level 1 task, Component Interfaces. To update all the level 1 tasks with the planned dates of the level 2 tasks in the member schedule editor, the member selects the "Update" button.

Figure 28:
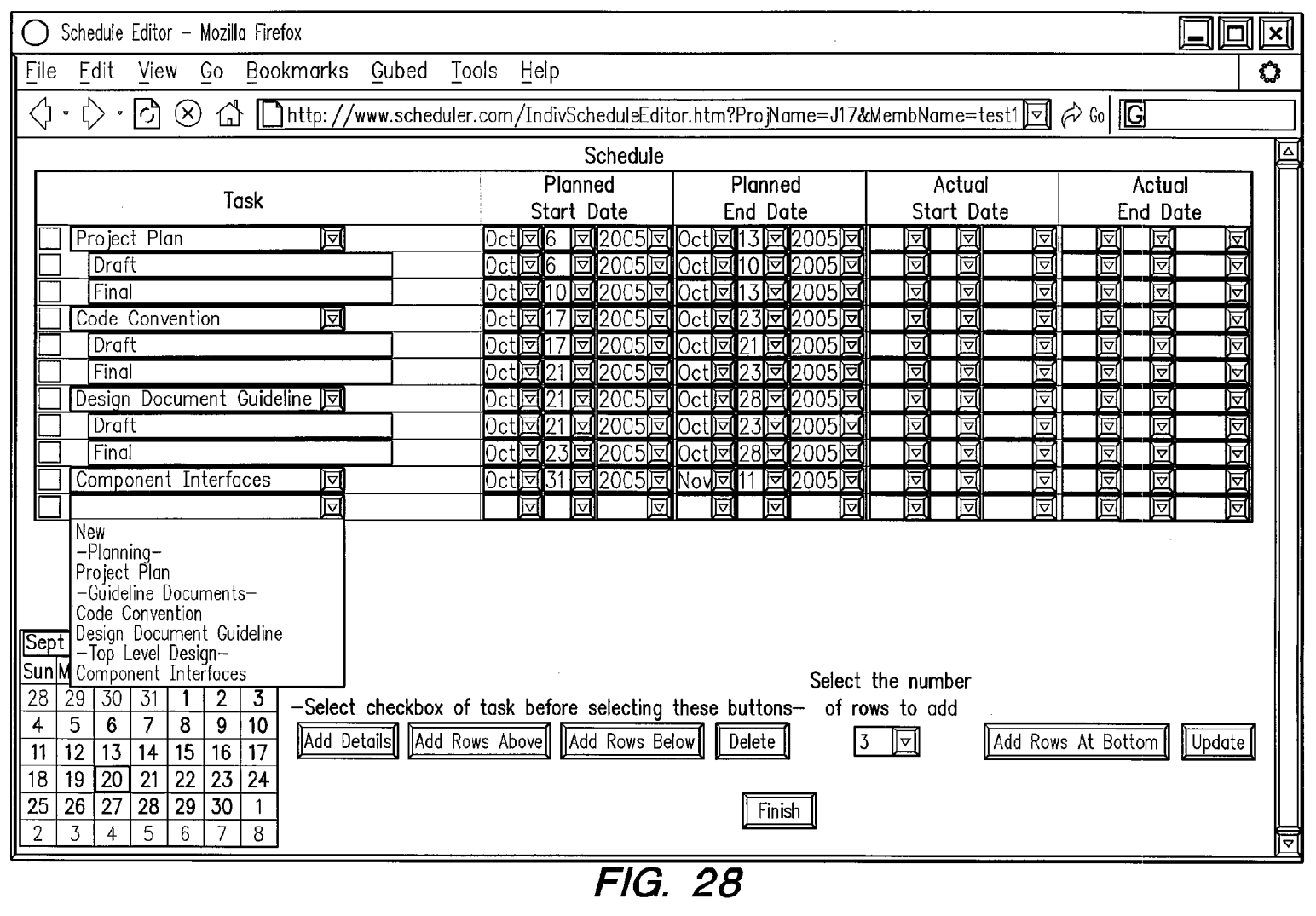

FIG. 28 is a screenshot illustrating a result of the "Update" button being selected in the context of the example member schedule session of FIG. 27, according to an embodiment of the invention. The earliest planned start date and the latest planned end date of the level 2 tasks are displayed in association with the corresponding level 1 task in the date menu selections. The method of update follows the process described in the flowchart of FIG. 16. The database is updated with the member task schedule information once the "Finish" button is selected. All the information entered in the member schedule editor is passed from the client processor (web browser) to the server processor (web server). Also note in FIG. 28 the task selection that the member can choose from.

Figure 29:
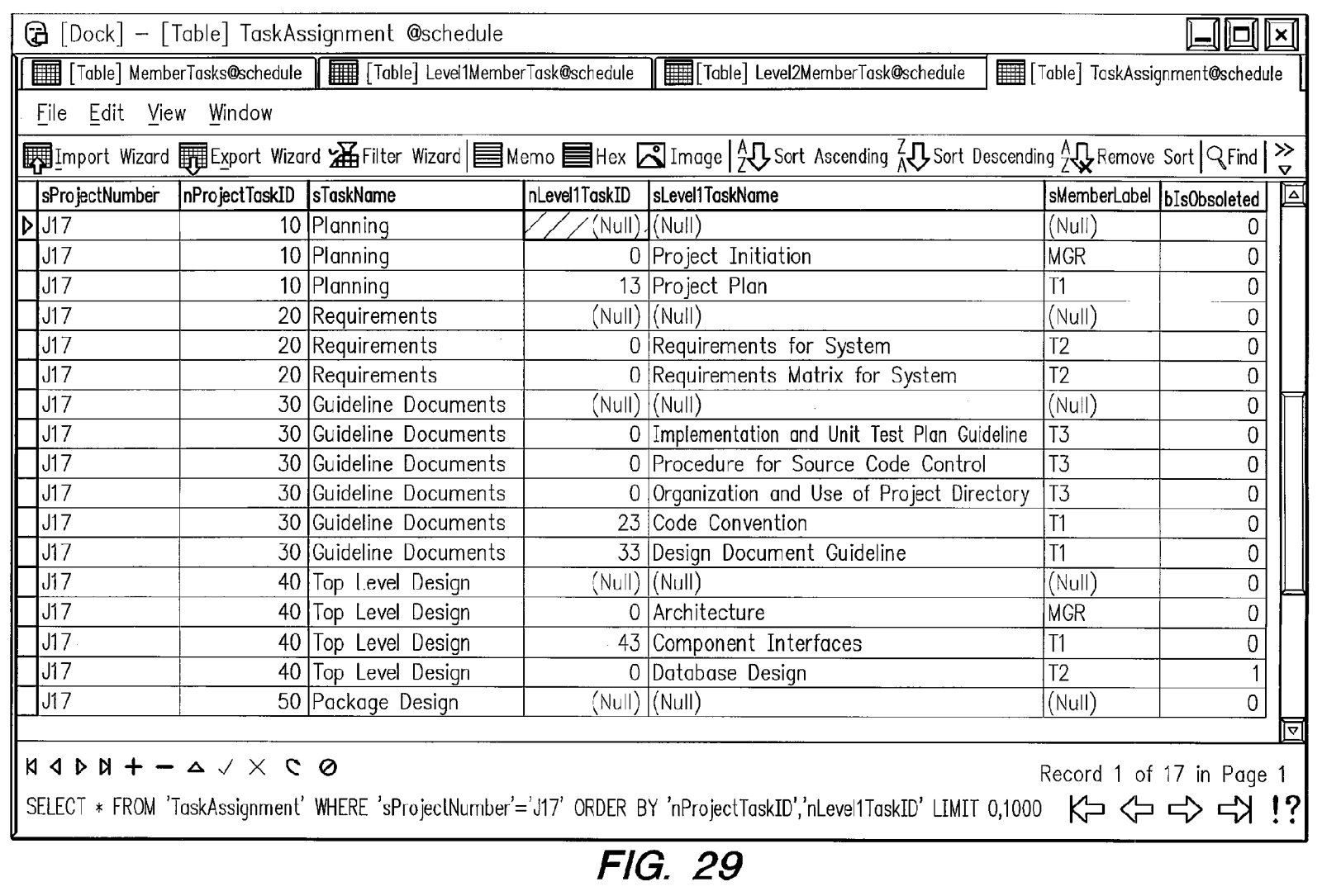

FIG. 29 is a screenshot illustrating information that is updated in the TaskAssignment 1202 table (FIG. 12) when the member selects the "Finish" button of the member schedule editor (FIG. 28), according to an embodiment of the invention. No new record is added to the table. However, in comparison with FIG. 25, the value for nLevel1TaskID for the tasks added by the member in the member schedule editor have been assigned (13 for Project Plan, 23 for Code Convention, 33 for Design Document Guideline, and 43 for Component Interface), according to the technique described herein.

Figure 30:
FIG. 30 is a screenshot illustrating information that is added to the MemberTasks table when the member selects the "Finish" button of the member schedule editor, according to an embodiment of the invention.

FIG. 30 is a screenshot illustrating information that is added to the MemberTasks 1208 table (FIG. 12) when the member selects the "Finish" button of the member schedule editor (FIG. 28), according to an embodiment of the invention. The IDs for the level 1 tasks and its corresponding level 2 tasks have been added to the table. The table shows the relation between the tasks through the task IDs. The task IDs have been determined from the values of nMemberTaskID and nLevelXMaxTaskID of the project member in the ProjectTeam 1210 table (FIG. 12).

FIG. 31 is a screenshot illustrating information that is added to the Level1MemberTask 1206 table (FIG. 12) when the member selects the "Finish" button of the member schedule editor (FIG. 28), according to an embodiment of the invention. The task names and planned dates entered in the editor are added to the Level1MemberTask 1206 table. The task IDs were assigned to the task using task ID information from the ProjectTeam 1210 table (FIG. 12). The value for nProjectTaskID (ID of the parent task) was originally assigned to the project task through the task assignment editor session. The date of the editor session in which the schedule was set is assigned to the setDate field of the Level1MemberTask 1206 table. Because this is the first time the schedule is set for all the member's tasks, a revision number (nScheduleRevNumber) of 1 is added to the Level1MemberTask 1206 table.

FIG. 32 is a screenshot illustrating information that is added to the Level2MemberTask 1214 table (FIG. 12) when the member selects the "Finish" button of the member schedule editor (FIG. 28), according to an embodiment of the invention. The task names and planned dates entered in the editor are added to the Level2MemberTask table 1214. The task IDs were assigned to the task using task ID information from the ProjectTeam 1210 table (FIG. 12). The value for nLevel1TaskID (ID of the level 1 task) was originally assigned when the level 1 task was added to the Level1MemberTask table. Even though the task names of the level 2 tasks may be the same, the nLevel2TaskID uniquely identifies the task and the nLevel1TaskID identifies the parent task of the task. The date of the editor session in which the schedule was set is assigned to the setDate field of the table. Because this is the first time the schedule is set for all the member's level 2 tasks, a revision number (nScheduleRevNumber) of 1 is added to the table.

Figure 33:
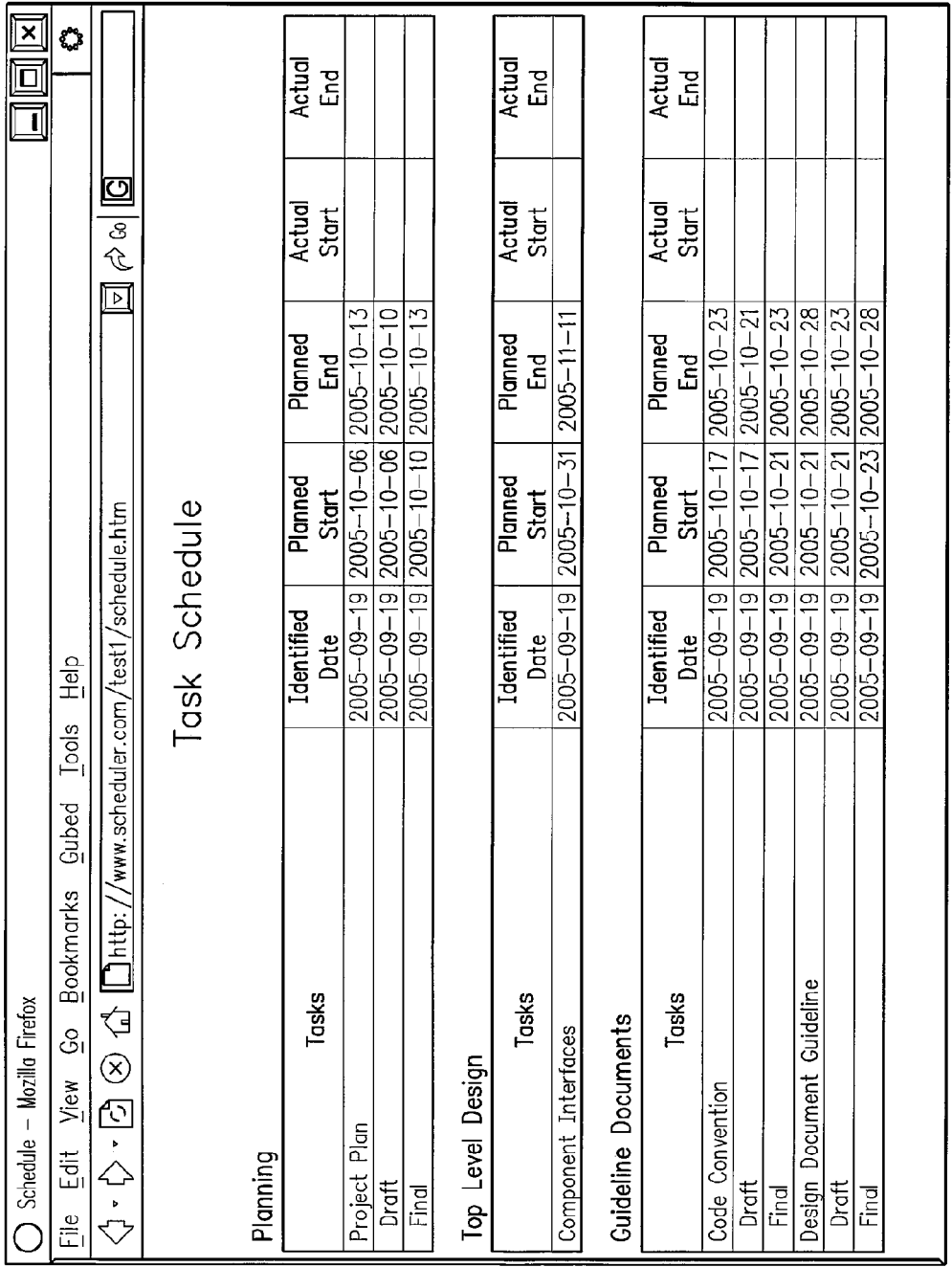
FIG. 33 is a screenshot illustrating a web page created after a member schedule editor session, according to an embodiment of the invention.

FIG. 33 is a screenshot illustrating a web page created after a member schedule editor session (FIG. 28), according to an embodiment of the invention.

A Second Member Schedule Session

Figure 34:
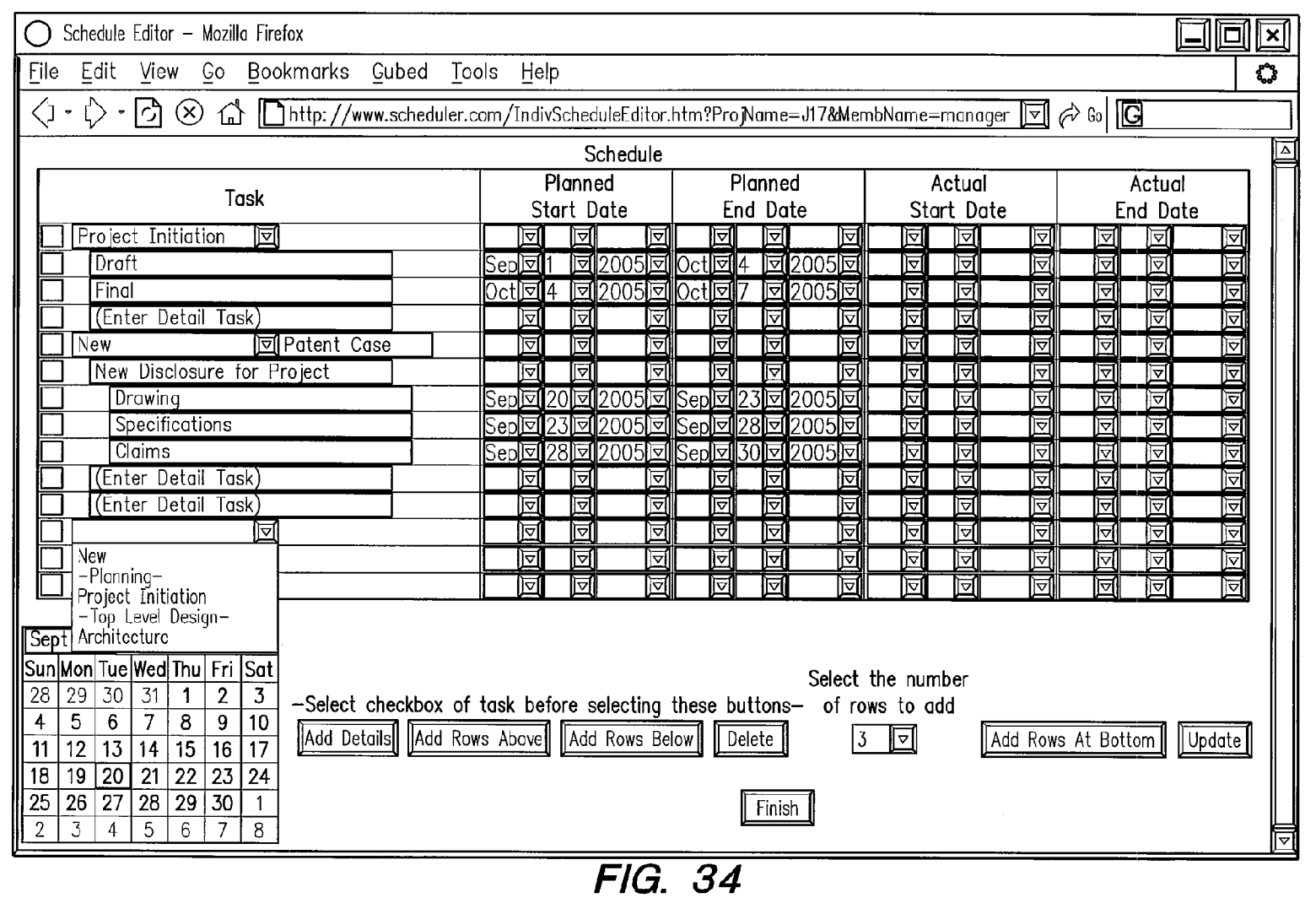

FIG. 34 is a screenshot illustrating a sample member schedule editor session for the project member manager, according to an embodiment of the invention. This example member schedule session involves adding multiple levels of tasks. The task menu selection in the member schedule editor displays only the subtasks of the project tasks assigned to the member (manager). The subtasks assigned to the member are obtained from the TaskAssignment 1202 table (FIG. 12) of the database. The member adds the task Project Initiation and adds detail tasks (level 2 tasks—Draft and Final) to the Project Initiation task. The member inputs the task name for each of the level 2 tasks and sets the planned dates for the level 2 tasks by selecting the month, day, and year menu selection. The member selects "New" to enter the member's own task, Patent Cases, which is not related to any of the project tasks. The member adds 1 detailed task (level 2 task—New Disclosure for Project) to Patent Cases. Then the member adds 3 detailed tasks (level 3 tasks—Drawing, Specifications, and Claims) to New Disclosure for Project. The member inputs the task name for each of the level 3 tasks and sets the planned dates for the level 3 tasks by selecting the month, day, and year menu selection. The member selects the "Update" button to update the planned dates for all the upper level tasks.

Figure 35:
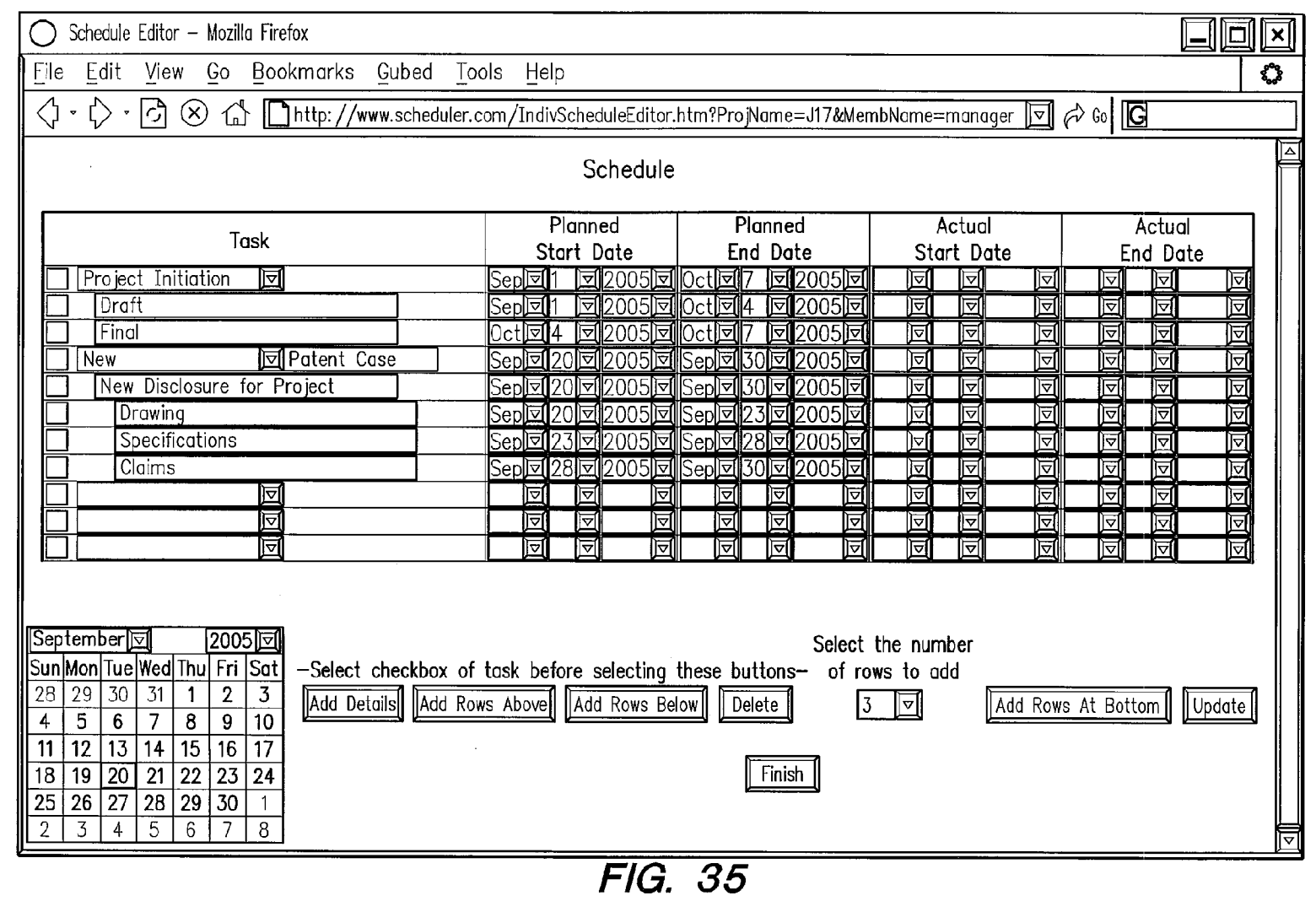

FIG. 35 is a screenshot illustrating a result of the "Update" button being selected, according to an embodiment of the invention. The method of update follows the process described in the flowchart of FIG. 16. The database is updated with the member task schedule information once the "Finish" button is selected. All the information entered in the editor is passed from the client processor (web browser) to the server processor (web server).

FIG. 36 is a screenshot illustrating information that is updated in the TaskAssignment 1202 table (FIG. 12) when the member selects the "Finish" button of the member schedule editor (FIG. 35), according to an embodiment of the invention. No new record is added to the table. However, in comparison with FIG. 29, the value for nLevel1TaskID for the tasks added by the member in the member schedule editor have been assigned (11 for Project Initiation). The new task added, Patent Cases, is not added to this table since it is not a project related task.

FIG. 37 is a screenshot illustrating information that is added to the MemberTasks 1208 table (FIG. 12) when the member selects the "Finish" button of the member schedule editor (FIG. 35), according to an embodiment of the invention. The IDs for the level 1, level 2, and level 3 tasks have been added to the table, in comparison with FIG. 35. The value of 21 for nLevel1TaskID corresponds to the new tasks referred to as Patent Cases. The table shows the relation between the tasks through the task IDs. The task IDs have been determined from the values of nMemberTaskID and nLevelXMaxTaskID of the project member in the ProjectTeam 1210 table (FIG. 12).

Figure 38:
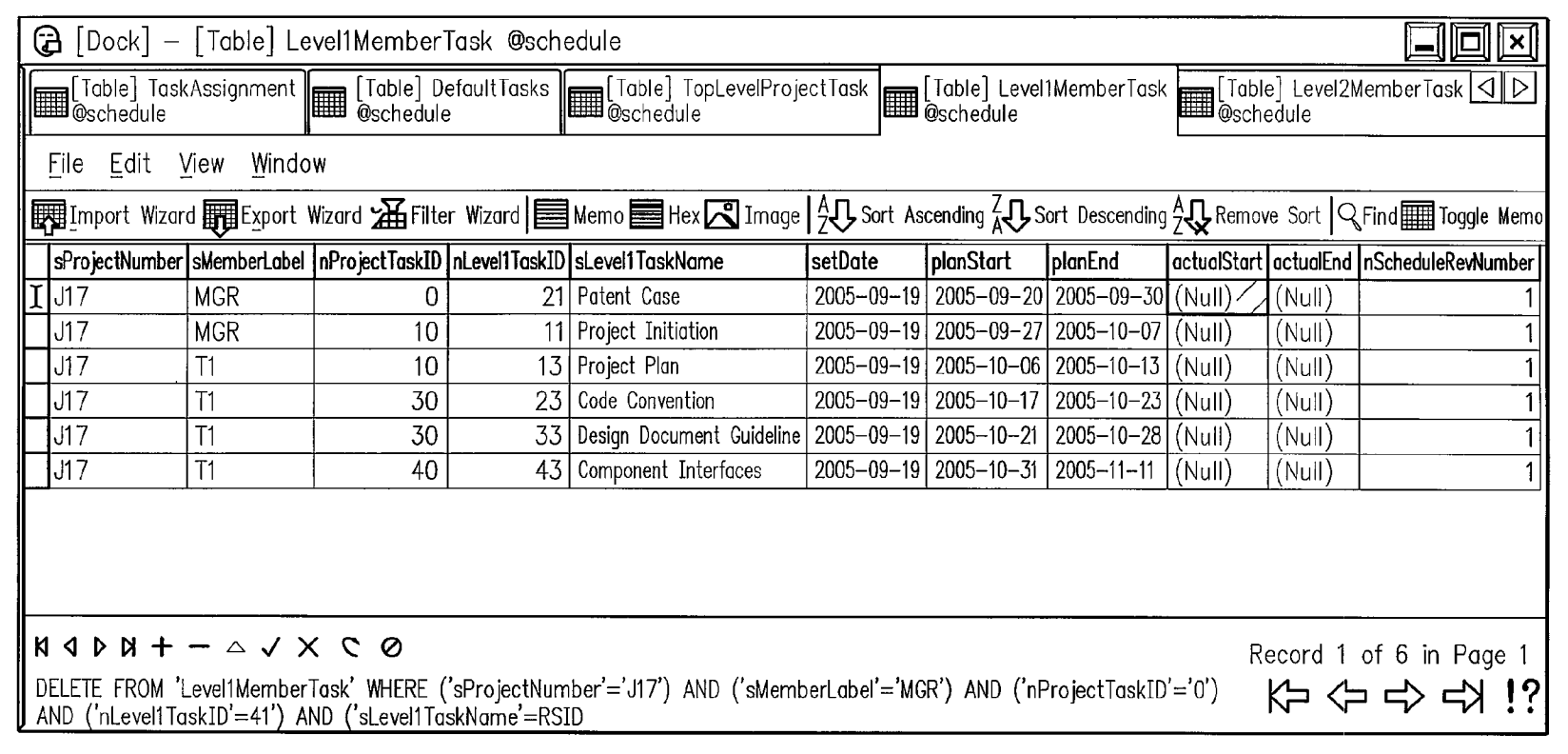

FIG. 38 is a screenshot illustrating information that is added to the Level1MemberTask 1206 table (FIG. 12) when the member selects the "Finish" button of the member schedule editor (FIG. 35), according to an embodiment of the invention. The task names and planned dates entered in the member schedule editor are added to the table, in comparison with FIG. 31. The task IDs were assigned to the task using task ID information from the ProjectTeam 1210 table (FIG. 12). The value for nProjectTaskID (ID of the parent task) was originally assigned to the project task through the task assignment editor session. A value of 0 is used for nProjectTaskID when the added task is not related to a project task. The date of the editor session in which the schedule was set is assigned to the setDate field of the Level1MemberTask 1206 table. Since this is the first time the schedule is set for all the member's tasks, a revision number of 1 is added to the Level1MemberTask 1206 table.

FIG. 39 is a screenshot illustrating information that is added to the Level2MemberTask 1214 table (FIG. 12) when the member selects the "Finish" button of the member schedule editor (FIG. 35), according to an embodiment of the invention. The task names and planned dates entered in the member schedule editor are added to the Level2MemberTask 1214 table, in comparison with FIG. 32. The task IDs were assigned to the task using task ID information from the ProjectTeam 1210 table (FIG. 12). The value for nLevel1TaskID (ID of the level 1 task) was originally assigned when the level 1 task was added to the Level1MemberTask 1206 table (FIG. 12). The date of the member schedule editor session in which the schedule was set is assigned to the setDate field of the Level2MemberTask 1214 table. Because this is the first time the schedule is set for all the member's level 2 tasks, a revision number of 1 is added to the table.

FIG. 40 is a screenshot illustrating information that is added to the Level3MemberTask 1216 table (FIG. 12) when the member selects the "Finish" button of the member schedule editor (FIG. 35), according to an embodiment of the invention. The task names and planned dates entered in the member schedule editor are added to the Level3MemberTask 1216 table. The task IDs were assigned to the task using task ID information from the ProjectTeam 1210 table (FIG. 12). The value for nLevel2TaskID (ID of the level 2 task) was originally assigned when the level 2 task was added to the Level2MemberTask 1214 table (FIG. 12). The date of the member schedule editor session in which the schedule was set is assigned to the setDate field of the Level3MemberTask 1216 table. Because this is the first time the schedule is set for all the member's level 3 tasks, a revision number of 1 is added to the Level3MemberTask 1216 table.

Figure 41:
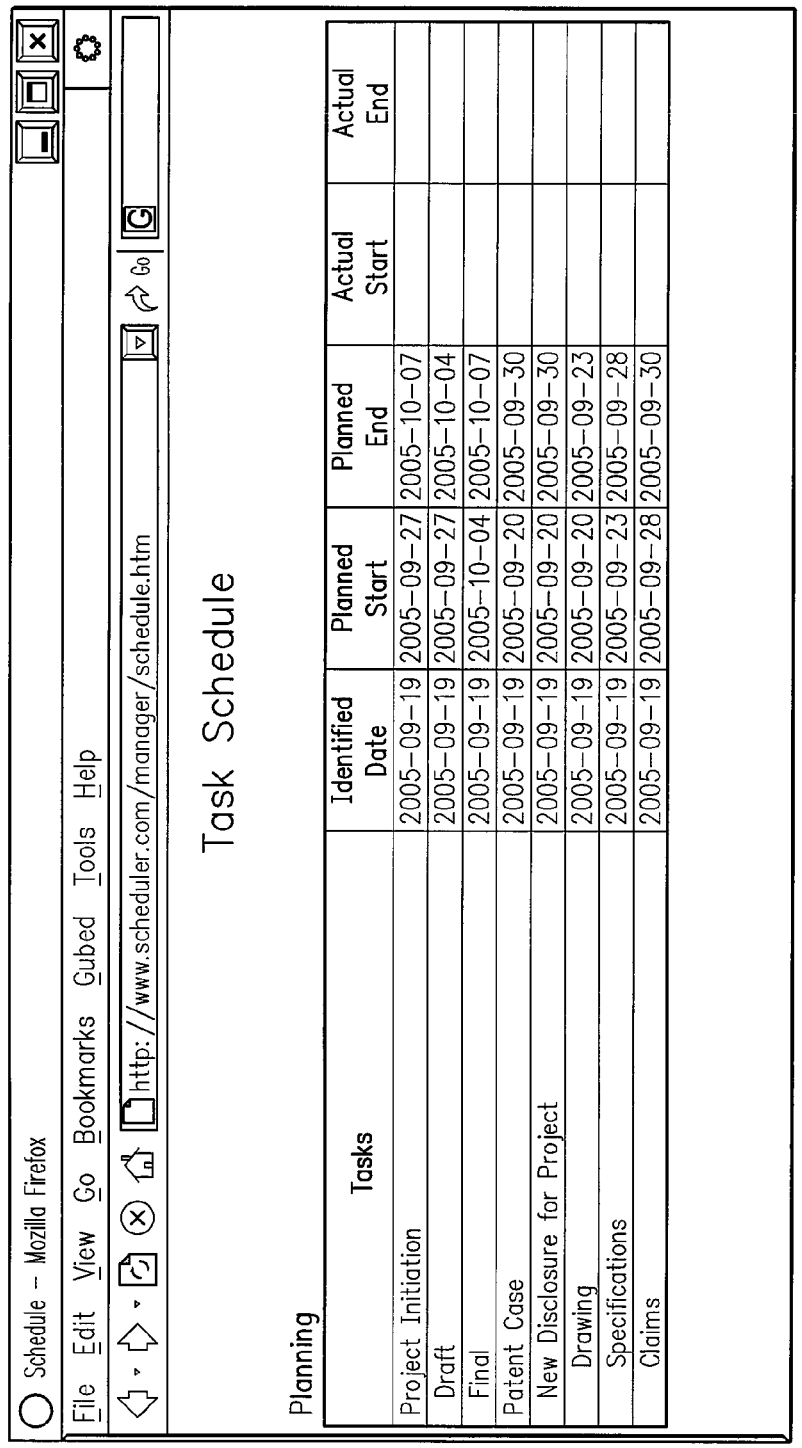
FIG. 41 is a screenshot illustrating a web page created after manager's member schedule editor session, according to an embodiment of the invention.

FIG. 41 is a screenshot illustrating a web page created after manager's member schedule editor (FIG. 35) session, according to an embodiment of the invention. Note that the row color for the non project task (Patent Case) differs from that of the project task (Project Initiation) for easy recognition.

FIG. 42 is a screenshot illustrating entries in the ProjectTeam 1210 table (FIG. 12) after two member schedule editor sessions (described in reference to FIGS. 27 and 34), according to an embodiment of the invention. The nLevelXMaxTaskID are updated, in comparison with FIG. 19, with the highest task IDs used so far for the current members. The one digit entry (1 and 3) indicates that no task scheduling has been assigned at the particular level of task yet.

A Third Member Schedule Session

Figure 43:
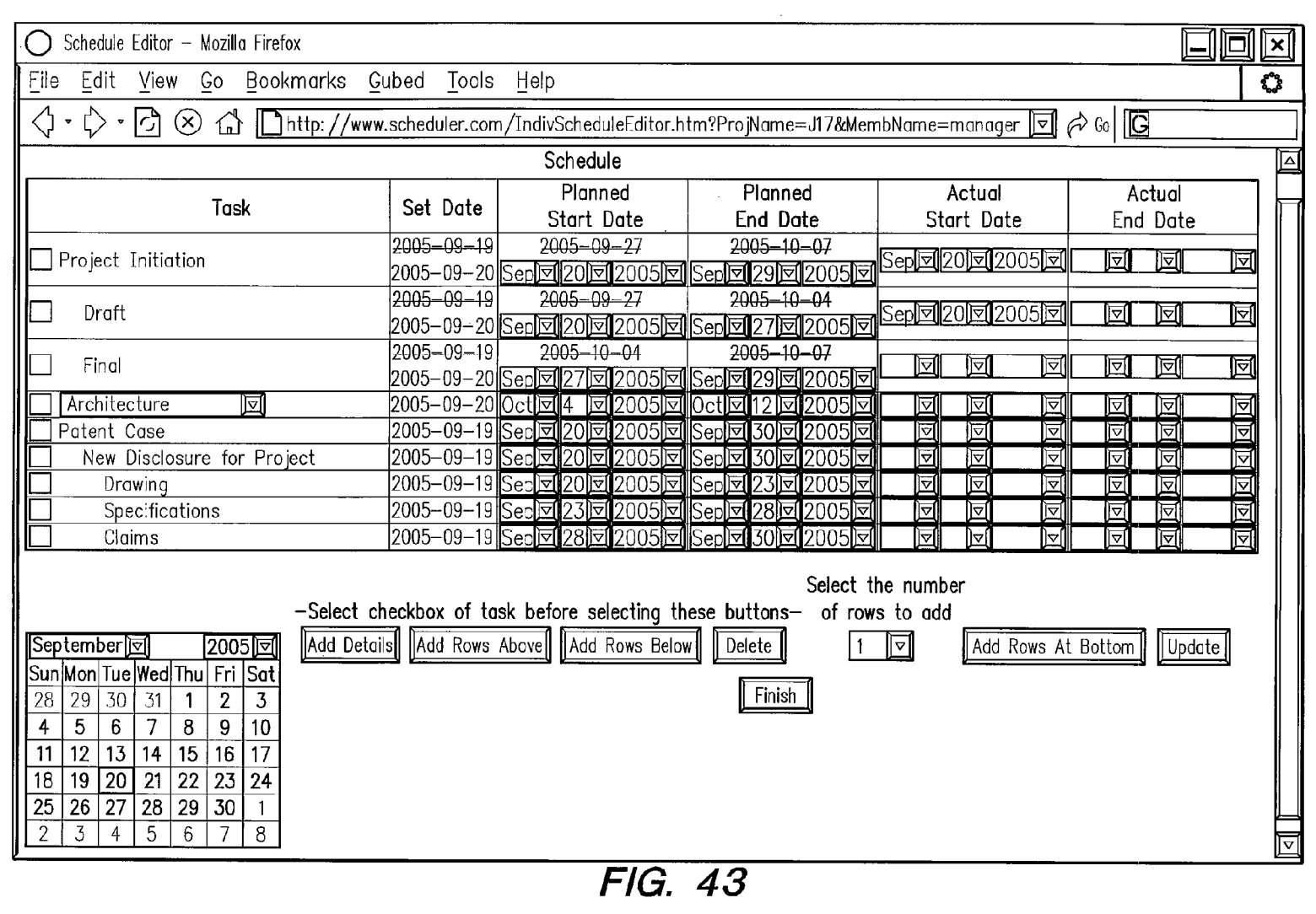

FIG. 43 is a screenshot illustrating a sample member schedule editor session with the project member manager, according to an embodiment of the invention. The member's schedule was created in a previous session so the member schedule editor shows the existing tasks with the planned dates. The member schedule editor also shows the date in which the schedule of the tasks was previously set (or modified). In this member schedule editor session, the member changes the planned dates of the level 2 tasks of Project Initiation—Draft and Final. The member updates the actual start date of the level 2 task of Project Initiation—Draft. The member adds a new task, Architecture, which is associated with the project task Top Level Design, and sets the planned dates for the Architecture task. The member selects the "Update" button to update the upper level tasks with the changes in the lower level tasks (only level 1 and 2 tasks of Project Initiation are affected). The member schedule editor is redisplayed with the updates. The previous set dates are displayed with strike through text, with the current date displayed below it as the new set date if there is any change in the planned dates of the tasks. The planned dates are displayed with strike through text with the new planned date displayed below it in the month, day, and year menu selection. The new actual dates are in the month, day, and year menu selection. The database is updated with the member task schedule information once the "Finish" button is selected. All the information entered in the member schedule editor is passed from the client processor (web browser) to the server processor (web server).

FIG. 44 is a screenshot illustrating information that is added to the Level1MemberTask 1206 table (FIG. 12) when the member selects the "Finish" button of the member schedule editor (FIG. 43), according to an embodiment of the invention. Comparison with FIG. 38 shows changes. Since there has been a change in the planned dates for the task Project Initiation, the task names and new planned dates in the member schedule editor are added to the Level1MemberTask 1206 table with a revision number of 2 indicating that this is the second scheduling of the task. The same task ID and parent task ID are used for this task, with the date of member schedule editor session as the new value for the setDate field of the Level1MemberTask 1206 table. If the date of the member schedule editor session was the same as the value of the setDate for the highest revision of the task, a new record for the task would not have been added with a higher revision number. Rather, the record for the task would have been modified with the changes in the planned dates. The actual dates are modified for the task with the highest revision in this Level1MemberTask 1206 table with the actual dates from the member schedule editor. Added to this Level1MemberTask 1206 table is the added tasks Architecture with project task ID originally set in the TaskAssignment 1202 table (FIG. 12) as shown in FIG. 36 and the task ID determined from the task ID information in the ProjectTeam 1210 table (FIG. 12) as shown in FIG. 42.

Figure 45:
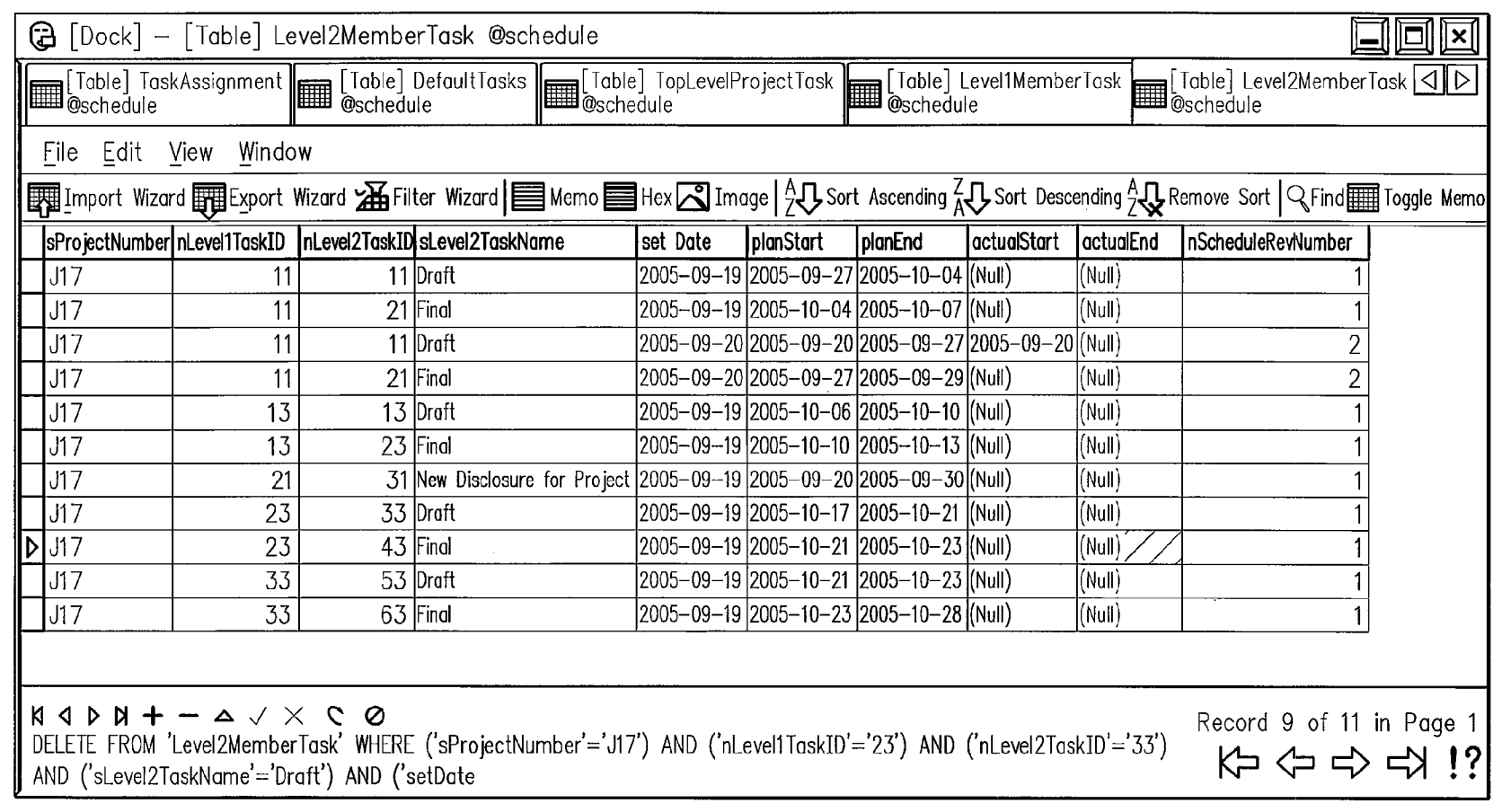

FIG. 45 is a screenshot illustrating information that is added to the Level2MemberTask 1214 table (FIG. 12) when the member selects the "Finish" button of the member schedule editor (FIG. 43), according to an embodiment of the invention. Comparison with FIG. 39 shows changes. Because there has been a change in the planned dates for the level 2 tasks, Draft and Final, of the level 1 task Project Initiation, the task names and new planned dates in the member schedule editor are added to the Level2MemberTask 1214 table with a revision number of 2 indicating that this is the second scheduling of the tasks. The same task IDs and parent task IDs are used for these tasks, with the date of the member schedule editor session as the new value for the setDate field of the Level2MemberTask 1214 table. The actual dates are modified for the task with the highest revision in this Level2MemberTask 1214 table with the actual dates from the member schedule editor.

Although not shown, the tables ProjectTeam1210, TaskAssignment 1202, and MemberTasks 1208 (FIG. 12) have been affected by the member schedule editor session. For the table ProjectTeam 1210, the nLevel1MaxTaskID for manager was updated to assign a task ID to task Architecture. For the table TaskAssignment 1202, the nLevel1TaskID for the sLevel1TaskName of Architecture was set with the new task ID that was assigned to it. For the table MemberTasks 1208, a new record was added for task Architecture with nLevel1TaskID set.

Figure 46:
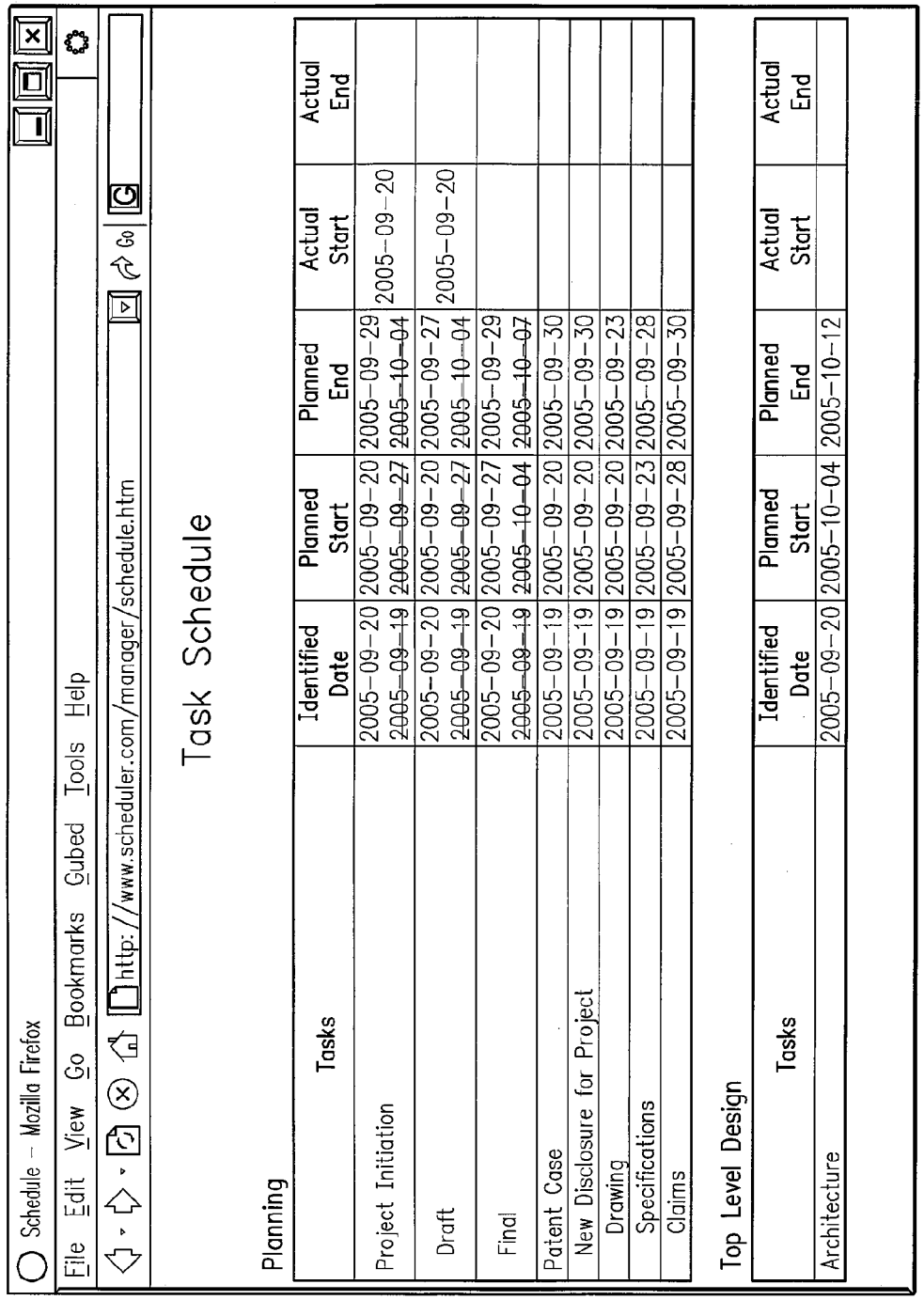
FIG. 46 is a screenshot illustrating a web page created after a manager's member schedule editor session, according to an embodiment of the invention.

FIG. 46 is a screenshot illustrating a web page created after a manager's member schedule editor session, according to an embodiment of the invention. The task schedule shows the history of the changes to the scheduling of the task. Previous schedules of a task are displayed in strike through text.

Project Schedule Editor Session

FIG. 47 is a screenshot illustrating another sample of a session with the project schedule editor, according to an embodiment of the invention. The project schedule editor shows the five tasks added and scheduled previously from the task assignment editor and project schedule editor. Also shown in the project schedule editor are the schedules of the subtasks of the project tasks. The subtask schedules are displayed below corresponding project task schedules. The project schedule editor shows the members (member label) that were assigned to those subtasks. The project schedule editor shows the date in which the schedule of the project tasks and subtasks were previously set or modified. The dates of the subtasks have not yet been aggregated with the dates of the project task. The earliest planned start dates and latest planned end dates of the subtasks do not align with the planned dates of the project task.

To aggregate the schedule of the subtasks with the project tasks, the member selects either the "Consolidate" button or the "Finish" button in the project schedule editor. Both will initiate the aggregation of the subtask schedule with the project schedule in the server processor 604 (FIG. 6). The method of aggregation follows the process described in the flowchart of FIG. 17. The "Consolidate" button causes the project schedule editor to be redisplayed with the aggregated schedule. FIG. 48 is a screenshot illustrating a project schedule editor redisplayed after the member selects the "Consolidate" button, according to an embodiment of the invention. All the project task dates are aligned with the subtask dates. Although no project tasks have been added or modified, such changes would have been added or updated in the database when the "Consolidate" button or the "Finish" button was selected.

FIG. 49 is a screenshot illustrating information that is stored in the TopLevelProjectTask 1204 table (FIG. 12) when the member selects the "Consolidate" and "Finish" buttons of the project schedule editor (FIGS. 47 and 48), according to an embodiment of the invention. After the aggregation of the subtasks with the project tasks using the process described in the flowchart of FIG. 17, the planned dates of the project tasks may have changed. If the planned dates have changed and if the set date of the latest revision of the project task is the same as the date of the project schedule editor session, then the record for the task will be updated with the planned dates for the latest revision of the task. If the set dates are not the same, then a new record for the task is added to the TopLevelProjectTask 1204 table with an incremented revision number (2, in this example, for Planning and Top Level Design) and the new planned dates. The actual dates are updated in the TopLevelProjectTask 1204 table for the project task with the highest revision number. Since no new tasks have been added or scheduled by the project schedule editor session, no other tables of the database are affected.

Figure 50:
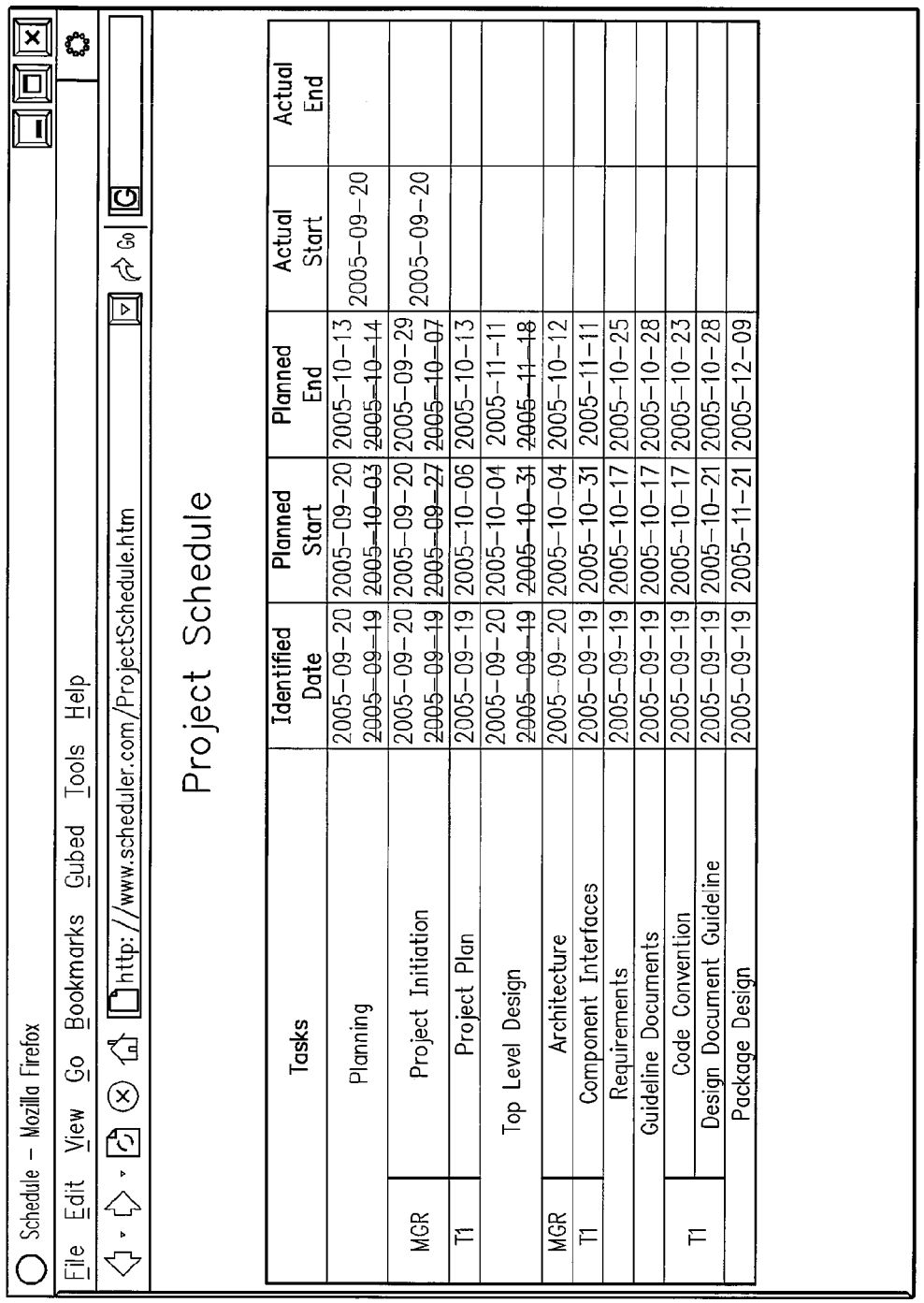
FIG. 50 is a screenshot illustrating a web page created after a project schedule editor session, according to an embodiment of the invention.

FIG. 50 is a screenshot illustrating a web page created after a project schedule editor session, according to an embodiment of the invention. The project schedule shows the history of the changes to the scheduling of the project tasks and subtasks. Previous schedules of a task are displayed in strike through text.

Assigning and Setting Schedules for Project Tasks by Project Manager

Figure 51:
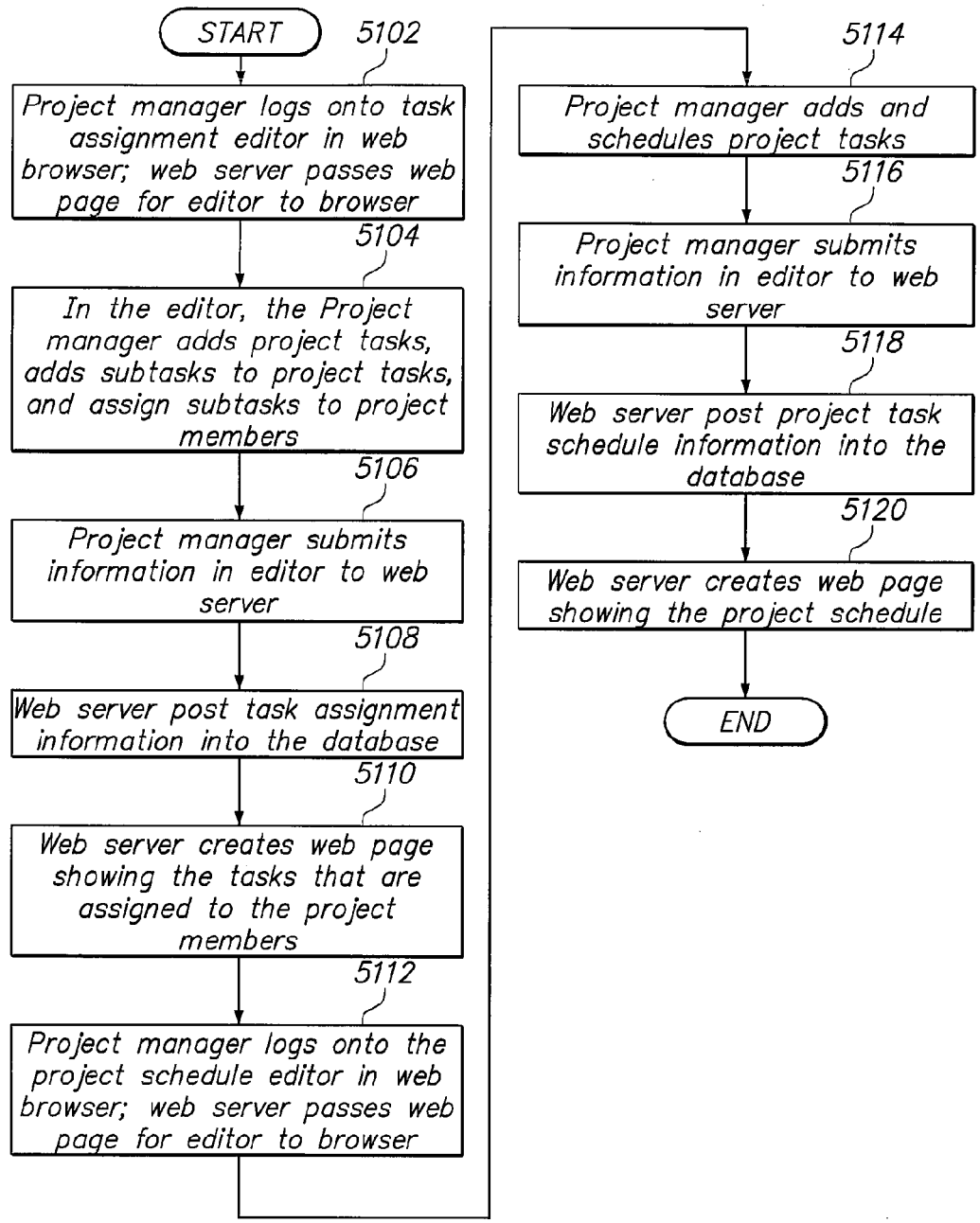
FIG. 51 is a flowchart illustrating behavior of the system as the project manager assigns tasks to a project member and sets the schedule for project tasks, according to an embodiment of the invention.

FIG. 51 is a flowchart illustrating example behavior of the system as the project manager assigns tasks to a project member and sets the schedule for project tasks, according to an embodiment of the invention. The manager logs onto the task assignment editor in a web browser and, after the web server validates and authenticates the login information, the web server passes the web page for the task assignment editor to the browser for display, block 5102. The manager performs various actions with the task assignment editor to add and assign tasks, block 5104. The manager submits all the information about task assignment to the web server when the manager selects the "Finish" button, block 5106. The web server obtains all the information from the task assignment editor about adding of project tasks and assignment of subtasks, and posts the information to the database, block 5108.

The web server creates a web page of the task assignment editor for project members, block 5110, which can be viewed in the web browser. Examples of the task assignment editor session, the posting of the information in the database, and the web page created are shown in FIGS. 20 through 22.

The manager logs onto the project schedule editor in a web browser and, after the web server validates and authenticates the login information, the web server passes the web page for the project schedule editor to the browser for display, block 5112. The manager performs various actions on the editor to add and schedule project tasks, block 5114. The manager submits all the information about the task schedule to the web server when the manager selects the "Finish" button, block 5116. The web server obtains all the information from the project schedule editor about adding of project tasks and associated schedules, and posts the information to the database, block 5118. The web server creates a web page for the project schedule, block 5120, which can be viewed in the web browser. Examples of the project schedule editor session, the posting of the information in the database, and the web page created are shown in FIGS. 23 through 26.

Setting Schedules for Project Tasks by Project Members

Figure 52:
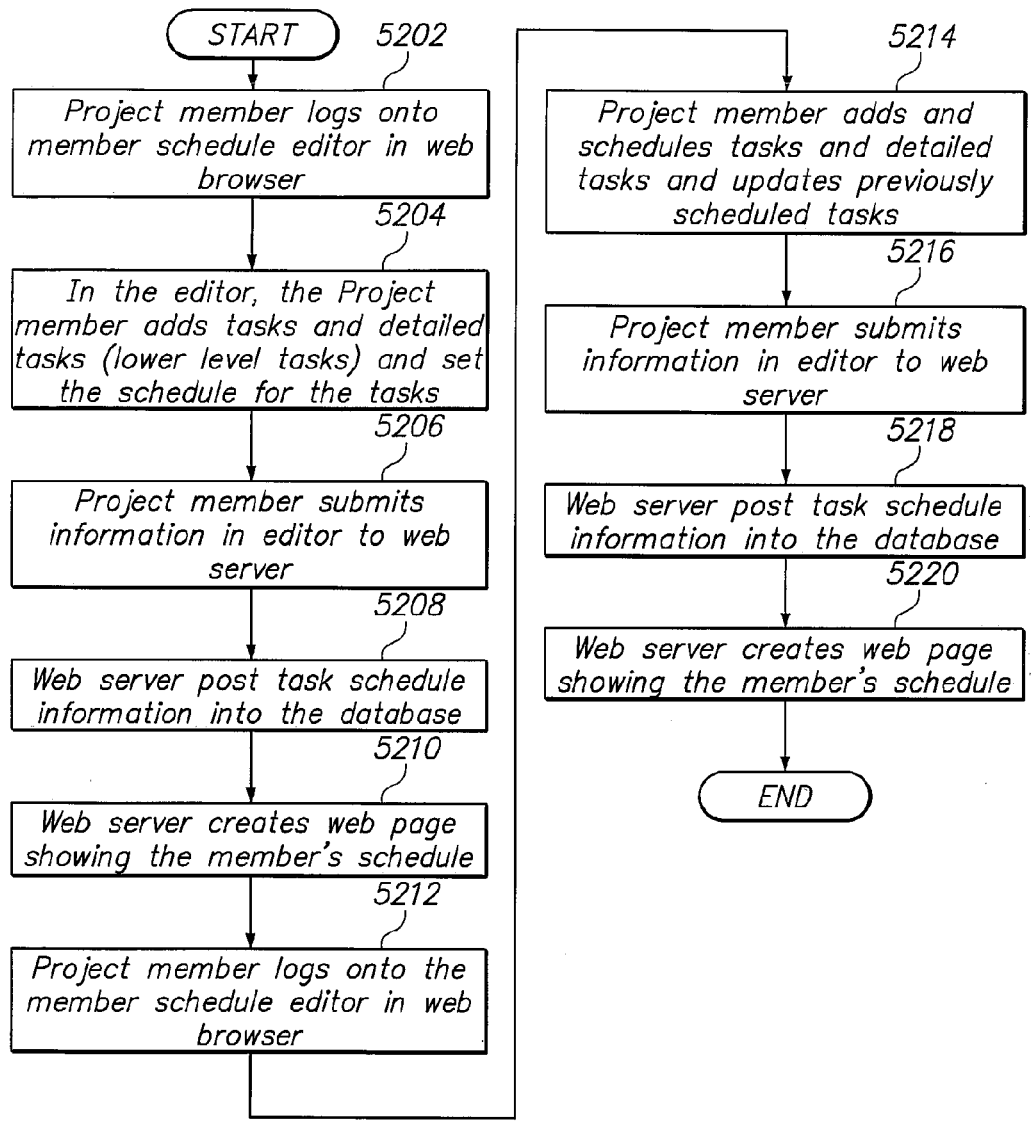
FIG. 52 is a flowchart illustrating behavior of the system as the project members set their own schedule for tasks, according to an embodiment of the invention.

FIG. 52 is a flowchart illustrating example behavior of the system as the project members set their own schedules for tasks and subtasks, according to an embodiment of the invention. The member logs onto the member schedule editor from a web browser, block 5202. After the web server validates and authenticates the login information, the web server passes the web page for the member schedule editor to the browser for display. The member performs various actions with the member schedule editor to add and schedule tasks of any level, block 5204. The member submits all the information about task schedule to the web server when the member selects the "Finish" button, block 5206. The web server obtains all the information from the member schedule editor about adding of tasks and associated schedules, and posts the information to the database, block 5208. The web server creates a web page for the member's schedule, block 5210, which can be viewed in the web browser. Examples of project schedule editor sessions, the posting of the information in the database, and the web page created are shown in FIGS. 27 through 41.

The member's schedule can be modified or updated by logging again to the member schedule editor in the web browser, block 5212. The member can schedule tasks at any level, edit the planned dates of existing tasks, and update the results of existing tasks, block 5214. The member submits all the information about task schedule to the web server when the member selects the "Finish" button, block 5216. The web server obtains all the information from the member schedule editor about adding, editing, or updating of tasks and associated schedules, and posts the information in the database, block 5218. The web server creates an updated web page for the member's schedule, block 5220, which can be viewed later in the web browser. Examples of project schedule editor sessions, the posting of the information in the database, and the web page created are shown in FIGS. 43 through 46.

Consolidating Member Schedules with the Project Schedule

Figure 53:
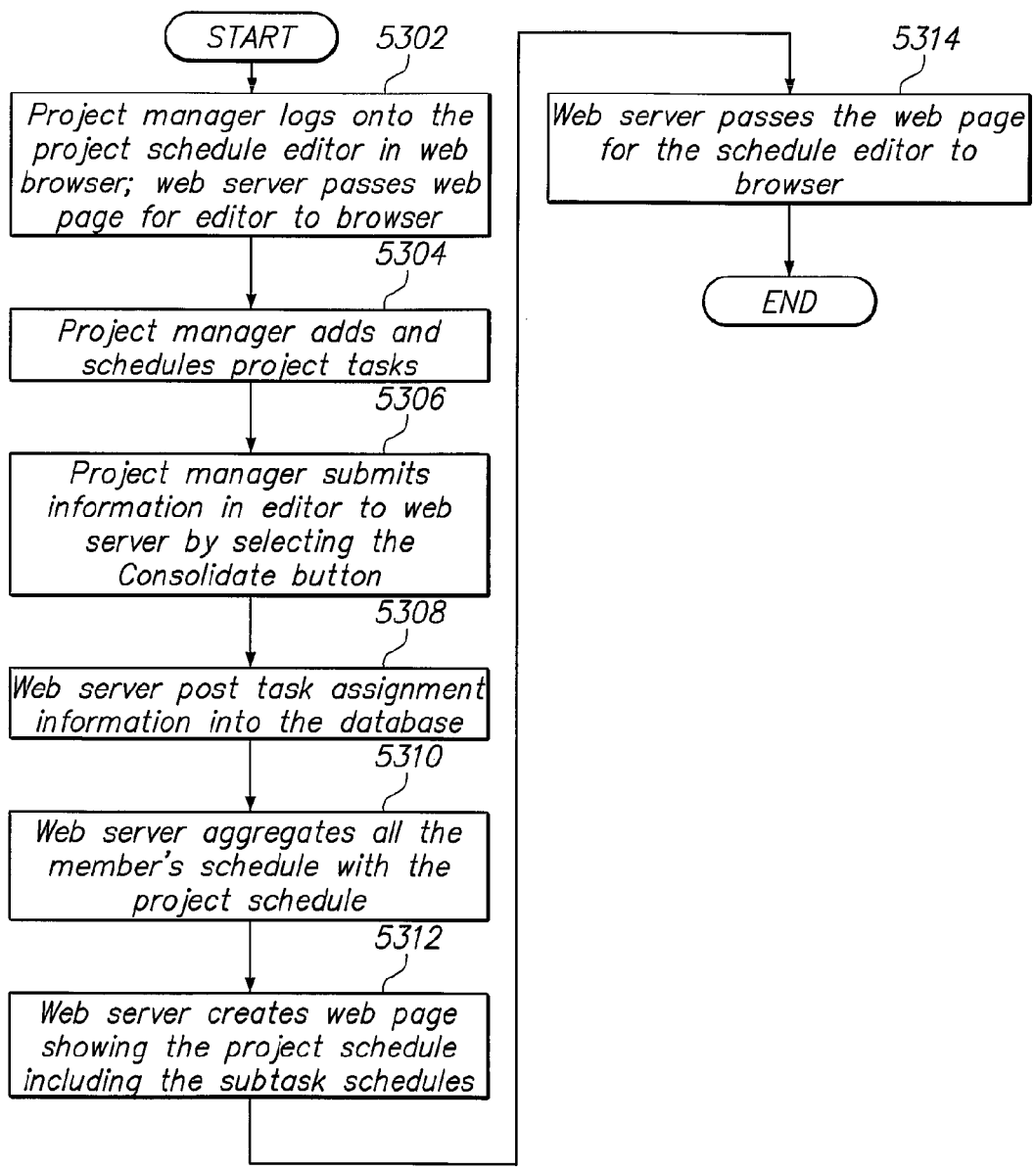
FIG. 53 is a flowchart illustrating behavior of the system as the project manager consolidates members' schedules with the project schedule, according to an embodiment of the invention.

FIG. 53 is a flowchart illustrating behavior of the system as the project manager consolidates members' schedules with the project schedule, according to an embodiment of the invention. The manager logs onto the project schedule editor in a web browser and, after the web server validates and authenticates the login information, the web server passes the web page for the editor to the browser for display, block 5302. The manager performs various actions on the editor to add and schedule project tasks, block 5304. The manager submits all the information about task schedule to the web server when the manager selects the "Consolidate" button, block 5306. The web server obtains all the information from the project schedule editor about the adding of project tasks and associated schedules, and posts the information to the database, block 5308.

At block 5310, the web server aggregates all the members' schedule with the project schedule using the process described in FIG. 17. The web server creates a web page for the project schedule containing the subtask schedules, block 5312, which can be viewed later in the web browser. The web server passes the web page for the project schedule editor back to the browser for display with updated information. Examples of the project schedule editor session, the posting of the information in the database, the redisplay of the editor in the web browser, and the web page created are shown in FIGS. 47 through 49.

Assigning Task Identifiers to Tasks

Figure 54:
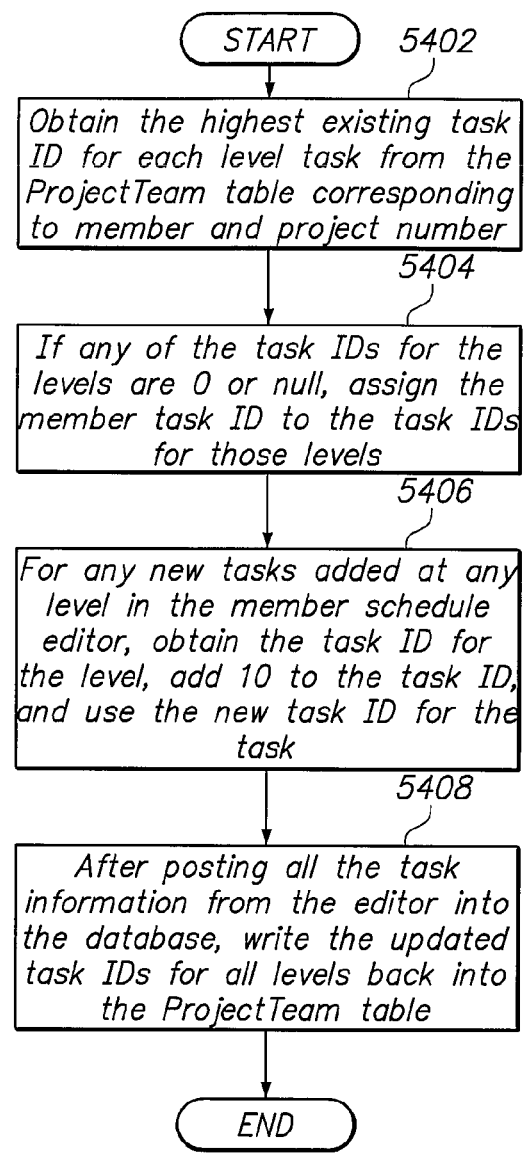
FIG. 54 is a flowchart illustrating a process of assigning task IDs to tasks of a project member at various levels, according to an embodiment of the invention.

FIG. 54 is a flowchart illustrating a process of assigning task IDs to tasks of a project member at various levels, according to an embodiment of the invention. The ProjectTeam 1210 table (FIG. 12) contains information about the task IDs that will be assigned to tasks for each project member of a project. FIGS. 19 and 42 show examples of the ProjectTeam 1210 table. The value of nMemberTaskID in the ProjectTeam 1210 table, in conjunction with the process of assigning task IDs illustrated in FIG. 54, prevent a task ID from being assigned to more than one task in a level when more than one member schedule editor session is occurring at one time. The table and process will guarantee that a task at any level is uniquely identified by the task ID.

The process in the flowchart of FIG. 54 is performed by the server processor (web server) after a project member completes a member schedule editor session. The server processor obtains the highest existing task ID for each affected task level from the ProjectTeam 1210 table, for the project member for the project number, block 5402. If any of the level task IDs are zero (or null), then the highest existing task ID for the level is set to the value of nMemberTaskID, block 5404. Each project member for a project number is assigned a unique member task ID at the beginning of the project before the schedules are created. Depending upon the size of the project team, the number can be MOD 10 if the team is small or MOD 100 or 1000 if the team is large. Task IDs will be increments of the MOD (10 for small team and 100 or 1000 for large team). If the editor contains any newly added task, a task ID is assigned to the task, block 5406. Depending on the level of the task, the highest task ID for that level is incremented by the MOD number and then assigned to the task. The highest task IDs for all levels is maintained as new tasks are added.

Once all the tasks have been posted in the database, the highest task IDs for each level is updated (if changed) in the ProjectTeam 1210 table, block 5408, for the project member for the project number. As an example, the values of the ProjectTeam 1210 table in FIG. 42 are used for adding new tasks for member 'test1'. New tasks are added to level 2 and 3 in the member schedule editor session of 'test1'. For the new level 2 task, use the highest task ID of 63, add 10 to make the highest task ID 73, and assign the highest task ID of 73 to the level 2 task. For the new level 3 task, use the highest task ID of 3, add 10 to make the highest task ID 13, and assign the highest task ID of 13 to the level 3 task. When all the task information from the editor session has been posted, update the ProjectTeam table of the database so the value of nLevel2MaxTaskID is 73 and nLevel3MaxTaskID is 13 for test1.

Organization and Indexing of Task Information

Figure 55:
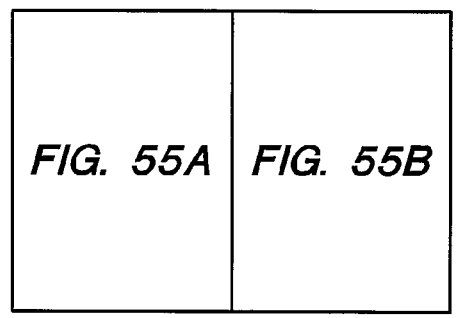
FIG. 55 is a screenshot illustrating the organization of task information in the member schedule editor, according to an embodiment of the invention.
Figure 55B:
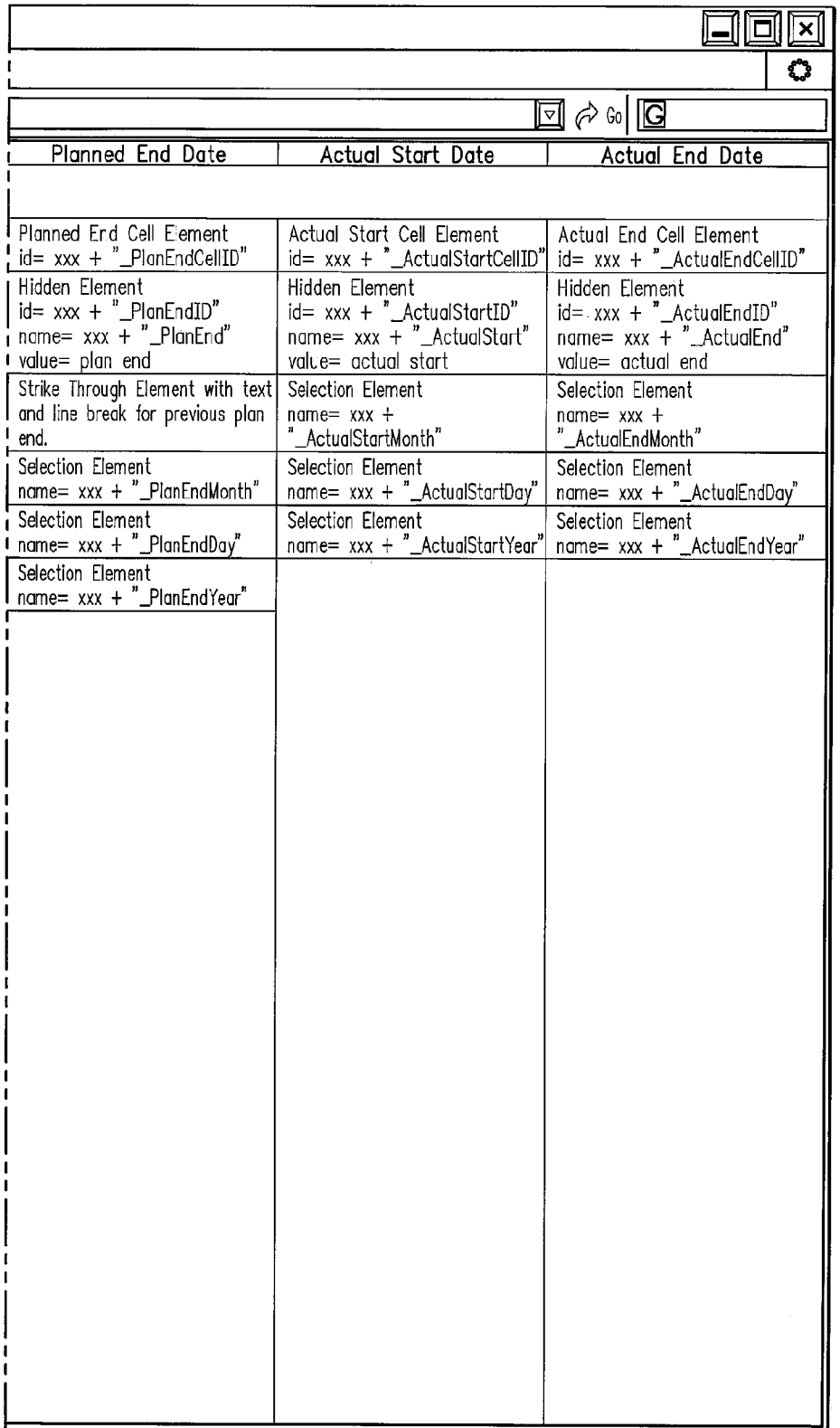

FIG. 55 is a screenshot illustrating the organization of task information in the member schedule editor, according to an embodiment of the invention. This screenshot depicts a Document Object Model (DOM) representation of the member schedule editor displayed in the web page. The information is maintained in the web browser. According to one embodiment, the web page for the editor is an HTML form containing a table, where each row corresponds to a scheduled task. The form allows information to be entered into the web page and allows information to be passed to a web server for processing. Javascript allows the form to be created, maintained, and managed. Javascript handles the events (selecting an item from the menu, selecting a checkbox, or selecting a button) that occur in the form. Each row in the table for the member schedule editor is provided an ID value containing an index (labeled "xxx"), which is unique for each row. All elements in the row use this unique index to store and manage information about a task. Javascript will use the ID value containing the unique index to access or set information about tasks and to control what is displayed in the row in the editor.

Figure 57:
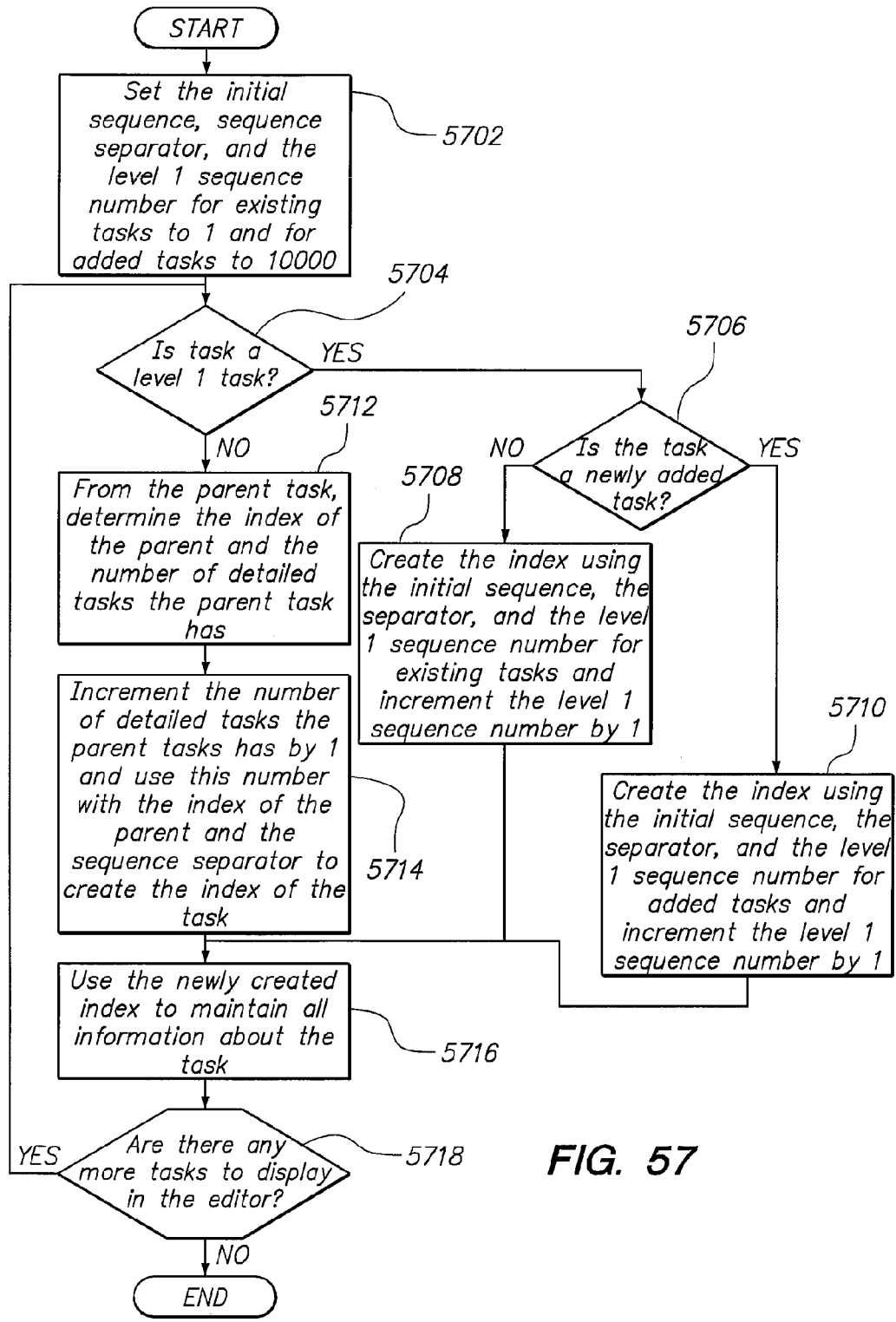
FIG. 57 is a flowchart illustrating how the index is created for each row of a task whether the editor is displayed the first time or new tasks at any level are added in the editor, according to an embodiment of the invention.

The form contains hidden elements that store information about a task without displaying the information in the member schedule editor. The hidden elements are useful for obtaining and setting information about a task, such as the task ID, task level, action performed on task (i.e., added, deleted, edited planned date), parent task ID, or number of detailed tasks. All the information in the form, displayed or hidden, is passed to the web server for processing information about each task. The DOM representation of the member schedule editor allows access and control of the display of the editor by Javascript. FIG. 57 shows how the index used in the ID for various elements of the editor is created. The task assignment editor and project schedule editor follow a similar DOM representation as the member schedule editor, whereby the IDs for elements use a unique index for its rows. The editor may contain more information than is shown in FIG. 55.

Figure 56:
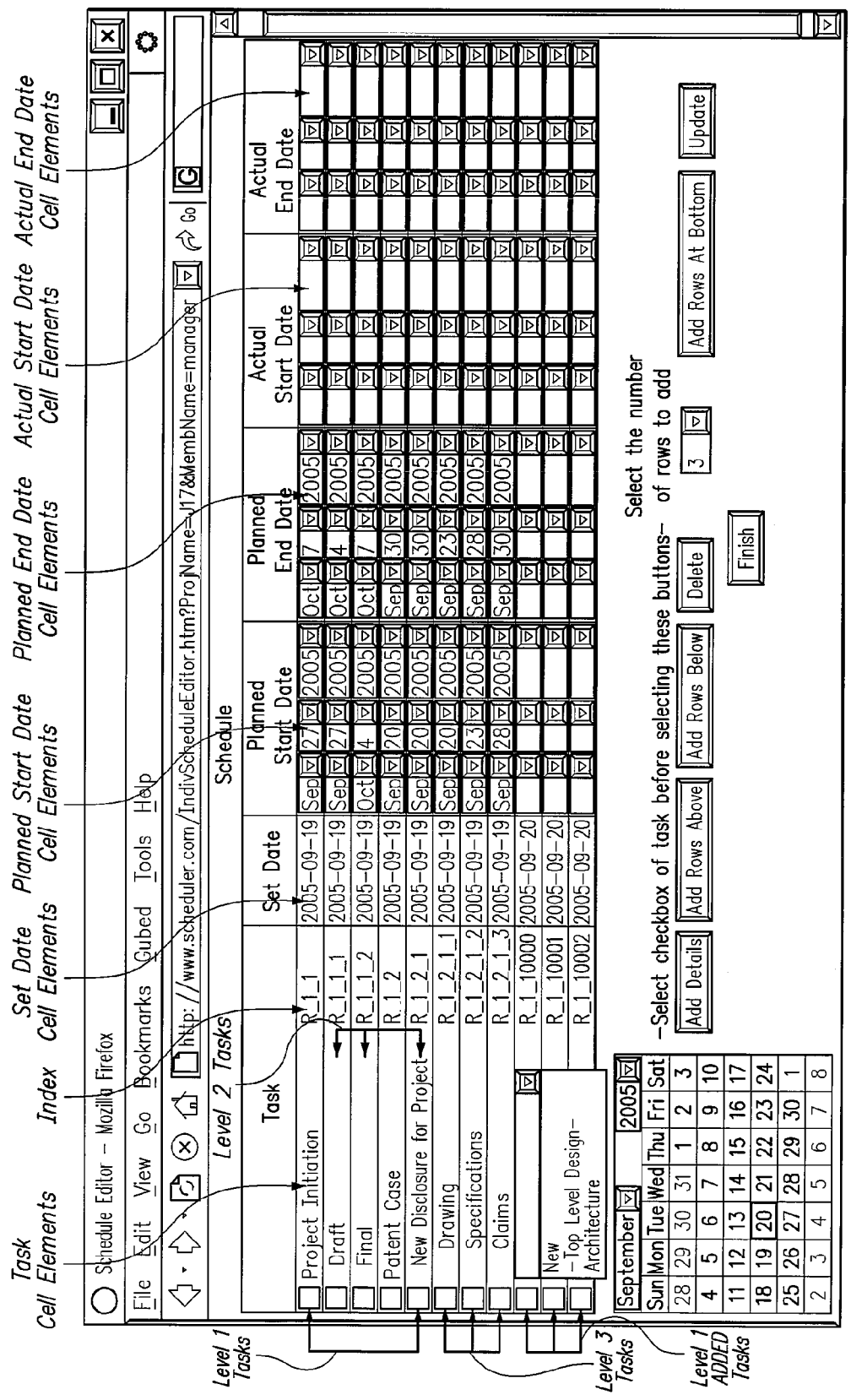
FIG. 56 is a screenshot illustrating an example member schedule editor showing the various components and the index assigned to each row, according to an embodiment of the invention.

FIG. 56 is a screenshot illustrating an example member schedule editor showing the various components and the index assigned to each row, according to an embodiment of the invention. The index is unique for each row. The index contains a sequence of numbers separated by an underscore '_'. The lower the task level, the more sequence number the index contains.

FIG. 57 is a flowchart illustrating how the index is created for each row of a task whether the editor is displayed the first time or new tasks at any level are added in the editor, according to an embodiment of the invention. The index starts with an initial sequence of characters, symbols, or numbers. From FIG. 56, the initial sequence is "R_1". This sequence can be any sequence that will be used in the index for all rows. In the process of FIG. 57, (a) the initial sequence is set, (b) the sequence separator is set, (c) the level 1 sequence number is initially set to 1 to handle tasks that already exist in the member's schedule, and (d) another level 1 sequence number is set to 10000 to handle tasks that may be added to the member's schedule in the editor session, block 5702. Any other large number can be used in place of 10000. The level 1 sequence number will provide an index to distinguish existing scheduled tasks from newly added tasks. If the task is a level 1 task at block 5704, and is an existing task at block 5706, then create an index using the initial sequence, the sequence separator, and the level 1 sequence number for existing task, and increment the level 1 sequence number by 1, block 5708. If the task is a level 1 task at block 5704, and is a newly added task at block 5706, then create an index using the initial sequence for added task, the sequence separator, and the level 1 sequence number for added task and increment the level 1 sequence number by 1, block 5710.

The index created will be used in the ID for all elements in the row that contain information about the task, as shown in FIG. 55. If the task is a lower level task at block 5704, then determine the index of its parent task and determine the number of detailed tasks the parent tasks has, block 5712. This information can be obtained from the elements in the row corresponding to the parent task. Increment the number of detailed tasks the parent task has by 1 and create the index using the index of the parent task, the sequence separator, and the number of detailed tasks of the parent task, block 5714. The index created will be used in the ID for all elements in the row corresponding to the lower level task, block 5716. If there are any more tasks to display in the editor, at block 5718, then return to block 5704 to repeat the processes (except for steps of setting the initial sequences) for each task row to be displayed in the editor.

The indexing of the rows corresponding to tasks is such that the Javascript can manage and maintain the task information. The indexing is used in the ID and names of various elements of the form so that the Javascript and PHP after POST can access and manipulate their attributes and values. Javascript uses the elements to maintain information about a task and to control the display of the elements in the editor. Whereas the web browser (client Processor) uses the indexing for maintaining and managing the task information and editor, the web server (server Processor) uses the indexing to access the information that is passed from the web browser to the web server. According to one embodiment, all form elements of the editor are passed to the web server as name-value pairs. The name consists of the index along with a string indicating what information the value represents. As an example, the name of a form hidden element in FIG. 56 for the level 3 task "Claims" is "R_1_2_1_3_TaskName" that has a value corresponding to the name of the task, which is "Claims". The sequence following R_1 indicates that this task is the third level 3 task of the first level 2 task of the second level 1 task. The web server uses the name containing the index along with the string to access the value that contains information about the task. The web server follows a similar sequence as described in the flowchart of FIG. 57 to create the index, and then the names, to obtain information about each task at any level from the form elements.

Hardware Overview

FIG. 58 is a block diagram that illustrates a computer system 5800 upon which embodiments of the invention can be implemented. Computer system 5800 additionally illustrates a non-limiting example of a system configuration of the workstation 102 (FIG. 1) and the web server 104 (FIG. 1). Computer system 5800 includes a bus 5802 or other communication mechanism for communicating information, and a processor 5804 coupled with bus 5802 for processing information. Computer system 5800 also includes a main memory 5806, such as a random access memory (RAM) or other dynamic storage device, coupled to bus 5802 for storing information and instructions to be executed by processor 5804. Main memory 5806 also may be used for storing temporary variables or other intermediate information during execution of instructions to be executed by processor 5804. Computer system 5800 further includes a read only memory (ROM) 5808 or other static storage device coupled to bus 5802 for storing static information and instructions for processor 5804. A storage device 5810, such as a magnetic disk, optical disk, or magneto-optical disk, is provided and coupled to bus 5802 for storing information and instructions. 101901

Computer system 5800 may be coupled via bus 5802 to a display 5812, such as a cathode ray tube (CRT) or a liquid crystal display (LCD), for displaying information to a computer user. An input device 5814, including alphanumeric and other keys, is coupled to bus 5802 for communicating information and command selections to processor 5804. Another type of user input device is cursor control 5816, such as a mouse, a trackball, or cursor direction keys for communicating direction information and command selections to processor 5804 and for controlling cursor movement on display 5812. This input device typically has two degrees of freedom in two axes, a first axis (e.g., x) and a second axis (e.g., y), that allows the device to specify positions in a plane.

The invention is related to the use of computer system 5800 for implementing the techniques described herein. According to one embodiment of the invention, those techniques are performed by computer system 5800 in response to processor 5804 executing one or more sequences of one or more instructions contained in main memory 5806. Such instructions may be read into main memory 5806 from another computer-readable medium, such as storage device 5810. Execution of the sequences of instructions contained in main memory 5806 causes processor 5804 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 5804 for execution. Such a medium may take many forms, including but not limited to, non-volatile media, volatile media, and transmission media. Examples of non-volatile media include, without limitation, optical, magnetic disks, or magneto-optical disks, such as storage device 5810. Volatile media includes dynamic memory, such as main memory 5806. Transmission media includes coaxial cables, copper wire and fiber optics, including the wires that comprise bus 5802. Transmission media can also take the form of acoustic or light waves, such as those generated during radio-wave and infra-red data communications.

Common forms of computer-readable media include, without limitation, a floppy disk, a flexible disk, hard disk, magnetic tape, any other magnetic medium; a CD-ROM, DVD, any other optical or magneto-optical medium; punchcards, papertape, any other physical medium with patterns of holes; a RAM, a PROM, an EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 5804 for execution. For example, the instructions may initially be carried on a magnetic disk of a remote computer. The remote computer can load the instructions into its dynamic memory and send the instructions over a telephone line using a modem. A modem local to computer system 5800 can receive the data on the telephone line and use an infra-red transmitter to convert the data to an infra-red signal. An infra-red detector can receive the data carried in the infra-red signal and appropriate circuitry can place the data on bus 5802. Bus 5802 carries the data to main memory 5806, from which processor 5804 retrieves and executes the instructions. The instructions received by main memory 5806 may optionally be stored on storage device 5810 either before or after execution by processor 5804.

Computer system 5800 also includes a communication interface 5818 coupled to bus 5802. Communication interface 5818 provides a two-way data communication coupling to a network link 5820 that is connected to a local network 5822. For example, communication interface 5818 may be an integrated services digital network (ISDN) card or a modem to provide a data communication connection to a corresponding type of telephone line. As another example, communication interface 5818 may be a local area network (LAN) card to provide a data communication connection to a compatible LAN. Wireless links may also be implemented. In any such implementation, communication interface 5818 sends and receives electrical, electromagnetic or optical signals that carry digital data streams representing various types of information.

Network link 5820 typically provides data communication through one or more networks to other data devices. For example, network link 5820 may provide a connection through local network 5822 to a host computer 5824 or to data equipment operated by an Internet Service Provider (ISP) 5826. ISP 5826 in turn provides data communication services through the world wide packet data communication network now commonly referred to as the "Internet" 5828. Local network 5822 and Internet 5828 both use electrical, electromagnetic or optical signals that carry digital data streams. The signals through the various networks and the signals on network link 5820 and through communication interface 5818, which carry the digital data to and from computer system 5800, are exemplary forms of carrier waves transporting the information.

Computer system 5800 can send messages and receive data, including program code, through the network(s), network link 5820 and communication interface 5818. In the Internet example, a server 5830 might transmit a requested code for an application program through Internet 5828, ISP 5826, local network 5822 and communication interface 5818.

The received code may be executed by processor 5804 as it is received, and/or stored in storage device 5810, or other non-volatile storage for later execution. In this manner, computer system 5800 may obtain application code in the form of a carrier wave.

Extensions and Alternatives

Alternative embodiments of the invention are described throughout the foregoing description, and in locations that best facilitate understanding the context of the embodiments. Furthermore, the invention has been described with reference to specific embodiments thereof. It will, however, be evident that various modifications and changes may be made thereto without departing from the broader scope of embodiments of the invention. Therefore, the specification and drawings are, accordingly, to be regarded in an illustrative rather than a restrictive sense.

In addition, in this description certain process steps are set forth in a particular order, and alphabetic and alphanumeric labels may be used to identify certain steps. Unless specifically stated in the description, embodiments of the invention are not necessarily limited to any particular order of carrying out such steps. In particular, the labels are used merely for convenient identification of steps, and are not intended to specify or require a particular order of carrying out such steps.

What is claimed is:

1. A computer-implemented method for using a database to manage a project schedule for a project, the computer-implemented method comprising:

storing, by one or more computing devices, in a project task database table, via a project schedule editor session, planned schedule dates for a plurality of project tasks for the project;

storing, by one or more computing devices, in a first-level member task database table from a set of hierarchically-related member task database tables, via a member schedule editor session conducted by a particular project member, planned schedule dates for a subtask of a particular project task from the plurality of project tasks, wherein the subtask is defined by the particular project member during the member schedule editor session and is assigned to the particular project member, and planned schedule dates for an existing non-project task assigned to the particular project member, wherein the existing non-project task is defined by the particular project member during the member schedule editor session, and;

wherein the project task database table is linked to the planned schedule dates for the existing non-project task assigned to the particular project member contained in the first-level member task database table and wherein each member task database table other than the lowest level member task database table in the set of hierarchically-related member task database tables is linked to planned schedule dates contained in a respective next-lower-level member task database table;

retrieving, by one or more computing devices, from the first-level member task database table and displaying in a member schedule web page, both the planned schedule dates for the subtask of the particular project task from the plurality of project tasks and the schedule dates for the existing non-project task assigned to the particular project member; and displaying in a project schedule web page a project schedule for the project that includes the plurality of project tasks without displaying the existing non-project task assigned to the particular project member.

2. The computer-implemented method of claim 1, further comprising:

receiving, via the member schedule editor session for the particular project member, a request to update schedule dates for subtasks assigned to the particular project member; and in response to the request to update the schedule dates for subtasks assigned to the particular project member, for each subtask displaying a planned start date for as the earliest planned start date of all lower level subtasks of the subtask and displaying a planned end date as the latest planned end date of all the lower level subtasks of the subtask.

3. The computer-implemented method of claim 2, further comprising:

receiving, via the member schedule editor session for the particular project member, a request to finish the member schedule editor session for the particular project member; and in response to the request to finish the member schedule editor session for the particular project member, storing the displayed planned start dates and the planned end dates for each level of subtask in a corresponding member task table.

4. The computer-implemented method of claim 3, wherein receiving and displaying are performed by one or more client computing devices, and wherein the steps of storing are performed by one or more server computing device.

5. The computer-implemented method of claim 1, further comprising:

receiving, via the project schedule editor session, a request to consolidate schedule dates for subtasks of the plurality of project tasks for the project;

in response to the request to consolidate schedule date for subtasks of the plurality of project tasks for the project, retrieving, from the first-level member task database table, schedule dates for subtasks of the plurality of project tasks for the project;

aggregating the retrieved schedule dates, by for each project task from the plurality of project tasks for the project, setting a planned start date as the earliest planned start date, from the hierarchically-related member task database tables, for all levels of subtasks of the project task, and setting a planned end date as the latest planned end date, from the hierarchically-related member task database tables, for all levels of the subtasks of the project task;

storing, in the project task database table, the planned start dates and the planned end dates for each project task from the plurality of project tasks for the project; and displaying the project schedule for the project in the project schedule web page by displaying the planned start dates and the planned end dates for each project task from the plurality of project tasks for the project.

6. The computer-implemented method of claim 5, wherein the aggregating is performed by one or more server computing devices.

7. The computer-implemented method of claim 1, further comprising displaying a member schedule for the particular project member in a member schedule web page, wherein the member schedule includes the existing non-project task assigned to the particular project member.

8. The computer-implemented method of claim 7, wherein displaying a member schedule includes displaying the existing non-project task assigned to the particular project member with a visual indication that indicates that the existing non-project task is a non-project task.

9. A non-transitory computer-readable medium for using a database to manage a project schedule for a project, the non-transitory computer-readable medium storing instructions which, when processed by one or more processors, cause:

storing in a project task database table, via a project schedule editor session, planned schedule dates for a plurality of project tasks for the project;

storing in a first-level member task database table from a set of hierarchically-related member task database tables, via a member schedule editor session conducted by a particular project member, planned schedule dates for a subtask of a particular project task from the plurality of project tasks, wherein the subtask is defined by the particular project member during the member schedule editor session and is assigned to the particular project member, and planned schedule dates for an existing non-project task assigned to the particular project member, wherein the existing non-project task is defined by the particular project member during the member schedule editor session, and;

wherein the project task database table is linked to the planned schedule dates for the existing non-project task assigned to the particular project member contained in the first-level member task database table and wherein each member task database table other than the lowest level member task database table in the set of hierarchically-related member task database tables is linked to planned schedule dates contained in a respective next-lower-level member task database table;

retrieving from the first-level member task database table and displaying in a member schedule web page, both the planned schedule dates for the subtask of the particular project task from the plurality of project tasks and the schedule dates for the existing non-project task assigned to the particular project member; and displaying in a project schedule web page a project schedule for the project that includes the plurality of project tasks without displaying the existing non-project task assigned to the particular project member.

10. The non-transitory computer-readable medium of claim 9, further comprising additional instructions which, when processed by the one or more processors, cause:

receiving, via the member schedule editor session for the particular project member, a request to update schedule dates for subtasks assigned to the particular project member; and in response to the request to update the schedule dates for subtasks assigned to the particular project member, for each subtask displaying a planned start date for as the earliest planned start date of all lower level subtasks of the subtask and displaying a planned end date as the latest planned end date of all the lower level subtasks of the subtask.

11. The non-transitory computer-readable medium of claim 10, further comprising additional instructions which, when processed by the one or more processors, cause:

receiving, via the member schedule editor session for the particular project member, a request to finish the member schedule editor session for the particular project member; and in response to the request to finish the member schedule editor session for the particular project member, storing the displayed planned start dates and the planned end dates for each level of subtask in a corresponding member task table.

12. The non-transitory computer-readable medium of claim 11, wherein receiving and displaying are performed by one or more client computing devices, and wherein the steps of storing are performed by one or more server computing devices.

13. The non-transitory computer-readable medium of claim 9, further comprising additional instructions which, when processed by the one or more processors, cause:

receiving, via the project schedule editor session, a request to consolidate schedule dates for subtasks of the plurality of project tasks for the project;

in response to the request to consolidate schedule date for subtasks of the plurality of project tasks for the project, retrieving, from the first-level member task database table, schedule dates for subtasks of the plurality of project tasks for the project;

aggregating the retrieved schedule dates, by for each project task from the plurality of project tasks for the project, setting a planned start date as the earliest planned start date, from the hierarchically-related member task database tables, for all levels of subtasks of the project task, and setting a planned end date as the latest planned end date, from the hierarchically-related member task database tables, for all levels of the subtasks of the project task;

storing, in the project task database table, the planned start dates and the planned end dates for each project task from the plurality of project tasks for the project; and displaying the project schedule for the project in the project schedule web page by displaying the planned start dates and the planned end dates for each project task from the plurality of project tasks for the project.

14. The non-transitory computer-readable medium of claim 13, wherein the aggregating is performed by one or more server computing devices.

15. The non-transitory computer-readable medium of claim 9, further comprising additional instructions which, when processed by the one or more processors, cause displaying a member schedule for the particular project member in a member schedule web page, wherein the member schedule includes the existing non-project task assigned to the particular project member.

16. The non-transitory computer-readable medium of claim 15, wherein displaying a member schedule includes displaying the existing non-project task assigned to the particular project member with a visual indication that indicates that the existing non-project task is a non-project task.

17. An apparatus for using a database to manage a project schedule for a project, the apparatus comprising a memory storing instructions which, when processed by one or more processors, cause:

storing in a project task database table, via a project schedule editor session, planned schedule dates for a plurality of project tasks for the project;

storing in a first-level member task database table from a set of hierarchically-related member task database tables, via a member schedule editor session conducted by a particular project member, planned schedule dates for a subtask of a particular project task from the plurality of project tasks, wherein the subtask is defined by the particular project member during the member schedule editor session and is assigned to the particular project member, and planned schedule dates for an existing non-project task assigned to the particular project member, wherein the existing non-project task is defined by the particular project member during the member schedule editor session, and;

wherein the project task database table is linked to the planned schedule dates for the existing non-project task assigned to the particular project member contained in the first-level member task database table and wherein each member task database table other than the lowest level member task database table in the set of hierarchically-related member task database tables is linked to planned schedule dates contained in a respective next-lower-level member task database table;

retrieving from the first-level member task database table and displaying in a member schedule web page, both the planned schedule dates for the subtask of the particular project task from the plurality of project tasks and the schedule dates for the existing non-project task assigned to the particular project member; and displaying in a project schedule web page a project schedule for the project that includes the plurality of project tasks without displaying the existing non-project task assigned to the particular project member.

18. The apparatus of claim 17, wherein the memory stores additional instructions which, when processed by the one or more processors, cause:

receiving, via the member schedule editor session for the particular project member, a request to update schedule dates for subtasks assigned to the particular project member; and in response to the request to update the schedule dates for subtasks assigned to the particular project member, for each subtask displaying a planned start date for as the earliest planned start date of all lower level subtasks of the subtask and displaying a planned end date as the latest planned end date of all the lower level subtasks of the subtask.

19. The apparatus of claim 18, wherein the memory stores additional instructions which, when processed by the one or more processors, cause:

receiving, via the member schedule editor session for the particular project member, a request to finish the member schedule editor session for the particular project member; and in response to the request to finish the member schedule editor session for the particular project member, storing the displayed planned start dates and the planned end dates for each level of subtask in a corresponding member task table.

20. The apparatus of claim 17, wherein the memory stores additional instructions which, when processed by the one or more processors, cause:

receiving, via the project schedule editor session, a request to consolidate schedule dates for subtasks of the plurality of project tasks for the project;

in response to the request to consolidate schedule date for subtasks of the plurality of project tasks for the project,
retrieving, from the first-level member task database table, schedule dates for subtasks of the plurality of project tasks for the project;
aggregating the retrieved schedule dates, by for each project task from the plurality of project tasks for the project,
setting a planned start date as the earliest planned start date, from the hierarchically-related member task database tables, for all levels of subtasks of the project task, and
setting a planned end date as the latest planned end date, from the hierarchically-related member task database tables, for all levels of the subtasks of the project task;
storing, in the project task database table, the planned start dates and the planned end dates for each project task from the plurality of project tasks for the project; and displaying the project schedule for the project in the project schedule web page by displaying the planned start dates and the planned end dates for each project task from the plurality of project tasks for the project.

\* \* \* \* \*

UNITED STATES PATENT AND TRADEMARK OFFICE
CERTIFICATE OF CORRECTION

PATENT NO.        : 8,799,043 B2
APPLICATION NO.   : 11/449130
DATED             : August 5, 2014
INVENTOR(S)       : Tetsuro Motoyama and Avery Fong It is certified that error appears in the above-identified patent and that said Letters Patent is hereby corrected as shown below:

Title page:

Item (56) "References Cited", "OTHER PUBLICATIONS", insert
--U.S. Appl. No. 10/785,858, filed Feb. 23, 2004, Office Action, Jun. 1, 2007
U.S. Appl. No. 10/785,329, filed Feb. 23, 2004, Office Action, Jun. 1, 2007
U.S. Appl. No. 10/059,694, filed Jan. 28, 2002, Office Action, May 4, 2007
U.S. Appl. No. 11/724,963, filed Mar. 15, 2007, Notice of Publication, Sep. 18, 2008
U.S. Appl. No. 11/724,723, filed Mar. 15, 2007, Notice of Publication, Sep. 18, 2008
U.S. Appl. No. 11/724,757, filed Sep. 15, 2004, Notice of Publication, Oct. 16, 2008
U.S. Appl. No. 11/449,133, filed Jun. 7, 2006, Notice of Publication, Dec. 12, 2007
U.S. Appl. No. 11/800,844, filed May 7, 2007, Notice of Publication, Sep. 13, 2007
U.S. Appl. No. 11/449,116, filed Jun. 7, 2006, Notice of Publication, Dec. 13, 2007
U.S. Appl. No. 10/785,858, filed Feb. 23, 2004, Final Office Action, Feb. 2, 2010
U.S. Appl. No. 12/122,533, filed May 16, 2008, Final Office Action, Mar. 11, 2011
U.S. Appl. No. 11/449,116, filed Jun. 7, 2006, Office Action, Mar. 21, 2011
U.S. Appl. No. 12/122,497, filed May 16, 2008, Office Action, Apr. 8, 2011
U.S. Appl. No. 12/122,392, filed May 16, 2008, Final Office Action, Apr. 4, 2011
U.S. Appl. No. 11/724,963, filed Mar. 15, 2007, Office Action, Apr. 8, 2011
U.S. Appl. No. 11/449,116, filed Jun. 7, 2006, Final Office Action, Jul. 25, 2011
U.S. Appl. No. 12/036,152, filed Feb. 22, 2008, Office Action, Jul. 29, 2011
U.S. Appl. No. 12/122,514, filed May 16, 2008, Office Action, Aug. 15, 2011
U.S. Appl. No. 12/035,817, filed Feb. 22, 2008, Office Action, Jul. 18, 2011
U.S. Appl. No. 11/724,963, filed Mar. 15, 2007, Final Office Action, Oct. 12, 2011
U.S. Appl. No. 12/122,392, filed May 16, 2008, Office Action, Jan. 3, 2012

Signed and Sealed this
Twenty-seventh Day of January, 2015

Michelle K. Lee
*Deputy Director of the United States Patent and Trademark Office*

CERTIFICATE OF CORRECTION (continued)
U.S. Pat. No. 8,799,043 B2

U.S. Appl. No. 12/122,533, filed May 16, 2008, Office Action, Nov. 21, 2011
    U.S. Appl. No. 12/035,817, filed Feb. 2, 2008, Office Action, Feb. 10, 2012
    U.S. Appl. No. 12/036,152, filed Feb. 22, 2008, Final Office Action, Feb. 3, 2012
    U.S. Appl. No. 12/122,533, filed May 16, 2008, Office Action, Mar. 12, 2012
    U.S. Appl. No. 12/035,817, filed Feb. 22, 2008, Office Action, Jul. 3, 2012
    U.S. Appl. No. 12/122,392, filed May 16, 2008, Notice of Allowance, Aug. 1, 2012
    U.S. Appl. No. 12/036,152, filed Feb. 22, 2008, Office Action, Aug. 13, 2012
    U.S. Appl. No. 12/122,497, filed May 16, 2008, Office Action, Sep. 11, 2012
    U.S. Appl. No. 12/035,817, filed Feb. 22, 2008, Office Action, Oct. 18, 2012
    U.S. Appl. No. 12/122,497, filed May 6, 2008, Final Office Action, Feb. 25, 2013
    U.S. Appl. No. 12/036,152, filed Feb. 22, 2008, Final Office Action, Feb. 26, 2013
    U.S. Appl. No. 12/035,817, filed Feb. 22, 2008, Final Office Action, Apr. 23, 2013
    U.S. Appl. No. 11/724,963, filed Mar. 15, 2007, Office Action, Aug. 6, 2013--

<u>In the Claims:</u>
    Column 36, Claim 4, line 2, delete "device" and insert --devices--